US010861390B2

(12) United States Patent
Miyasaka et al.

(10) Patent No.: US 10,861,390 B2
(45) Date of Patent: Dec. 8, 2020

(54) ELECTRO-OPTICAL DEVICE, ELECTRONIC DEVICE, AND ELECTRONIC APPARATUS

(71) Applicant: SEIKO EPSON CORPORATION, Tokyo (JP)

(72) Inventors: Mitsutoshi Miyasaka, Suwa (JP); Yoichi Momose, Matsumoto (JP); Kiyoshi Sekijima, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 9 days.

(21) Appl. No.: 16/277,511

(22) Filed: Feb. 15, 2019

(65) Prior Publication Data

US 2019/0259336 A1 Aug. 22, 2019

(30) Foreign Application Priority Data

Feb. 16, 2018 (JP) .................................. 2018-025776

(51) Int. Cl.
| | | |
|---|---|---|
| *G09G 3/3258* | (2016.01) | |
| *G09G 3/3233* | (2016.01) | |
| *G09G 3/3266* | (2016.01) | |
| *G09G 3/3291* | (2016.01) | |
| *G02B 27/01* | (2006.01) | |

(52) U.S. Cl.
CPC ......... *G09G 3/3258* (2013.01); *G02B 27/017* (2013.01); *G02B 27/0172* (2013.01); *G09G 3/3233* (2013.01); *G09G 3/3266* (2013.01); *G09G 3/3291* (2013.01); *G02B 27/0176* (2013.01); *G09G 2300/0814* (2013.01); *G09G 2300/0842* (2013.01)

(58) Field of Classification Search
None
See application file for complete search history.

(56) References Cited

U.S. PATENT DOCUMENTS

| | | | |
|---|---|---|---|
| 2002/0070913 A1 | 6/2002 | Kimura et al. | |
| 2002/0140642 A1 | 10/2002 | Okamoto | |
| 2006/0158394 A1* | 7/2006 | Choi | G09G 3/3266 345/76 |
| 2007/0159417 A1 | 7/2007 | Miyake | |
| 2008/0111766 A1 | 5/2008 | Uchino et al. | |
| 2010/0141644 A1* | 6/2010 | Lee | G09G 3/3266 345/214 |

FOREIGN PATENT DOCUMENTS

| | | |
|---|---|---|
| JP | 2002-287695 A | 10/2002 |
| JP | 2004-62199 A | 2/2004 |
| JP | 2004-163601 A | 6/2004 |
| JP | 2007-206681 A | 8/2007 |
| JP | 2008-122634 A | 5/2008 |
| JP | 2010-217661 A | 9/2010 |

\* cited by examiner

*Primary Examiner* — Aneeta Yodichkas
(74) *Attorney, Agent, or Firm* — Oliff PLC

(57) ABSTRACT

An electro-optical device includes a first scan line, a second scan line, a data line, a pixel circuit located at a position corresponding to an intersection of the data line and each of the first scan line and the second scan line, and a scan line drive circuit supplying one of a selection signal and a non-selection signal to the first scan line and supplying one of a maintain signal and a non-maintain signal to the second scan line. The scan line drive circuit is capable of output the selection signal and the non-maintain signal during an identical period.

22 Claims, 28 Drawing Sheets

ELECTRO-OPTICAL DEVICE, ELECTRONIC DEVICE, AND ELECTRONIC APPARATUS

BACKGROUND

1. Technical Field

The invention relates to an electro-optical device, an electronic device, and an electronic apparatus.

2. Related Art

Recently proposed electronic apparatuses enabling formation and observation of virtual images include head-mounted displays (HMD) of a type that guides image light from an electro-optical device to pupils of an observer. Such electronic apparatuses include, as an electro-optical device, an organic Electro Luminescence (EL) device including an organic EL element that is a light emitting element, for example. An organic EL device used in a head-mounted display is desired to have an increased resolution (miniaturized pixels), display multiple gray scales, and consume reduced power.

In known organic EL devices, when a selection transistor turns into an ON-state in response to a scan signal supplied to a scan line, a potential based on an image signal supplied through a data line is maintained in a capacitive element electrically connected to a gate of a driving transistor. When the driving transistor switches into an ON-state in response to the potential maintained in the capacitive element, that is, a gate potential of the driving transistor, an electric current flows through the organic EL element depending on the gate potential of the driving transistor and thus the organic EL element emits light with luminance depending on the electric current.

As described above, the known organic EL devices display gray scales based on analog driving in which the current flowing through the organic EL element is controlled depending on the gate potential of the driving transistor. Thus, possible variation in current-voltage characteristics or threshold voltage of the driving transistor may disadvantageously lead to possible variation in brightness among the pixels or deviation of the gray scales. This may result in degraded image quality. In contrast, a proposed organic EL device (memory integrated display element) includes, for each pixel, a memory circuit including a first inverter (11a) and a second inverter (11b) annularly electrically connected together and which are complementary to each other, to achieve display based on digital driving (see, e.g., JP-A-2002-287695).

An organic EL device described in JP-A-2002-287695 includes a first inverter and a second inverter each including a P-type transistor with a source electrically connected to a power supply line (reference potential) and an N-type transistor with a source electrically connected to a ground line (ground potential). An input of the first inverter is electrically connected to a data line via a selection circuit, an output of the first inverter is electrically connected to an input of a second inverter, and an output of the second inverter is electrically connected to the input of the first inverter. A light emitting element (OLED) is arranged between the output of the first inverter and the ground line. A signal received through the data line during a selection period has a potential (Vd) having one of two values: Low (ground potential) at which the light emitting element is allowed to emit light or High (reference potential) at which the light emitting element is prevented from emitting light.

For example, in a pixel selected by the selection circuit, when a Low signal is input to the input of the first inverter through the data line, the P-type transistor of the first inverter switches to the ON-state. This causes an electric current to flow through a path from a power supply line (reference potential) through the P-type transistor and the light emitting element to the ground line (ground potential). The light emitting element thus emits light. At this time, the output of the first inverter goes High, and thus, the input of the second inverter also goes High. The second inverter outputs Low, which is fed back to the input of the first inverter.

However, the organic EL device described in JP-A-2002-287695 operates as follows when, for example, the input of the first inverter is rewritten to change from Low to High. Before a High signal is supplied through the data line, the input of the first inverter has a Low potential, i.e., the input of the second inverter has a High potential. The N-type transistor of the second inverter is thus in the ON-state. The N-type transistor of the second inverter includes a source electrically connected to the ground line and a drain electrically connected to the data line, through which signals are supplied to the input of the first inverter. Thus, the High signal supplied through the data line causes an electric current to flow through a path from the data line through the N-type transistor of the second inverter to the ground line. This may disadvantageously delay or preclude rewrite of the input of the first inverter from Low to High.

SUMMARY

An aspect of the invention provides an electro-optical device including a first scan line, a second scan line, a data line, a pixel circuit located at a position corresponding to an intersection of the data line and each of the first scan line and the second scan line, and a scan line drive circuit supplying one of a selection signal or a non-selection signal to the first scan line and supplying one of a maintain signal or a non-maintain signal to the second scan line. The scan line drive circuit can output the selection signal and the non-maintain signal during an identical period.

Preferably, in the electro-optical device, the scan line drive circuit includes a selection circuit and a first NOT circuit, the selection signal and the non-selection signal are formed from an output signal from the selection circuit, and the first NOT circuit is used to form from the output signal the maintain signal and the non-maintain signal.

Preferably, in the electro-optical device, the scan line drive circuit includes a first control circuit adjusting an input signal, the output signal includes an original selection signal, and the first control circuit is used to form, from the original selection signal, the selection signal.

Preferably, in the electro-optical device, the scan line drive circuit includes a second control circuit adjusting an input signal, the output signal includes an original selection signal, and the second control circuit and the first NOT circuit are used to form, from the original selection signal, the non-maintain signal.

Preferably, in the electro-optical device, the scan line drive circuit includes a selection circuit, the selection signal and the non-selection signal are formed from an output signal from the selection circuit, and the maintain signal and the non-maintain signal are formed from the output signal.

Preferably, in the above-described electro-optical device, the scan line drive circuit includes a first control circuit adjusting an input signal, the output signal includes an original selection signal, and the first control circuit is used to form, from the original selection signal, the selection signal.

Preferably, in the electro-optical device, the scan line drive circuit includes a second control circuit adjusting an input signal, the output signal includes an original selection signal, and the second control circuit is used to form, from the original selection signal, the non-maintain signal.

Preferably, in the electro-optical device, the scan line drive circuit includes a selection circuit, a first NOT circuit, and a second NOT circuit, the second NOT circuit is used to form, from an output signal from the selection circuit, the selection signal and the non-selection signal, and the first NOT circuit is used to form, from the output signal, the maintain signal and the non-maintain signal.

Preferably, in the electro-optical device, the scan line drive circuit includes a first control circuit adjusting an input signal, the output signal includes an original selection signal, and the first control circuit and the second NOT circuit are used to form, from the original selection signal, the selection signal.

Preferably, in the above-described electro-optical device, the scan line drive circuit includes a second control circuit adjusting an input signal, the output signal includes an original selection signal, and the second control circuit and the first NOT circuit are used to form, from the original selection signal, the non-maintain signal.

Preferably, in the electro-optical device, the scan line drive circuit includes a selection circuit and a second NOT circuit, the second NOT circuit is used to form, from an output signal from the selection circuit, the selection signal and the non-selection signal, and the maintain signal and the non-maintain signal are formed from the output signal.

Preferably, in the above-described electro-optical device, the scan line drive circuit includes a first control circuit adjusting an input signal, the output signal includes an original selection signal, and the first control circuit and the second NOT circuit are used to form, from the original selection signal, the selection signal.

Preferably, in the electro-optical device, the scan line drive circuit includes a second control circuit, the output signal includes an original selection signal, and the second control circuit is used to form, from the original selection signal, the non-maintain signal.

The electronic apparatus includes the above-described electro-optical device.

An aspect of the invention provides an electronic device including a first row line, a second row line, a column line, an element circuit located at a position corresponding to an intersection of the column line and each of the first row line and the second row line, and a row line drive circuit supplying one of a first signal or a non-first signal to the first row line and supplying one of a second signal or a non-second signal to the second row line. The row line drive circuit can output the first signal and the non-second signal during an identical period.

Preferably, in the electronic device, the row line drive circuit includes a selection circuit and a first NOT circuit, the first signal and the non-first signal are formed from an output signal from the selection circuit, and the first NOT circuit is used to form, from the output signal, the second signal and the non-second signal.

Preferably, in the electronic device, the row line drive circuit includes a selection circuit, the first signal and the non-first signal are formed from an output signal from the selection circuit, and the second signal and the non-second signal are formed from the output signal.

Preferably, in the electronic device, the row line drive circuit includes a selection circuit, a first NOT circuit, and a second NOT circuit, the second NOT circuit is used to form, from an output signal from the selection circuit, the first signal and the non-first signal, and the first NOT circuit is used to form, from the output signal, the second signal and the non-second signal.

Preferably, in the electronic device, the row line drive circuit includes a selection circuit and a second NOT circuit, the second NOT circuit is used to form, from an output signal from the selection circuit, the first signal and the non-first signal, and the second signal and the non-second signal are formed from the output signal.

The electronic apparatus in the application includes the above-described electronic device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
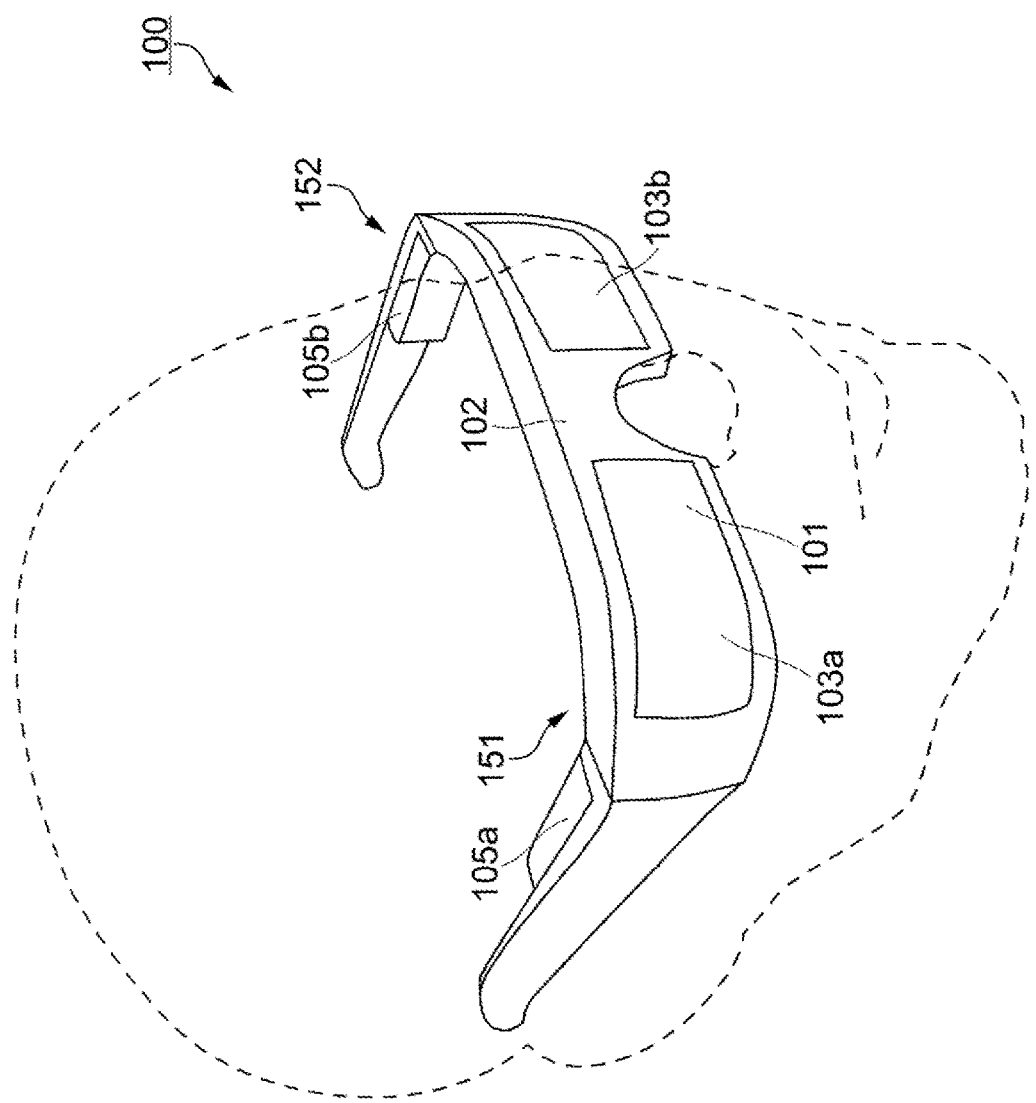
FIG. 1 is a diagram schematically illustrating an electronic apparatus according to Exemplary Embodiment.

Exemplary Embodiments of the invention will be described below with reference to the drawings. In the drawings referred to below, layers, members, and the like are not to scale in order to make the layers, members, and the like recognizable in size.

Outline of Electronic Apparatus

An outline of an electronic apparatus will now be described with reference to FIG. 1. FIG. 1 is a diagram schematically illustrating the electronic apparatus according to Exemplary Embodiment.

Figure 3:
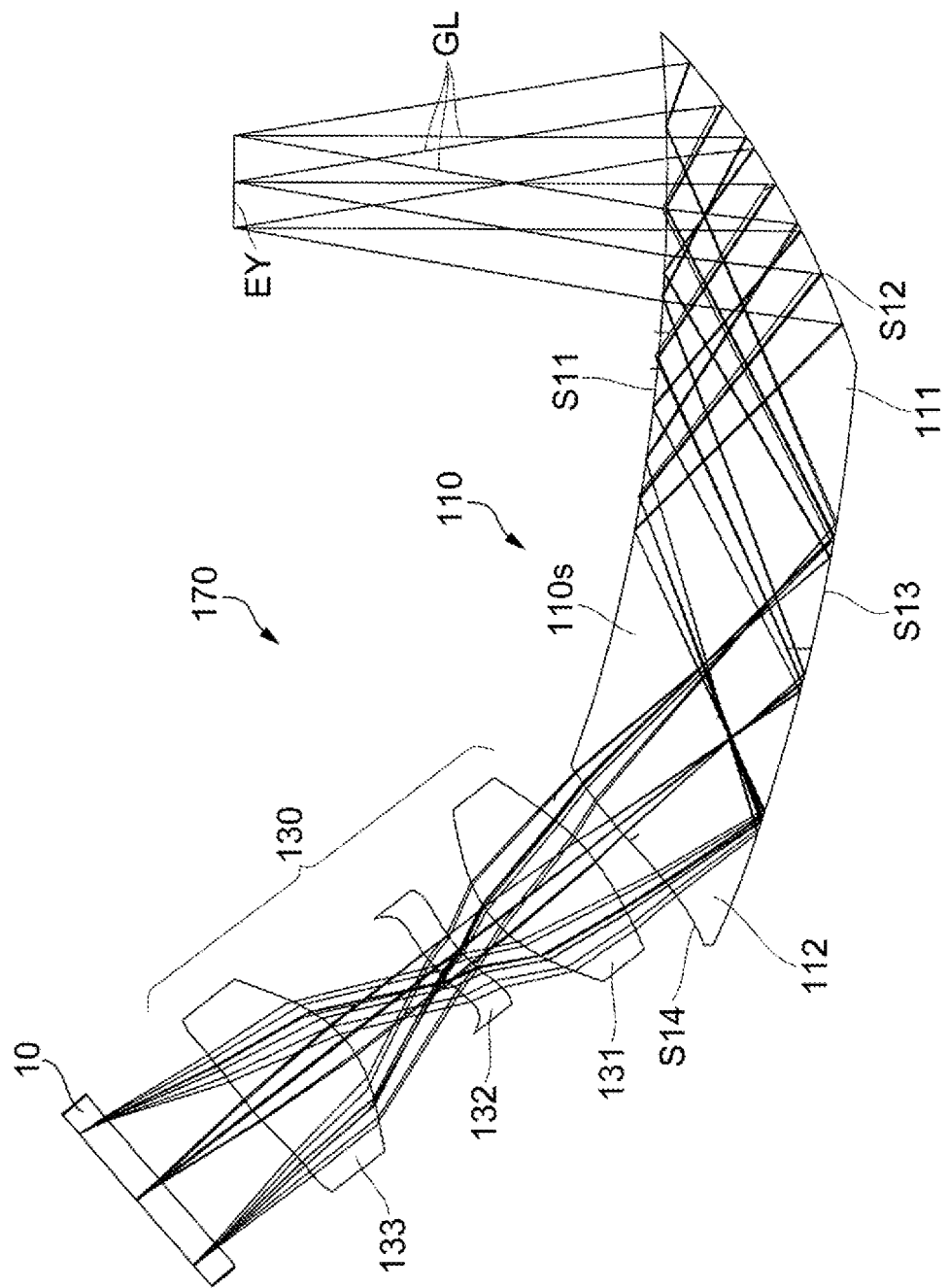
FIG. 3 is a diagram illustrating an optical system of the electronic apparatus according to the Exemplary Embodiment.

A head-mounted display 100 is an example of an electronic apparatus according to Exemplary Embodiment and includes an electro-optical device 10 (see FIG. 3). As illustrated in FIG. 1, the head-mounted display 100 has an appearance like glasses. Image light GL (see FIG. 3) forming an image is visible to a user wearing the head-mounted display 100, and outside light is visible to the user in a see-through manner. Specifically, the head-mounted display 100 has a see-through function that displays a superimposition of the outside light and the image light GL, has a wide angle of view and high performance, and is also small and light.

The head-mounted display 100 includes a transparent member 101 covering the front of the user's eyes, a frame 102 supporting the transparent member 101, and a first built-in device unit 105a and a second built-in device unit 105b each provided on a part extending from a cover at a corresponding one of two laterally opposite ends of the frame 102 to a temple behind the cover.

The transparent member 101 is a thick, curved optical member (transparent eye cover) covering the front of the user's eyes and includes separate portions: a first optical portion 103a and a second optical portion 103b. As seen on the left side in FIG. 1, a first display apparatus 151, which includes a combination of the first optical portion 103a and the first built-in device unit 105a, is a part to display a virtual image for the right eye as a see-through image and functions by itself as an electronic apparatus with a display function. As seen on the right side in FIG. 1, a second display apparatus 152, which includes a combination of the second optical portion 103b and the second built-in device unit 105b, is a part to display a virtual image for the left eye as a see-through image and functions by itself as an electronic apparatus with a display function. The first display apparatus 151 and the second display apparatus 152 each incorporate the electro-optical device 10 (see FIG. 3).

Internal Structure of Electronic Apparatus

Figure 2:
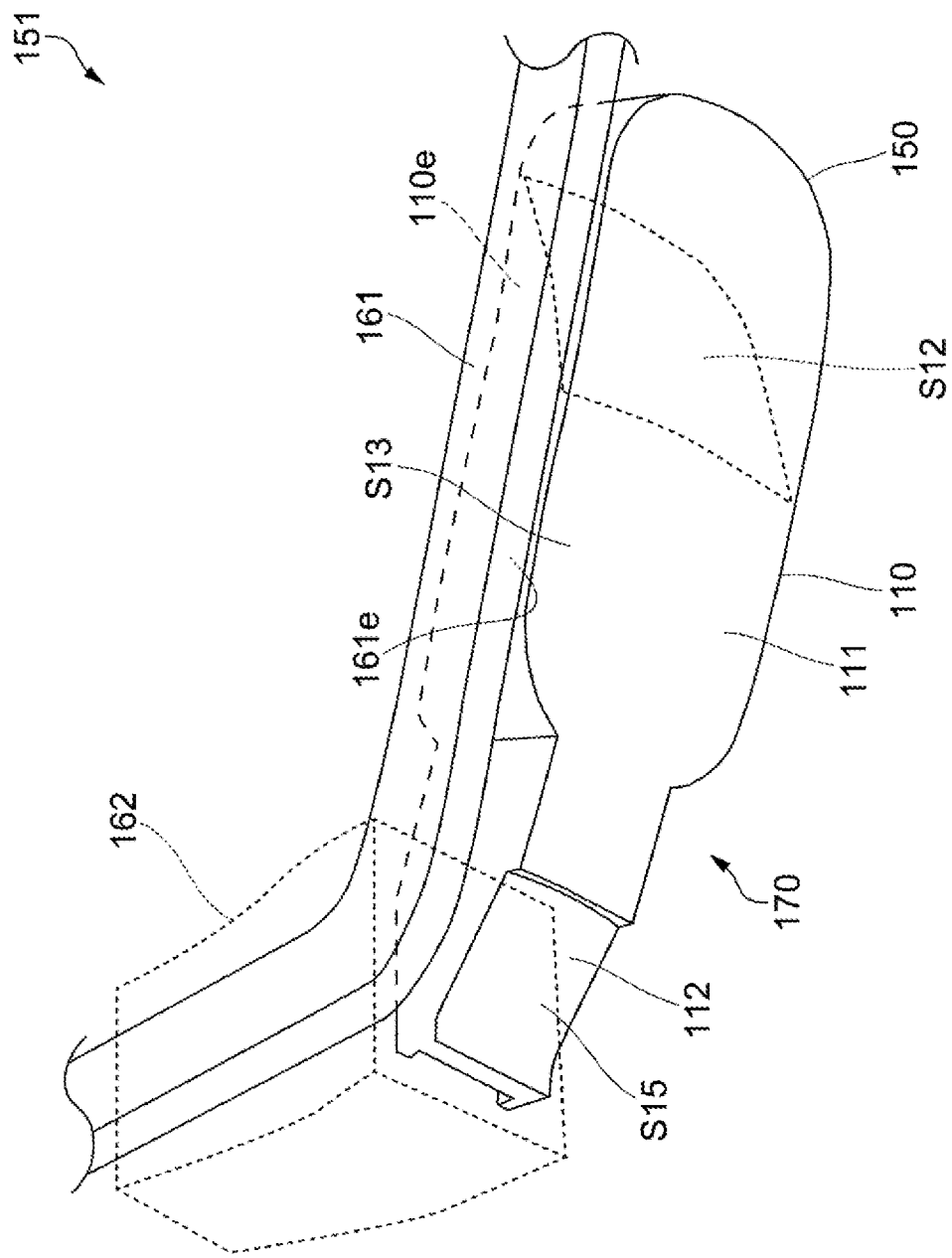
FIG. 2 is a diagram illustrating an internal structure of the electronic apparatus according to the Exemplary Embodiment.

FIG. 2 is a diagram illustrating an internal structure of the electronic apparatus according to Exemplary Embodiment. FIG. 3 is a diagram illustrating an optical system of the electronic apparatus according to Exemplary Embodiment. The internal structure and the optical system of the electronic apparatus will now be described with reference to FIG. 2 and FIG. 3. While FIG. 2 and FIG. 3 illustrate the first display apparatus 151 as an example of the electronic apparatus, the second display apparatus 152 is symmetrical to the first display apparatus 151 and has substantially the same structure. Accordingly, only the first display apparatus 151 will be described here and a detailed description of the second display apparatus 152 will be omitted.

As illustrated in FIG. 2, the first display apparatus 151 includes a projective transparent device 170 and the electro-optical device 10 (see FIG. 3). The projection see-through device 170 includes a prism 110 serving as a light guide member, a transparent member 150, and a projector lens 130 for image formation (see FIG. 3). The prism 110 and the transparent member 150 are integrated together by bonding and are firmly fixed to the bottom of a frame 161 such that a top face 110e of the prism 110 and a bottom face 161e of the frame 161 are held in contact with each other, for example.

The projector lens 130 is fixed to an end of the prism 110 through a lens barrel 162 that houses the projector lens 130. The prism 110 and the transparent member 150 in the projection see-through device 170 correspond to the first optical portion 103a illustrated in FIG. 1. The projector lens 130 and the electro-optical device 10 in the projection see-through device 170 correspond to the first built-in device unit 105a illustrated in FIG. 1.

The prism 110 in the projection see-through device 170 is an arc-shaped member that is curved along the face of the user when viewed in a plan view and may be considered to be formed of a first prism portion 111 on the central side closer to the nose and a second prism portion 112 on the peripheral side away from the nose. The first prism portion 111 is arranged on a light exit side and includes a first face S11 (see FIG. 3), a second face S12, and a third face S13 as side surfaces with optical functions.

The second prism portion 112 is arranged on a light incident side and includes a fourth face S14 (see FIG. 3) and a fifth face S15 as side surfaces with optical functions. Of these faces, the first face S11 and the fourth face S14 are adjacent to each other, the third face S13 and the fifth face S15 are adjacent to each other, and the second face S12 is disposed between the first face S11 and the third face S13. Also, the prism 110 has the top face 110e that is adjacent to the first face S11 to the fourth face S14.

The prism 110 is formed from a resin material with high optical transparency in a visible range and is molded, for example, by pouring a thermoplastic resin into a mold and curing the resin. A body portion 110s (see FIG. 3) of the prism 110 is assumed to be an integrally molded component but may be considered to be separate portions: a first prism portion 111 and a second prism portion 112. The first prism portion 111 can guide and output the image light GL and also allows outside light to be seen-through. The second prism portion 112 can receive and guide the image light GL.

The transparent member 150 is integrally fixed to the prism 110. The transparent member 150 is a member (auxiliary prism) assisting a transmission function of the prism 110. The transparent member 150 has high optical transparency in a visible range and is formed from a resin material with a refractive index that is substantially equal to the refractive index of the body portion 110s of the prism 110. The transparent member 150 is formed, for example, by molding thermoplastic resin.

As illustrated in FIG. 3, the projector lens 130 includes, for example, three lenses 131, 132, and 133 that are arranged along the optical axis on the light input side. Each of the lenses 131, 132, and 133 is rotationally symmetrical with respect to the central axis of the light input surfaces of the lenses. At least one of the lenses 131, 132, and 133 is an aspherical lens.

The projector lens 130 directs the image light GL emitted from the electro-optical device 10 into the prism 110 to re-form an image on an eye EY. In other words, the projector lens 130 is a relay optical system to re-form an image of the image light GL emitted from each pixel of the electro-optical device 10 on the eye EY through the prism 110. The projector lens 130 is held in the lens barrel 162 and the electro-optical device 10 is fixed to an end of the lens barrel 162. The second prism portion 112 of the prism 110 is connected to the lens barrel 162, which holds the projector lens 130, to indirectly support the projector lens 130 and the electro-optical device 10.

An electronic apparatus of a type that is mounted on the head of the user to cover the eyes, such as the head-mounted display 100, is required to be small and light. The electro-optical device 10 used in an electronic apparatus such as the head-mounted display 100 is required to provide high resolution (fine pixels), multiple grey scales of display, and low power consumption.

Configuration of Electro-Optical Device

Figure 4:
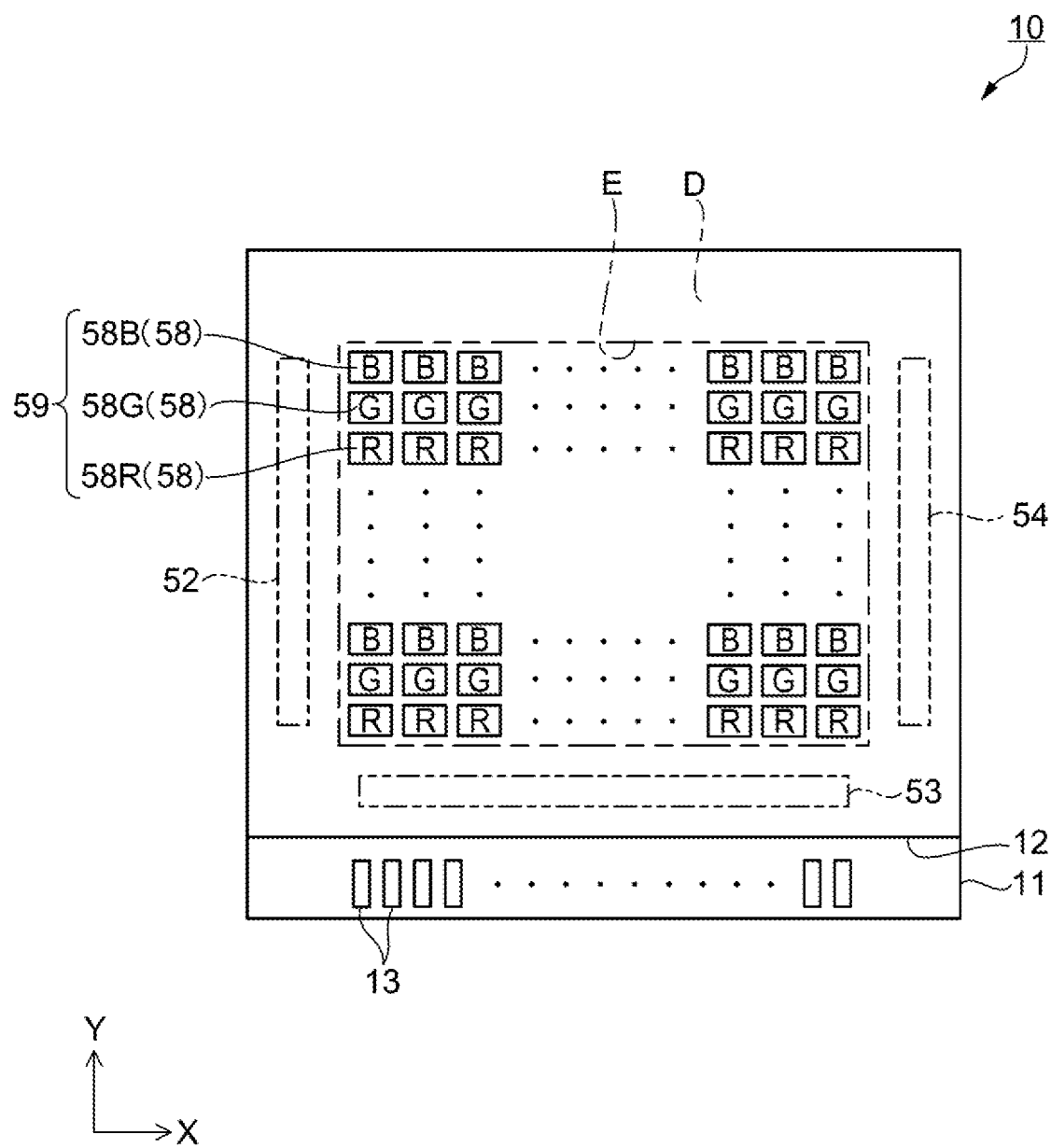
FIG. 4 is a schematic plan view illustrating a configuration of an electro-optical device according to the Exemplary Embodiment.

A configuration of the electro-optical device will now be described with reference to FIG. 4. FIG. 4 is a schematic plan view illustrating a configuration of an electro-optical device according to Exemplary Embodiment. With Exemplary Embodiment, the electro-optical device 10 will be described, which is, e.g., an organic EL device including an organic EL element as a light emitting element. As illustrated in FIG. 4, the electro-optical device 10 according to Exemplary Embodiment includes an element substrate 11 and a protective substrate 12. The element substrate 11 is provided with a color filter (not illustrated). The element substrate 11 and the protective substrate 12 are arranged to face each other and are bonded together with filler (not illustrated).

The element substrate 11 includes, e.g., a single-crystal semiconductor substrate (e.g., a single-crystal silicon wafer). The element substrate 11 includes a display region E and a non-display region D enclosing the display region E. The display region E includes, e.g., sub-pixels 58B emitting blue (B) light, sub-pixels 58G emitting green (G) light, and sub-pixels 58R emitting red (R) light. The sub-pixels 58B, the sub-pixels 58G, and the sub-pixels 58R are arranged, e.g. in a matrix. Each of the sub-pixels 58B, the sub-pixels 58G, and the sub-pixels 58R is provided with a light emitting element 20 (see FIG. 6). The electro-optical device 10 uses, as a display unit, a pixel 59 including the the sub-pixels 58B, the the sub-pixels 58G, and the the sub-pixels 58R to provide full-color display.

Note that the the sub-pixels 58B, the the sub-pixels 58G, and the the sub-pixels 58R may be collectively referred to herein as the sub-pixels 58 instead of being distinguished from one another. The display region E is a region allowing passage of light emitted from the the sub-pixels 58, thus contributing to display. The non-display region D is a region preventing passage of light emitted from the the sub-pixels 58, resulting in no contribution to display.

The element substrate 11 is larger than the protective substrate 12 and a plurality of external connection terminals 13 are arranged along a first side of the element substrate 11 which extends out of the protective substrate 12. A data line drive circuit 53 is provided between the display region E and the plurality of external connection terminals 13. A scan line drive circuit 52 is provided between the display region E and a second side that is another side perpendicular to the first side. An enable line drive circuit 54 is provided between the display region E and a third side that is perpendicular to the first side and opposite to the second side.

The protective substrate 12 is smaller than the element substrate 11 and is disposed so that the external connection terminals 13 are exposed. The protective substrate 12 is a light transparent substrate such as a quartz substrate or a glass substrate, for example. The protective substrate 12 serves to protect, from damage, the light emitting element 20 arranged in each sub-pixel 58 in the display region E. The protective substrate 12 is arranged at least opposite the display region E.

The color filter may be provided on the light emitting elements 20 in the element substrate 11 or it may be provided on the protective substrate 12. On the other hand, the color filter may not be required in such a configuration in which light corresponding to each color is emitted from the light emitting element 20. The protective substrate 12 may not be required, and instead of the protective substrate 12, a protective layer to protect the light emitting element 20 may be provided on the element substrate 11.

An X direction (row direction) is hereinafter defined as a direction along the first side along which the external connection terminals 13 are arranged. A Y direction (column direction) is hereinafter defined as a direction along the two other sides (second side and third side) orthogonal to the first side and opposite to each other. Exemplary Embodiment adopts what is called a horizontal striped arrangement. For example, the sub-pixels 58 providing light in the same color are arranged in the row direction (X direction), and the sub-pixels 58 providing light in the different colors are arranged in the column direction (Y direction).

Note that an order in which the sub-pixels 58 may be arranged in the column direction (Y direction) is not limited to B, G, and R as illustrated in FIG. 4 but may be, e.g., R, G, and B. Furthermore, the arrangement of the sub-pixels 58 is not limited to the striped arrangement but may be a delta arrangement, a Bayer arrangement, an S striped arrangement, or the like. Exemplary Embodiment is not limited to the same shape and size of the sub-pixels 58B, 58G, and 58R.

Circuit Configuration of Electro-Optical Device

Figure 5:
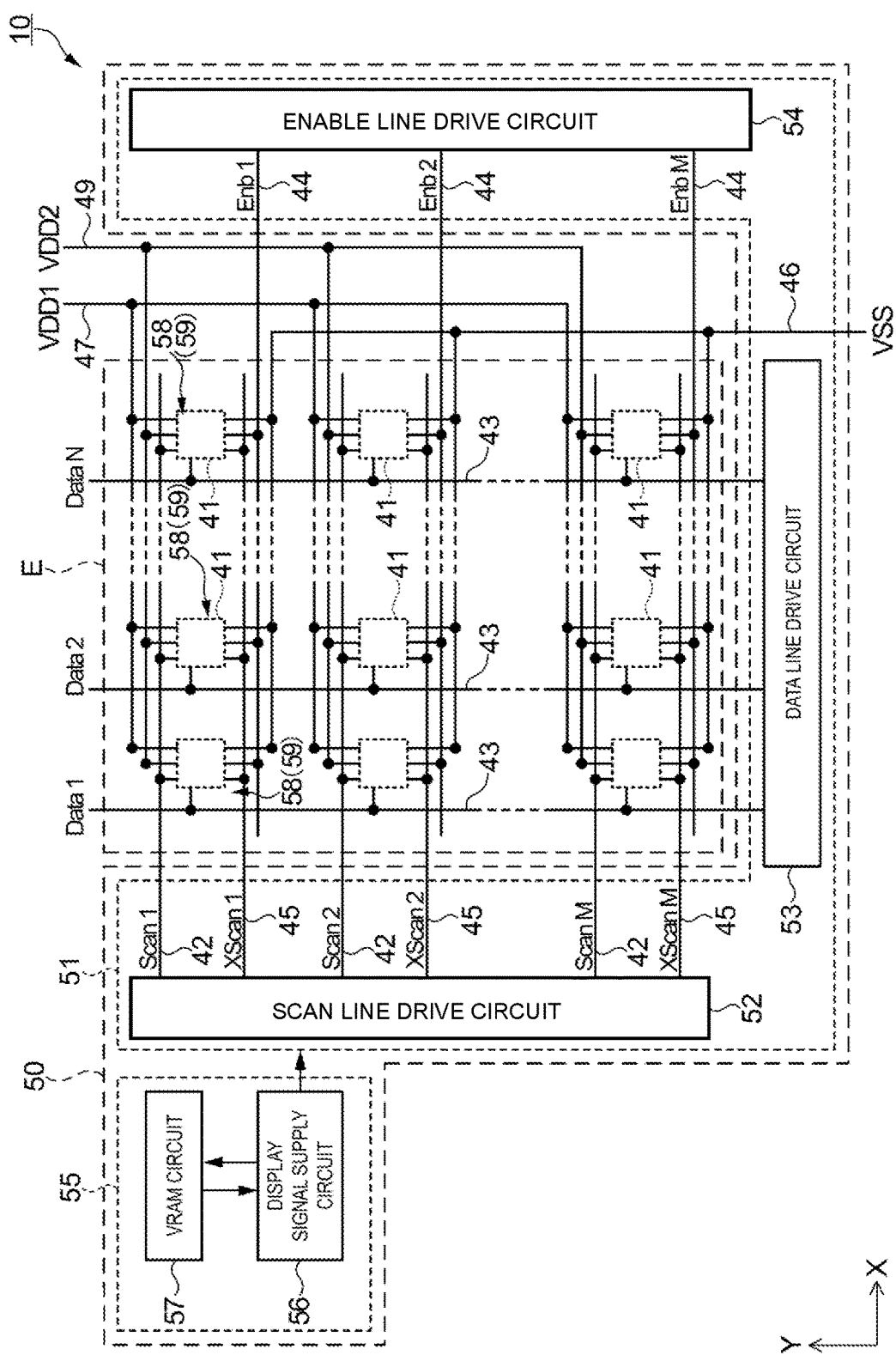
FIG. 5 is a circuit block diagram of the electro-optical device according to the Exemplary Embodiment.

A circuit configuration of the electro-optical device will now be described with reference to FIG. 5. FIG. 5 is a circuit block diagram of the electro-optical device according to Exemplary Embodiment. As illustrated in FIG. 5, the display region E of the electro-optical device 10 is provided with first scan lines 42 serving as a plurality of first row lines and data lines 43 serving as a plurality of column lines, the first scan lines 42 intersecting the data lines 43. The sub-pixels 58 are arranged in a matrix in association with intersections between the first scan lines 42 and the data lines 43. Each of the sub-pixels 58 is provided with a pixel circuit 41 including a light emitting element 20 (see FIG. 8) and serving as an element circuit.

The display region E of the electro-optical device 10 is provided with second scan lines 45 corresponding to the respective first scan lines 42 and serving as second row lines. The display region E is also provided with enable lines 44 corresponding to the respective first scan lines 42. The first scan lines 42, the second scan lines 45, and the enable lines 44 extend in the row direction (X direction). The data lines 43 extend in the column direction (Y direction).

The electro-optical device 10 includes the sub-pixels 58 arranged in the display region E in a matrix with M rows and N columns. Specifically, the display region E is provided with M first scan lines 42, M second scan lines 45, M enable lines 44, and N data lines 43. Note that M and N are each an integer of two or more and that, in Exemplary Embodiment, M=720×p and N=1280, by way of example. Here, p is an integer of one or more and indicates the number of basic colors for emission. In the description of Exemplary Embodiment, p=3, i.e., the three basic colors for emission are R, G, and B, by way of example.

The electro-optical device 10 includes a driving unit 50 outside the display region E. The driving unit 50 supplies various signals to pixel circuits 41 arranged in the display region E to display an image in the display region E using the pixels 59 (sub-pixels 58 for the three colors) as a display unit. The driving unit 50 includes a drive circuit 51 and a control unit 55. The control unit 55 supplies a display signal to the drive circuit 51. The drive circuit 51 supplies a driving signal to each of the pixel circuits 41 via the plurality of first scan lines 42, the plurality of second scan lines 45, the plurality of data lines 43, and the plurality of enable lines 44 based on the display signal.

A high potential line 47 as a first potential line, a low potential line 46 as a second potential line, and a high potential line 49 as a third potential line are further arranged in the non-display area D and the display region E; a first potential is supplied to the first potential, a second potential is supplied to the second potential, and a third potential is supplied to the third potential. Each pixel circuit 41 is supplied with the first potential through the high potential line 47, with the second potential through the low potential line 46, and with the third potential through the high potential line 49.

In Exemplary Embodiment, the first potential (V1) is a first high potential VDD1 (e.g., V1=VDD1=3.0 V), the second potential (V2) is a low potential VSS (e.g., V2=VSS=0 V), and the third potential (V3) is a second high potential VDD2 (e.g., V3=VDD2=7.0 V). Therefore, the first potential is higher than the second potential, and the third potential is higher than the first potential.

In Exemplary Embodiment, the first potential (first high potential VDD1) and the second potential (low potential VSS) form a low-voltage power supply, and the third potential (second high potential VDD2) and the second potential (low potential VSS) form a high-voltage power supply. The second potential serves as a reference potential for the low-voltage power supply and the high-voltage power supply.

In Exemplary Embodiment, the second potential line (low potential line 46), the first potential line (high potential line 47), and the third potential line (high potential line 49) extend in the row direction in the display region E, by way of example. However, the potential lines 46, 47, and 49 may extend in the column direction, or some of the potential lines 46, 47, and 49 may extend in the row direction, while the others may extend in the column direction, or the potential lines 46, 47, and 49 may be arranged like a lattice in the row and column directions.

The drive circuit 51 includes a scan line drive circuit 52 serving as a row line drive circuit, a data line drive circuit 53, and an enable line drive circuit 54. The drive circuit 51 is provided in the non-display region D (see FIG. 4). In Exemplary Embodiment, the drive circuit 51 and the pixel circuits 41 are formed on the element substrate 11 (in Exemplary Embodiment, a single-crystal silicon wafer) illustrated in FIG. 4. Specifically, the drive circuit 51, the pixel circuit 41, and the like are formed from elements, such as transistors, which are formed on the single-crystal silicon wafer.

The scan line drive circuit 52 electrically connects to the first scan lines 42 and the second scan lines 45. The scan line drive circuit 52 outputs, to each of the first scan lines 42, a first scan signal (Scan) selecting each of the pixel circuits 41 or preventing the pixel circuits 41 from being selected in the row direction. The first scan lines 42 transmit the first scan signal to the respective pixel circuits 41. In other words, the first scan signal has a selected state in which a second transistor 32 (see FIG. 8) is turned into an ON-state and an unselected state in which the second transistor 32 is turned into an OFF-state. Each of the first scan lines 42 may receive the first scan signal from the scan line drive circuit 52 and may thus be appropriately selected.

In Exemplary Embodiment, the second transistor 32 is of the N-type, and thus, the first scan signal in the selected state (a selection signal as a first signal) is High (high potential), and the first scan signal in the unselected state (a non-selection signal as a non-first signal) is Low (low potential), as described below. The potential of the selection signal is assumed to be a fourth potential (V4), and the potential of the non-selection signal is assumed to be a fifth potential (V5). The fourth potential (V4) is set to a high potential higher than or equal to the first potential (V1), and is preferably equal to the third potential (V3). The fifth potential (V5) is set to a low potential lower than or equal to the second potential (V2), and is preferably equal to the second potential (V2).

The scan line drive circuit 52 outputs, to each of the second scan lines 45, a second scan signal (XScan) turning each of the pixel circuits 41 into a signal-maintain state or a non-signal-maintain state in the row direction. The second scan lines 45 transmit the second scan signal to the respective pixel circuits 41. In other words, the second scan signal has a maintain signal serving as a second signal to turn a third transistor 33 (see FIG. 8) into the ON-state and a non-maintain signal serving as a non-second signal to turn the third transistor 33 into the OFF-state. The second scan lines 45 receive the second scan signal from the scan line drive circuit 52. The scan line drive circuit 52 may output the selection signal and the non-maintain signal during an identical period.

In Exemplary Embodiment, the third transistor 33 is of the N-type, and thus, the second scan signal in the signal-maintain state (maintain signal) is High (high potential), and the second scan signal in the non-signal-maintain state (non-maintain signal) is Low (low potential), as described below. The potential of the maintain signal is assumed to be a sixth potential (V6), and the potential of the non-maintain signal is assumed to be a seventh potential (V7). The sixth potential (V6) is set to a high potential higher than or equal to the first potential (V1), and is preferably equal to the third potential (V3). The seventh potential (V7) is set to a low potential lower than or equal to the second potential (V2), and is preferably equal to the second potential (V2).

Note that a first scan signal supplied to an ith first scan line 42 of the M first scan lines 42 is identified by representing the signal as an ith-row first scan signal Scan i. Likewise, a second scan signal supplied to an ith second scan line 45 of the M second scan lines 45 is identified by representing the signal as an ith-row second scan signal XScan i. The scan line drive circuit 52 includes a shift register circuit described below and outputs a signal shifting a shift register circuit as a shift output signal for each register. The shift output signal is used to form a first scan signal Scan 1 for a first row to a first scan signal Scan M for an Mth row supplied to the respective first scan lines 42 and a second scan signal XScan 1 for the first row to a second scan signal XScan M for the Mth row supplied to the respective second scan lines 45. A method for forming the first scan signals Scan i and the second scan signals XScan i will be described below in detail.

The data line drive circuit 53 electrically connects to the data lines 43. The data line drive circuit 53 may include a shift register circuit, a decoder circuit, a multiplexer circuit, or the like (not illustrated). The data line drive circuit 53 supplies an image signal (Data) to each of the N data lines 43 in synchronism with selection of the first scan line 42. The image signal is a digital signal having one of the first potential (in Exemplary Embodiment, VDD1) and the second potential (in Exemplary Embodiment, VSS). Note that an image signal supplied to a jth data line 43 of the N data lines 43 is identified by representing the signal as a jth-column image signal Data j.

The enable lines 44 are electrically connected to the enable line drive circuit 54. The enable line drive circuit 54 outputs enable signals to the enable lines 44 which separately correspond to the respective rows. The enable signals are specific to the rows. The enable line 44 transmits the enable signal to the pixel circuit 41 in the corresponding row. The enable signal has an active state and an inactive state. The enable lines 44 may receive the enable signal from the enable line drive circuit 54 and may be appropriately turned into the active state. The enable signal takes a potential between the second potential (low potential VSS) and the third potential (second high potential VDD2).

In Exemplary Embodiment, a fourth transistor 34 is of the P-type (see FIG. 8), and thus, the enable signal in the active state (active signal) is Low (low potential), and the enable signal in the inactive state (inactive signal) is High (high potential), as described below. When the first potential is represented as V1, the second potential is represented as V2, and the third potential is represented as V3, the active signal has a potential set lower than or equal to V3−(V1−V2) and preferably equal to the second potential (V2). The inactive signal has a potential set higher than or equal to the third potential (V3) and preferably equal to the third potential (V3).

Note that an enable signal supplied to an ith enable line 44 of the M enable lines 44 is identified by representing the signal as an ith-row enable signal Enb i. The enable line drive circuit 54 may supply, as the enable signal, the active signal (or inactive signal) to each row or simultaneously to a plurality of rows. In Exemplary Embodiment, the enable line drive circuit 54 simultaneously supplies the active signal (inactive signal) via the enable lines 44 to all the pixel circuits 41 positioned in the display region E.

The control unit 55 includes a display signal supply circuit 56 and a Video Random Access Memory (VRAM) circuit 57. The VRAM circuit 57 temporarily stores frame images. The display signal supply circuit 56 creates a display signal (an image signal, a clock signal, or the like) from the frame images temporarily stored in the VRAM circuit 57, and supplies the display signal to the drive circuit 51.

In Exemplary Embodiment, the drive circuit 51 and the pixel circuits 41 are formed on the element substrate 11 (in Exemplary Embodiment, a single-crystal silicon wafer). Specifically, the drive circuit 51 and the pixel circuits 41 include transistor elements formed on the single-crystal silicon wafer.

The control unit 55 includes a semiconductor integrated circuit formed on a substrate (not illustrated in the drawings) formed of a single-crystal semiconductor substrate different from the element substrate 11. The substrate on which the control unit 55 is formed is electrically connected by a Flexible Printed Circuit (FPC) to the external connection terminals 13 provided on the element substrate 11. Via the FPC, the display signal is supplied to the drive circuit 51 from the control unit 55.

Configuration of Pixel

Figure 6:
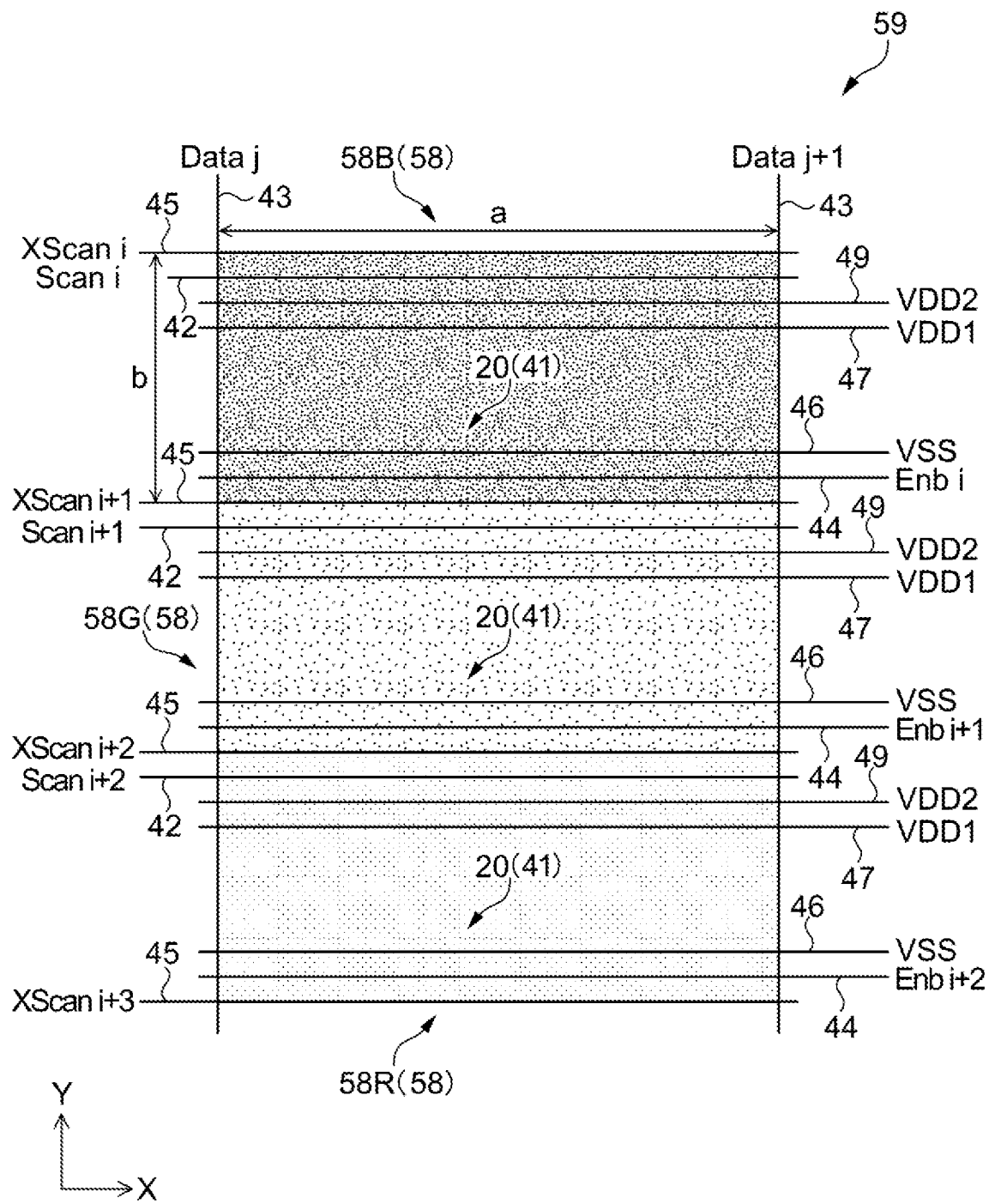
FIG. 6 is a diagram illustrating a configuration of a pixel according to the Exemplary Embodiment.

A configuration of the pixel according to Exemplary Embodiment will now be described with reference to FIG. 6. FIG. 6 is a diagram illustrating the configuration of the pixel according to Exemplary Embodiment.

As described above, the electro-optical device 10 displays images using, as a display unit, the pixel 59 including the sub-pixels 58 (sub-pixels 58B, 58G, and 58R). In exemplary Embodiment, the the sub-pixels 58 have a length a of 12 micrometers (μm) in the row direction (X direction) and a length b of 4 micrometers (μm) in the column direction (Y direction). In other words, the the sub-pixels 58 have an arrangement pitch of 12 micrometers (μm) in the row direction (X direction) and an arrangement pitch of 4 micrometers (μm) in the column direction (Y direction).

Each the sub-pixel 58 is provided with the pixel circuit 41 including the light emitting element (Light Emitting Device: LED) 20 The light emitting element 20 emits white light. The electro-optical device 10 includes the color filter (not illustrated), which transmits light emitted from the light emitting element 20. The color filter includes p kinds of color filters that correspond to p basic colors for emission. In Exemplary Embodiment, the number of the basic colors is p=3, and color filters for the colors B, G, and R are respectively arranged in association with the lithe sub-pixel s58B, the the sub-pixels 58G, and the the sub-pixels 58R.

In Exemplary Embodiment, an organic Electro Luminescence (EL) element is used as an example of the light emitting element 20. The organic EL element may have an optical resonant structure that enhances the intensity of light with a specific wavelength. That is, the sub-pixels 58B may extract a blue light component from white light emitted by the light emitting element 20. The sub-pixels 58G may extract a green light component from white light emitted by the light emitting element 20. The sub-pixels 58R may extract a red light component from white light emitted by the light emitting element 20. Note that, in Exemplary Embodiment, although the light emitting element 20 emits white light and the light is colored by a color filter (not illustrated in the drawings), the light emitting element 20 may be configured to emit light corresponding to each of B, G, and R.

Alternatively, the basic colors are not limited to B, G, and R, and the number of the basic colors may be p=4. For example, a color filter for white light (the the sub-pixels 58B with substantially no color filter) may be prepared, or color filters for other colors such as yellow and cyan may be prepared. Moreover, the light emitting element 20 may be a light emitting diode element of gallium nitride (GaN) or a semiconductor laser diode.

Digital Driving in Electro-Optical Device

Figure 7:
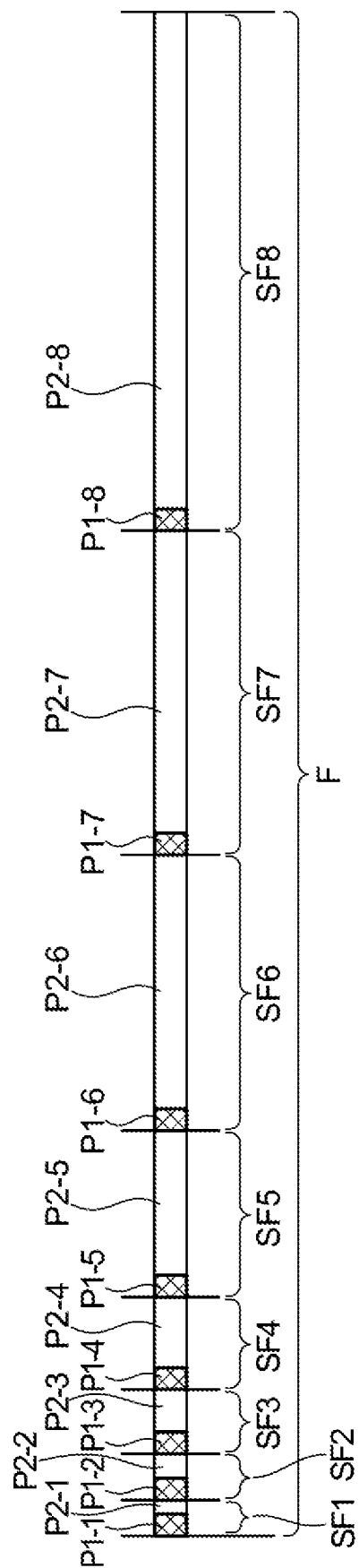
FIG. 7 is a diagram illustrating digital driving in the electro-optical device according to the Exemplary Embodiment.

An image display method based on digital driving in the electro-optical device 10 according to Exemplary Embodiment will now be described with reference to FIG. 7. FIG. 7 is a diagram illustrating digital driving in the electro-optical device according to Exemplary Embodiment.

The electro-optical device 10 displays a predetermined image in the display region E (see FIG. 4) based on the digital driving. That is, the light emitting element 20 (see FIG. 6) arranged in each tsub-pixel 58 takes one of two values for the emission state (bright state) or the non-emission state (dark state). The gray scale of a displayed image is determined by the rate of an emission period of each light emitting element 20. This is referred to as time-division driving.

As illustrated in FIG. 7, the time-division driving involves dividing one field (F) displaying one image into a plurality of sub-fields (SF) and controllably switching the light emitting element 20 between the emission state and the non-emission state for each sub-field (SF) to express gray scales. Here, $2^8=256$ gray scales are displayed based on an 8-bit time division gray scale scheme, by way of example. The 8-bit time division gray scale scheme divides one field F into eight sub-fields SF1 to SF8.

FIG. 7 illustrates that an ith sub-field of one field F is represented as SFi and that one field F includes eight sub-fields ranging from a first sub-field SF1 to an eighth sub-field SF8. Each of the sub-fields SF includes a display period P2 (P2-1 to P2-8) as a second period and, as needed, a non-display period (signal write period) P1 (P1-1 to P1-8) as a first period.

Note that the sub-fields SF1 to SF8 may hereinafter be collectively referred to as the sub-fields SF instead of being distinguished from one another and that the non-display periods P1-1 to P1-8 may hereinafter be collectively referred to as the non-display periods P1 instead of being distinguished from one another and that the display periods P2-1 to P2-8 may hereinafter be collectively referred to as the display periods P2 instead of being distinguished from one another.

The light emitting element 20 is in the emission state or the non-emission state during the display period P2 and is in the non-emission state during the non-display period (signal write period) P1. The non-display period P1 is used to allow writing of an image signal to a memory circuit 60 (see FIG. 8), adjustment of a display time, and the like. For example, when the shortest sub-field (e.g., SF1) is relatively long, the non-display period P1 (P1-1) may be omitted.

The 8-bit time division gray scale scheme sets the display period P2 (P2-1 to P2-8) for each sub-field SF such that (P2-1 for SF1):(P2-2 for SF2):(P2-3 for SF3):(P2-4 for SF4):(P2-5 for SF5):(P2-6 for SF6):(P2-7 for SF7):(P2-8 for SF8):=1:2:4:8:16:32:64:128. For example, when images are displayed using a progressive scheme with a frame frequency of 60 Hz, a single frame=a single field (F)=16.7 milliseconds (msec).

In Exemplary Embodiment, the non-display period P1 (P1-1 to P1-8) for each sub-field SF is approximately 10.8 microseconds (μsec) as described below. In this case, the followings are set: (P2-1 for SF1)=0.065 milliseconds, (P2-2 for SF2)=0.130 milliseconds, (P2-3 for SF3)=0.260 milliseconds, (P2-4 for SF4)=0.520 milliseconds, (P2-5 for SF5)=1.040 milliseconds, (P2-6 for SF6)=2.081 milliseconds, (P2-7 for SF7)=4.161 milliseconds, and (P2-8 for SF8)=8.323 milliseconds.

Here, when the duration of the non-display period P1 is represented as x seconds (sec), the shortest display period P2 (in the above-described example, the display period P2-1 for the first sub-field SF1) is represented as y seconds (sec), the number of bits for the gray scales (=the number of sub-fields SF) is represented as g, and the field frequency is represented as f (Hz), the relationship among these elements is expressed by the equation 1 below.

Equation 1

$$gx+(2g-1)y=1/f \quad (1)$$

A design rule according to Exemplary Embodiment specifies that a second inverter 62 is a typical inverter used for the drive circuit 51. In this case, a charging time $\tau_2$ for an input terminal 28 of a second inverter 62 (a delay time for each inverter) is $\tau_2$=approximately $1.05 \times 10^{-11}$ seconds (sec), and this duration corresponds to the delay time for each inverter provided in the drive circuit 51, as described below using Equation 8. As a result, the reciprocal of a maximum operating frequency (shortest duration) of the shift register circuit provided in the drive circuit 51 is approximately $1 \times 10^{-10}$ seconds, which is approximately 11 times as long as the delay time for each inverter. The shift register circuit thus has a maximum operating frequency of approximately 10 GHz. In general, a circuit operates stably at a frequency lower than or equal to half of the maximum operating frequency. However, with margins taken into account, the shift register circuit provided in the drive circuit 51 preferably has an operating frequency of approximately 2 GHz or lower.

In the present example, a selection time for a single first scan line 42 can be reduced down to approximately 20 picoseconds (pico sec) as described below in detail. However, such a reduced selection time may prevent the data line drive circuit 53 from operating. Thus, a horizontal striped arrangement is adopted in which the sub-pixels 58 are arranged in the row direction (X direction). For a matrix with M rows and N columns, M=720×3=2160 and N=1280. The data line drive circuit 53 is q phase development circuit (in Exemplary Embodiment, q=128 and 128 scan lines are arranged in parallel for each set), N/q=10 sets are selected during the selection time for the single first scan line 42. The time allotted for each set is therefore 1/10 of the selection time for the single first scan line 42.

The allotted time corresponding to a stable operating frequency of 2 GHz at which the above-described shift register circuit operates stably is the reciprocal of 1/10 of the selection time for the single first scan line, i.e., 0.5 nanoseconds (nano sec). This is allotted for the above-described set. In fact, the data line drive circuit 53 is operated using a 2-GHz clock. In this case, the selection time for the single first scan line 42 is 5 nanoseconds, and the scan line drive circuit 52 has a drive frequency of approximately 200 MHz. A single vertical period within which all the first scan lines 42 are selected is 5 (nanoseconds)×720×3=10.8 microseconds, which corresponds to the non-display period P1.

The digital driving in the electro-optical device 10 displays gray scale based on the ratio of sum of the emission periods to the total display periods P2 in the single field F. For example, black display on gray scale "0" involves preventing the light emitting element 20 from emitting light during all the display periods P2-1 to P2-8 for all the eight sub-fields SF1 to SF8. On the other hand, white display on gray scale "255" involves allowing the light emitting element 20 to emit light during all the display periods P2-1 to P2-8 for all the eight sub-fields SF1 to SF8.

Furthermore, display with an intermediate luminance on, e.g., gray scale "7", included in the 256 gray scales, involves allowing the light emitting element 20 to emit light during the display period P2-1 for the first sub-field SF1, the display period P2-2 for the second sub-field SF2, and the display period P2-3 for the third sub-field SF3, and preventing the light emitting element 20 from emitting light during the display periods P2-4 to P2-8 for the other sub-fields SF4 to SF8. In this way, the state of the light emitting element 20 may be selected to be the emission or the non-emission of the light emitting element 20 during the display period P2 as appropriate for each of the sub-fields SF constituting the single field F so as to display an intermediate gray scale.

Known electro-optical device (organic EL) devices display the gray scales based on analog driving in which the current flowing through the organic EL element is controlled depending on the gate potential of the driving transistor. Thus, possible variation in current-voltage characteristics or threshold voltage of the driving transistor may disadvantageously lead to possible variation in brightness among the pixels or deviation of the gray scales. This may result in degraded image quality. In this case, a compensation circuit may be provided that compensates for possible variation in current-voltage characteristics or threshold voltage of the driving transistor as described in JP-A-2002-287695. Then, a current flows through the compensation circuit, leading to increased power consumption.

The known organic EL devices also need to increase the capacitance of capacitive elements storing image signals, which are analog signals, in order to display more gray scales. Achieving both an increase in capacitance and an increase in resolution (miniaturization of pixels) is difficult, and charge and discharge of large capacitive elements may result in increased power consumption. In other words, the known organic EL devices disadvantageously hinder implementation of an electro-optical device capable of displaying high-resolution, high-quality images on more gray scales while keeping power consumption low.

The electro-optical device 10 according to Exemplary Embodiment is digitally driven and operates based on the two values for the ON-state and the OFF-state. The light emitting element 20 thus takes one of the two values for the emission state or the non-emission state. Thus, compared to devices based on analog driving, the electro-optical device 10 according to the Exemplary Embodiment is less likely to be affected by possible variation in current-voltage characteristics or threshold voltage of the transistor. The pixels 59 (sub-pixels 58) thus allow high-quality images to be displayed while preventing possible variation in brightness and deviation of the gray scales. The digital driving further eliminates a need to provide capacitive elements with a large capacitance, which are needed for the analog driving. This allows the pixels 59 (sub-pixels 58) to be miniaturized, thus facilitating an increase in resolution and enabling a reduction in power consumption involved in charge and discharge of large capacitive elements.

Moreover, according to the digital driving method in the electro-optical device 10, the number of gray scales can be readily increased by increasing the number g of sub-fields SF in a single field F. Even though the non-display periods P1 exist as described above, the number of gray scale is easily increased by shortening the shortest display period P2. For example, 1024gray scales are assumed to be displayed using a progressive scheme with a frame frequency f=60 Hz and with g=10. Then, when a duration x of the non-display period P1=10.8 microseconds, a duration y of the shortest display period (P2-1 for SF1)=0.016 milliseconds may be used in accordance with Equation 1.

As described below, the digital driving of the electro-optical device 10 allows the non-display period P1 as the first period to be used as a signal write period during which an image signal is written to the memory circuit 60 (or a signal rewrite period during which the image signal is rewritten). This allows 8-bit gray-scale display to be easily changed to 10-bit gray-scale display without any change in signal write period (i.e., without any change in clock frequency of the drive circuit 51).

The digital driving of the electro-optical device 10 involves rewriting the image signal in the memory circuit 60 (see FIG. 8) of each of the sub-pixels 58 changing display between the sub-fields SF or between the fields F. On the other hand, the image signal in the memory circuit 60 of each of the sub-pixels 58 making no change to display is not rewritten (is maintained), resulting in reduced power consumption. That is, this configuration allows implementation of the electro-optical device 10 capable of, e.g., decreasing energy consumption, reducing possible variation in brightness among the pixels 59 (sub-pixels 58) and deviation of the gray scales, increasing the number of gray scales available, and allowing high-resolution images to be displayed.

Example 1

Configuration of Pixel Circuit

Figure 8:
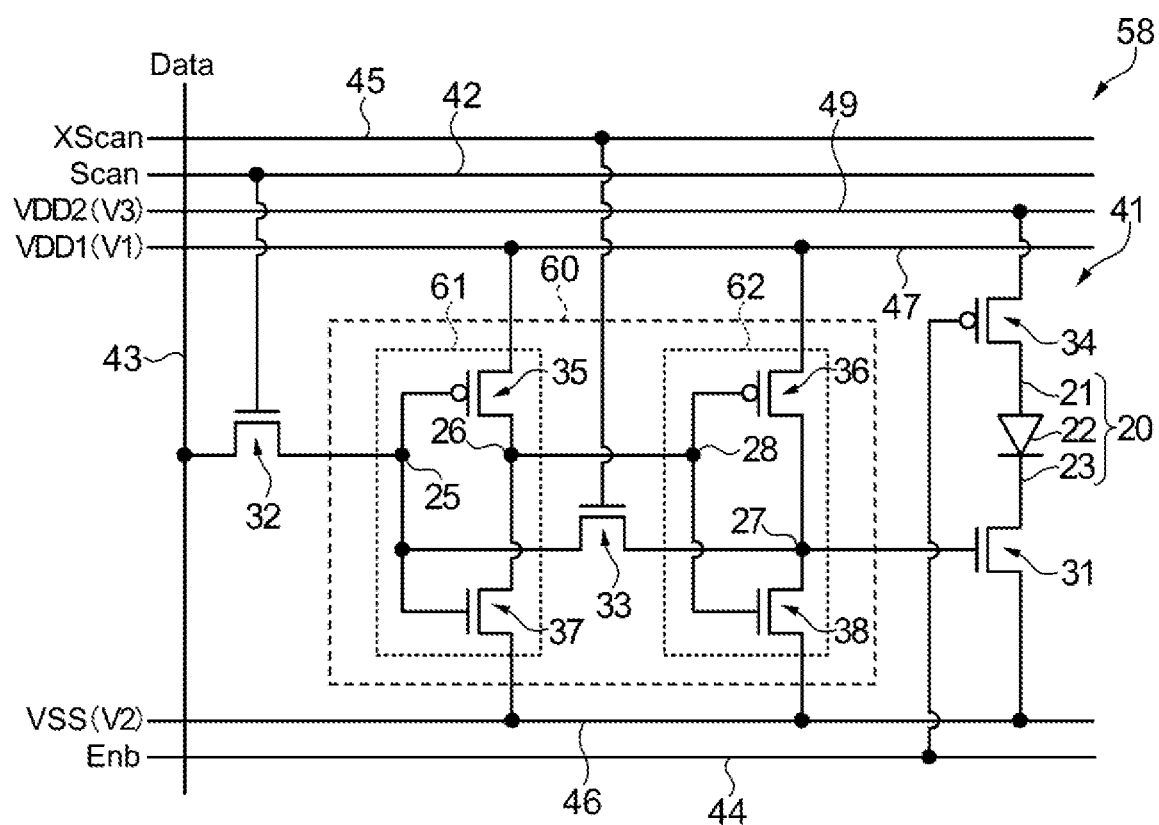
FIG. 8 illustrates a configuration of a pixel circuit according to Example 1.

A configuration of the pixel according to Example 1 will now be described with reference to FIG. 8. FIG. 8 illustrates a configuration of a pixel circuit according to Example 1.

As illustrated in FIG. 8, the pixel circuit 41 is provided for each the sub-pixels 58 arranged in association with the intersection between the first scan line 42 and the data line 43. The second scan line 45 and the enable line 44 are arranged along the first scan line 42. Each pixel circuit 41 corresponds to the first scan line 42, the second scan line 45, the data line 43, and the enable line 44.

In Example 1, each pixel circuit 41 is supplied with the first potential (VDD1) through the high potential line 47, with the second potential (VSS) through the low potential line 46, and with the third potential (VDD2) through the high potential line 49.

The pixel circuit 41 according to Example 1 includes the N-type first transistor 31, the light emitting element 20, the P-type fourth transistor 34, the memory circuit 60, and the N-type second transistor 32. Since the pixel circuit 41 includes the memory circuit 60, the electro-optical device 10 may be digitally driven. As a result, compared to the analog driving, the digital driving allows suppression of possible variation in emission luminance of the light emitting element 20 between the sub-pixels 58, thus reducing possible variation in display between the pixels 59.

The first transistor 31, the light emitting element 20, and the fourth transistor 34 are arranged in series between the third potential line (high potential line 49) and the second potential line (low potential line 46). The memory circuit 60 is arranged between the first potential line (high potential line 47) and the second potential line (low potential line 46). The second transistor 32 is arranged between the memory circuit 60 and the data line 43.

The memory circuit 60 includes a first inverter 61, a second inverter 62, and an N-type third transistor 33. The memory circuit 60 is configured to include the two inverters 61 and 62 electrically connected together in a circle to form a so-called static memory to store a digital signal, which is an image signal.

An output terminal 26 of the first inverter 61 is electrically connected to an input terminal 28 of the second inverter 62.

The third transistor 33 is arranged between an output terminal 27 of the second inverter 62 and an input terminal 25 of the first inverter 61. That is, one of a source or a drain of the third transistor 33 is electrically connected to the input terminal 25 of the first inverter 61, and the other is electrically connected to the output terminal 27 of the second inverter 62.

Electric connection between a terminal A, e.g. output or input, and a terminal B as used herein refers to a state where logic of the terminal A may be the same as logic of the terminal B. For example, the terminals A and B are electrically connected together even with a transistor, a resistive element, a diode, or the like arranged between the terminals A and B. Furthermore, "arrangement" in "arrangement of a transistor or an element between A and B" is not arrangement on a layout but on a circuit diagram.

A digital signal stored in the memory circuit 60 has one of the binary potentials of High or Low. In Example 1, setting a potential of the output terminal 26 of the first inverter 61 to Low (setting a potential of the output terminal 27 of the second inverter 62 to High) puts the light emitting element 20 in a state capable of emitting light. Setting the potential of the output terminal 26 of the first inverter 61 to High (setting the potential of the output terminal 27 of the second inverter 62 to Low) prevents the light emitting element 20 from emitting light.

In Example 1, the two inverters 61 and 62 forming the memory circuit 60 are arranged between the first potential line (high potential line 47) and the second potential line (low potential line 46) to supply the two inverters 61 and 62 with VDD1 as a first potential and with VSS as a second potential. Therefore, High corresponds to the first potential (VDD1) and Low corresponds to the second potential (VSS).

For example, with a digital signal stored in the memory circuit 60, setting the output terminal 26 of the first inverter 61 to Low causes Low to be input to the input terminal 28 of the second inverter 62, setting the potential of the output terminal 27 of the second inverter 62 to High. With the third transistor 33 in the ON-state, the output terminal 27 of the second inverter 62, when having a High potential, causes High from the output terminal 27 of the second inverter 62 to be input to the input terminal 25 of the first inverter 61. This sets the output terminal 26 of the first inverter 61 to Low. As described above, with the third transistor 33 in the ON-state, the digital signal stored in the memory circuit 60 remains stable until the next time the digital signal is rewritten.

The first inverter 61 includes a P-type fifth transistor 35 and an N-type seventh transistor 37, and has a CMOS configuration. The fifth transistor 35 and the seventh transistor 37 are arranged in series between the first potential line (high potential line 47) and the second potential line (low potential line 46). The seventh transistor 37 includes a source electrically connected to the second potential line (low potential line 46). The fifth transistor 35 includes a source electrically connected to the first potential line (high potential line 47).

The second inverter 62 includes a P-type sixth transistor 36 and an N-type eighth transistor 38, and has a CMOS configuration. The sixth transistor 36 and the eighth transistor 38 are arranged in series between the first potential line (high potential line 47) and the second potential line (low potential line 46). The sixth transistor 36 includes a source electrically connected to the first potential line (high potential line 47). The eighth transistor 38 includes a source electrically connected to the second potential line (low potential line 46).

Note that the source and the drain of an N-type transistor are determined based on a comparison of potential between the corresponding terminals and that the lower potential corresponds to the source. Note that the source and the drain of a P-type transistor are determined based on a comparison of potential between the corresponding terminals and that the higher potential corresponds to the source.

The input terminal 25 of the first inverter 61 corresponds to gates of the fifth transistor 35 and the seventh transistor 37, and is electrically connected to one of the source and the drain of the third transistor 33. The output terminal 26 of the first inverter 61 corresponds to drains of the fifth transistor 35 and the seventh transistor 37, and is electrically connected to the input terminal 28 of the second inverter 62.

The output terminal 27 of the second inverter 62 corresponds to drains of the sixth transistor 36 and the eighth transistor 38, and is electrically connected to one of the source and the drain of the third transistor 33. The input terminal 28 of the second inverter 62 corresponds to gates of the sixth transistor 36 and the eighth transistor 38 is electrically connected to output terminal 26 of the first inverter 61.

Note that although, in Example 1, both the first inverter 61 and the second inverter 62 have the CMOS configuration, the inverters 61 and 62 may each be configured to include a transistor and a resistive element. For example, one of the fifth transistor 35 and the seventh transistor 37 in the first inverter 61 may be replaced with a resistive element. One of the sixth transistor 36 and the eighth transistor 38 in the second inverter 62 may be replaced with a resistive element.

In Example 1, the light emitting element 20 is an organic EL element and includes an anode (pixel electrode) 21 and an emission portion (emission function layer) 22, and a cathode (counter electrode) 23. The emission portion 22 is configured such that excitons are formed from holes introduced from the anode 21 side and electrons introduced from the cathode 23 side and that, when the excitons disappear (when the holes and electrons are recoupled together again), a portion of the energy is emitted as fluorescence and phosphorescence, resulting in light emission.

The light emitting element 20 in the pixel circuit 41 according to Example 1 is arranged between the first transistor 31 and the fourth transistor 34. The anode 21 of the light emitting element 20 is electrically connected to a drain of the fourth transistor 34. The cathode 23 of the light emitting element 20 is electrically connected to a drain of the first transistor 31.

The first transistor 31 is a driving transistor for the light emitting element 20. Thus, once the first transistor 31 is turned into the ON-state, the light emitting element 20 is allowed to emit light. The first transistor 31 includes a gate electrically connected to the output terminal 27 of the second inverter 62 of the memory circuit 60. The first transistor 31 includes a source electrically connected to the second potential line (low potential line 46). The first transistor 31 includes a drain electrically connected to the light emitting element 20 (cathode 23). That is, the N-type first transistor 31 is arranged on a low potential side with respect to the light emitting element 20.

The fourth transistor 34 is a driving transistor controlling emission of the light emitting element 20. Turning the fourth transistor 34 into the ON-state allows the light emitting element 20 to emit light. In Example 1, the light emitting element 20 emits light as follows. The active signal is supplied to the enable line 44 as an enable signal. The fourth transistor 34 turns into the ON-state to provide the output terminal 27 of the second inverter 62 with a potential corresponding to light emission. The first transistor 31 then turns into the ON-state to cause the light emitting element 20 to emit light. This operation will be described below in further detail.

The fourth transistor 34 includes a gate electrically connected to the enable line 44. The fourth transistor 34 includes a source electrically connected to the third potential line (high potential line 49). The fourth transistor 34 includes a drain electrically connected to the light emitting element 20 (anode 21). That is, the P-type fourth transistor 34 is arranged on a high potential side with respect to the light emitting element 20.

Here, the N-type transistor is arranged on a lower potential side with respect to the light emitting element 20. The P-type transistor is arranged on a higher potential side with respect to the light emitting element 20. Since the N-type first transistor 31 and the P-type fourth transistor 34 are thus arranged with respect to the light emitting element 20, both transistors 31 and 34 can be substantially linearly operated (the substantially linear operation is simply referred to as a linear operation below). This allows possible variation in threshold voltages of the first transistor 31 and the fourth transistor 34 to be prevented from affecting display characteristics (the emission luminance of the light emitting element 20).

Since the source of the first transistor 31 is electrically connected to the second potential line (low potential line 46) and the source of the fourth transistor 34 is electrically connected to the third potential line (high potential line 49), the source potential of the first transistor 31 is fixed to the second potential, and the source potential of the fourth transistor 34 is fixed to the third potential. Thus, even with a low source-drain voltage, the first transistor 31 and the fourth transistor 34, while in the ON-state, are allowed to have increased electric conductivity. As a result, most of the potential difference between the third potential (VDD2) and the second potential (VSS) is applied to the light emitting element 20. This suppresses the adverse effect of possible variation in threshold voltages of the first transistor 31 and the fourth transistor 34, and allows the emission luminance of the light emitting element 20 among the pixels 59 (sub-pixels 58) to be made more uniform.

The second transistor 32 is arranged between the memory circuit 60 and the data line 43. One of a source and a drain of the N-type second transistor 32 is electrically connected to the data line 43, and the other is electrically connected to the input terminal 25 of the first inverter 61, i.e., the gates of the fifth transistor 35 and the seventh transistor 37. The second transistor 32 includes a gate electrically connected to the first scan line 42.

The second transistor 32 is a selection transistor for the pixel circuit 41. The second transistor 32 is turned into one of the ON-state and the OFF-state in response to a first scan signal (selection signal or non-selection signal) supplied to the first scan line 42. The second transistor 32 turns into the ON-state to electrically connect the data line 43 to the input terminal 25 of the first inverter 61 of the memory circuit 60. An image signal supplied through the data line 43 is then written to the memory circuit 60.

The third transistor 33 is arranged between input terminal 25 of the first inverter 61 and the output terminal 27 of the second inverter 62. That is, one of the source and the drain of the N-type third transistor 33 is electrically connected to the input terminal 25 of the first inverter 61 (the gates of the fifth transistor 35 and the seventh transistor 37), and the other is electrically connected to the output terminal 27 of the second inverter 62 (the drains of the sixth transistor 36 and the eighth transistor 38). The third transistor 33 includes a gate electrically connected to the second scan line 45.

The third transistor 33 is switched between the ON-state and the OFF-state in response to a second scan signal (maintain signal or non-maintain signal) supplied to the second scan line 45. The third transistor 33 turns into the ON-state to electrically connect the output terminal 27 of the second inverter 62 to the input terminal 25 of the first inverter 61. An image signal written to the memory circuit 60 is thus maintained between the first inverter 61 and the second inverter 62.

The second transistor 32 and the third transistor 33 are of the same conductivity type (N-type). The second transistor 32 and the third transistor 33 perform substantially complementary operations in response to the first scan signal supplied to the first scan line 42 and the second scan signal supplied to the second scan line 45. Complementary operations mean that the third transistor 33 is in the OFF-state when the second transistor 32 is in the ON-state and that the third transistor 33 is in the ON-state when the second transistor 32 is in the OFF-state. The substantially complementary operations include a case where the third transistor 33 is already in the OFF-state when the second transistor 32 changes from the OFF-state to the ON-state or the third transistor 33 changes from the ON-state to the OFF-state when the second transistor 32 changes from the OFF-state to the ON-state. In other words, the substantially complementary operations include a case where the third transistor 33 is not in the ON-state when the second transistor 32 turns into the ON-state.

A method will be described below in which the second transistor 32, the third transistor 33, and the fourth transistor 34 in the pixel circuit 41 according to Example 1 are controlled to write an image signal to the memory circuit 60 (or rewrite the image signal in the memory circuit 60) and to enable emission and non-emission of the light emitting element 20.

In Example 1, the first scan line 42, the second scan line 45, and the enable line 44 are independent of one another with respect to each pixel circuit 41, and thus, the second transistor 32, the third transistor 33, and the fourth transistor 34 operate independently of one another. The second transistor 32 and the third transistor 33 perform substantially complementary operations. This allows the third transistor 33 to avoid being in the ON-state when the second transistor 32 turns into the ON-state. Furthermore, the fourth transistor 34 may be inevitably kept in the OFF-state when the second transistor 32 turns into the ON-state.

When an image signal is to be written to the memory circuit 60 (or the image signal in the memory circuit 60 is to be rewritten), the inactive signal is used to turn the fourth transistor 34 into the OFF-state. When the second transistor 32 turns into the ON-state in response to the selection signal, the image signal is supplied to the memory circuit 60 (first inverter 61 and second inverter 62). The image signal is written to the first inverter 61 through the data line 43 and then to the second inverter 62 through the first inverter 61.

The non-maintain signal of the second scan signal causes the third transistor 33 to be already in the OFF-state when the second transistor 32 changes from the OFF-state to the ON-state, or changes the third transistor 33 from the ON-state to the OFF-state when the second transistor 32 changes from the OFF-state to the ON-state. Therefore, when the second transistor 32 turns into the ON-state, the third transistor 33 is not in the ON-state, thus preventing electric connection between the output terminal 27 of the second inverter 62 and the input terminal 25 of the first inverter 61.

To understand present invention clearly, we consider an imaginary circuit, in which the third transistor 33 does not exist and therefore the output terminal 27 of the second inverter 62 is connected to the input terminal 25 of the first inverter 61. When the input terminal 25 of the first inverter 61 is rewritten from Low (VSS) to High (VDD1), before a High signal is introduced to the input terminal 25 of the first inverter 61, its potential was Low, the potential of the input terminal 28 of the second inverter 62 was High, and the eighth transistor 38 was in the ON-state. Thus, when the second transistor 32 turns into the ON-state and the High (VDD1) signal is introduced from the data line 43, an electric current flows from the data line 43 (VDD1) to the low potential line 46 (VSS) through the second transistor 32 and the eighth transistor 38. This may cause an operational failure that it takes undesirably a long time to rewrite the potential of the input terminal 25 from Low to High or that the potential is not written.

We also consider another malfunction of the imaginary circuit. When the input terminal 25 of the first inverter 61 in the imaginary circuit is rewritten to change from High (VDD1) to Low (VSS), before the Low signal is introduced to the input terminal 25 of the first inverter 61, the potential of the input terminal 28 of the second inverter 62 was Low and the sixth transistor 36 was in the ON-state. Then, when the second transistor 32 turns into the ON-state and the Low signal (VSS) is introduced from the data line 43, an electric current flows from the high potential line 47 (VDD1) to the data line 43 (VSS) through the sixth transistor 36 and the second transistor 32. This may cause an operational failure that it takes undesirably a long time to rewrite the potential of the input terminal 25 from High to Low or that the potential is not rewritten.

The above-described operational failure is prevented in Example 1. When the second transistor 32 is turned into the ON-state to rewrite the image signal in the memory circuit 60, the third transistor 33, arranged between the input terminal 25 of the first inverter 61 and the output terminal 27 of the second inverter 62, is in the OFF-state, preventing the electric connection between the input terminal 25 and the output terminal 27. This allows the disadvantages as described above to be eliminated.

Furthermore, when the second transistor 32 is in the ON-state, the fourth transistor 34 is in the OFF-state. This prevents the light emitting element 20 from emitting light while the image signal is being written to the memory circuit 60. In fact, the fourth transistor 34 blocks a path from the third potential line (high potential line 49) through the light emitting element 20 and the first transistor 31 to the second potential line (low potential line 46). Thus, when the image signal is written to the memory circuit 60 (or the image signal in the memory circuit 60 is rewritten), the emission from the light emitting element 20 is stopped. This allows avoidance of the adverse effect of the emission from the light emitting element 20 during this period. The gray scales can thus be accurately expressed even when the display period P2-1 for SF1 is very short.

Note that, when the image signal is written to the memory circuit 60 (or the image signal in the memory circuit 60 is rewritten), the image signal is written to the first inverter 61 through the data line 43, and an inverted signal (complementary signal) of the image signal is written to the second inverter 62 through the first inverter 61. Thus, compared to a configuration writing, in parallel with write of the image signal to the first inverter 61 through the data line 43, an image signal (complementary signal) to the second inverter 62 through a complementary data line, the complementary signal being complementary to the signal supplied to the data line 43, the present configuration eliminates a need for the complementary data line through which the complementary signal is supplied and for a complementary transistor for the second transistor 32. Thus, compared to a configuration with the complementary data line or the complementary transistor, the present configuration facilitates miniaturization of the pixels 59 to increase the resolution, and eliminates a need for an increase in the number of wiring lines, allowing improvement of manufacturing yield. Moreover, compared to a configuration writing, in parallel with write of the image signal to the first inverter 61 through the data line 43, an image signal (complementary signal) to the second inverter 62 through a complementary data line, the complementary signal being complementary to the signal supplied to the data line 43, the configuration in Example 1 involves no current path from the data line 43 to a power supply line (high potential line 47 or low potential line 46) when the image signal is written. The image signal can thus be rewritten at high speed with reduced power consumption. This will be described below in further detail.

When the non-selection signal turns the second transistor 32 from the ON-state to the OFF-state, the write of the image signal to the memory circuit 60 (or the rewrite of the image signal in the memory circuit 60) is stopped. The second scan signal causes the third transistor 33 to be already in the ON-state when the second transistor 32 turns from the ON-state to the OFF-state, or turns the third transistor 33 from the OFF-state to the ON-state when the second transistor 32 turns from the ON-state to the OFF-state.

This causes the output terminal 27 of the second inverter 62 to be electrically connected to the input terminal 25 of the first inverter 61 to maintain, between the first inverter 61 and the second inverter 62, the image signal written to the memory circuit 60. The fourth transistor 34 remains in the OFF-state until the active signal is supplied, thus preventing the light emitting element 20 from emitting light. The maintain signal is continuously supplied to the second scan line 45 until the non-maintain signal for the next sub-field is received. This allows the image signal stored in the memory circuit 60 to be stably maintained without being inadvertently rewritten.

When the light emitting element 20 is subsequently allowed to emit light, the active signal is used to turn the fourth transistor 34 into the ON-state with the second transistor 32 remaining in the OFF-state (the third transistor 33 remaining in the ON-state). At this time, with the first transistor 31 in the ON-state, the image signal stored in the memory circuit 60 allows a current to flow through a path from the third potential line (high potential line 49) through the fourth transistor 34, the light emitting element 20, and the first transistor 31 to the second potential line (low potential line 46). The light emitting element 20 thus emits light.

When the fourth transistor 34 is in the ON-state, the second transistor 32 is in the OFF-state and the third transistor 33 is in the ON-state. The image signal stored in the memory circuit 60 is thus maintained even during emission from the light emitting element 20, and is prevented from being rewritten. Thus, a high-quality image without any display errors can be achieved.

Relationship Between Each Potential and Threshold Voltage of Transistor

As described above, in Exemplary Embodiment, the first potential (VDD1) and the second potential (VSS) form the low-voltage power supply, and the third potential (VDD2) and the second potential (VSS) form the high-voltage power supply. Such a configuration implements the electro-optical device 10 operating at high speed and providing bright display. This will be described below.

The first potential is hereinafter represented as V1. The second potential is hereinafter represented as V2. The third potential is hereinafter represented as V3. In Exemplary Embodiment, the potential difference (V1−V2=3.0 V) between the first potential (by way of example, V1=3.0 V) and the second potential (by way of example, V2=0 V), which is the voltage of the low-voltage power supply, is smaller than the potential difference (V3−V2=7.0 V) between the third potential (by way of example, V3=7.0 V) and the second potential (V2=0 V), which is the voltage of the high-voltage power supply (V1−V2<V3−V2).

Setting the potentials as described above allows the drive circuit 51 and the memory circuit 60 to be operated by the low-voltage power supply, to which the first potential and the second potential are supplied. This allows the transistors included in the drive circuit 51 and the memory circuit 60 to be miniaturized to operate at high speed. On the other hand, the high-voltage power supply, to which the third potential and the second potential are supplied, is used to cause the light emitting element 20 to emit light. This enables an increase in emission luminance of the light emitting element 20. That is, the configuration of Exemplary Embodiment allows implementation of the electro-optical device 10 including circuits operating at high speed and allowing the light emitting element 20 to emit light with increased luminance to provide bright display.

In general, light emitting elements such as organic EL elements need a relatively high-voltage (e.g., 5 V or higher) in order to emit light. However, a semiconductor device with an increased power supply voltage needs to have an increased transistor size (gate length L and gate width W) in order to prevent malfunction. This delays circuit operations. On the other hand, when the power supply voltage is reduced to allow the circuits to operate at high speed, the light emitting element 20 has a reduced emission luminance. In fact, in a configuration in which the power supply voltage used to cause the light emitting element to emit light is the same as the power supply voltage used to operate the circuits as in the related art, there is difficulty in achieving both high-luminance emission from the light emitting element and high-speed operation of the circuits.

In contrast, Exemplary Embodiment includes the low-voltage power supply and the high-voltage power supply as a power supply for the electro-optical device 10, and uses the low-voltage power supply to operate the drive circuit 51 and the memory circuit 60. Thus, each of the transistors included in the drive circuit 51 and the memory circuit 60 is sized such that L=approximately 0.5 micrometers (μm), which is smaller than L=0.75 micrometers (μm) for the first transistor 31 and the fourth transistor 34. The drive circuit 51 and the memory circuit 60 are driven with a low-voltage of V1−V2=3.0 V and can thus be operated at high speed.

The high-voltage power supply is used to cause the light emitting element 20 to emit light with a high-voltage of V3−V2=7.0 V. The light emitting element 20 can thus be allowed to emit light with increased luminance. Moreover, as described below, the first transistor 31 and the fourth transistor 34, arranged in series with the light emitting element 20, are linearly operated, thus allowing most of the high-voltage of V3−V2=7.0 V to the light emitting element 20. This enables an increase in luminance of light emitted by the light emitting element 20.

In Exemplary Embodiment, the N-type first transistor 31, which is a driving transistor, has a positive threshold voltage ($V_{th1}$, $0<V_{th1}$). When the image signal stored in the memory circuit 60 corresponds to non-emission, the output terminal 27 of the memory circuit 60 has the Low potential, i.e., the second potential (V2). Since the source of the first transistor 31 is electrically connected to the second potential line (low potential line 46), both the source potential and the gate potential of the first transistor 31 correspond to the second potential (V2). The first transistor 31 thus has a gate-source voltage $V_{gs1}$ of 0 V.

Therefore, a positive threshold voltage $V_{th1}$ (by way of example, $V_{th1}$=0.36 V) of the first transistor 31 makes the gate-source voltage $V_{gs1}$ of the N-type first transistor 31 lower than the threshold voltage $V_{th1}$. This turns the first transistor 31 into the OFF-state. Thus, the non-emission indicated by the image signal allows the first transistor 31 to be reliably turned into the OFF-state.

In Exemplary Embodiment, the potential difference between the first potential (V1) and the second potential (V2) is larger than the threshold voltage $V_{th1}$ of the first transistor ($V_{th1}$<V1−V2). When the image signal stored in the memory circuit 60 corresponds to light emission, the output terminal 27 of the memory circuit 60 has the High potential. Since High is indicative of the first potential (V1), the gate-source voltage Vgs1 of the first transistor 31 is equal to the potential difference between the first potential (V1) and the second potential (V2) ($V_{gs1}$=V1−V2=3.0 V−0 V=3.0 V).

When the potential difference between the first potential (V1) and the second potential (V2) (V1−V2=3.0 V) is larger than the threshold voltage $V_{th1}$ ($V_{th1}$=0.36 V) of the first transistor 31 ($V_{th1}$<V1−V2), the High potential of the output terminal 27 of the memory circuit 60 makes the gate-source voltage $V_{gs1}$ of the N-type first transistor 31 higher than the threshold voltage $V_{th1}$. This turns the first transistor 31 into the ON-state. Thus, the emission indicated by the image signal allows the first transistor 31 to be reliably turned into the OFF-state.

In electric connection with the first potential (VDD1) and the second potential (VSS) forming the low-voltage power supply, whether the third potential (VDD2) forming the high-voltage power supply is set higher than the first potential (VDD1) (this corresponds to Example 1) or lower than the second potential (VSS) (e.g., the third potential (VDD2) is set to VSS2, which is lower than the second potential (VSS)) is determined depending on the polarity of the first transistor 31. Specifically, for the N-type first transistor 31, the third potential is set to VDD2, which is higher than VDD1 as in Example 1.

In contrast, although not illustrated in the drawings, the P-type first transistor 31 is arranged between the light emitting element 20 and the fourth transistor 34 or between the fourth transistor 34 and the high potential line 49, which is at the third potential. In this case, the first potential is VSS1, the second potential is VDD, and the third potential is VSS2. The third potential VSS2 is lower than the first potential VSS1. The P-type first transistor 31 uses, as the low-voltage power supply, the second potential (VDD) to which the source of the transistor 31 is electrically connected, and uses the third potential (VSS2) as a drain side power supply.

In the configuration described in Exemplary Embodiment, the source potential of the first transistor 31 serves as the low-voltage power supply. Thus, like the transistors of the identical conductivity type forming the memory circuit 60 (in Exemplary Embodiment, the seventh transistor 37 and the eighth transistor 38, or for the P-type first transistor 31, the fifth transistor 35 and the sixth transistor 36), the first transistor 31 may perform a switching-on/off operation between the first potential and the second potential. In contrast, it is assumed that the first transistor 31 shares the drain with the low-voltage power supply and that the source potential of the first transistor 31 is different from the source potential of the transistors of the identical conductivity type forming the memory circuit 60. Then, the first transistor 31 is constantly in the ON-state and may disadvantageously fail to perform a switching operation. The following method is used to avoid the above-described disadvantage to allow the first transistor 31 to perform a normal switching operation: for the N-type first transistor 31, the third potential is set to VDD2, which is higher than VDD1, and for the P-type first transistor 31, the third potential is set to VSS2, which is lower than VSS1.

The fourth transistor 34, which is a control transistor, turns into the OFF-state when supplied, as an enable signal, with the inactive signal through the enable line 44 electrically connected to the gate of the fourth transistor 34. The fourth transistor 34 turns into the ON-state when supplied with the active signal. In Example 1, the fourth transistor 34 is of the P-type. Thus, as described above, the inactive signal has a high potential set higher than or equal to the third potential (V3) and preferably equal to the third potential (V3). The active signal has a low potential set lower than or equal to V3−(V1−V2) and preferably equal to the second potential (V2).

When the gate of the fourth transistor 34 is supplied with the inactive signal with the third potential (V3) through the enable line 44, both a source potential and a gate potential of the fourth transistor 34 are set to the third potential (V3). The fourth transistor 34 thus has a gate-source voltage $V_{gs4}$ of 0 V. Therefore, a negative threshold voltage $V_{th4}$ (by way of example, $V_{th4}=-0.36$ V) of the P-type fourth transistor 34 makes the gate-source voltage $V_{gs4}$ of the fourth transistor 34 higher than the threshold voltage $V_{th4}$. This turns the fourth transistor 34 into the OFF-state. Thus, the enable signal serving as an inactive signal allows the fourth transistor 34 to be reliably turned into the OFF-state.

When the fourth transistor 34 is supplied with the active signal with a potential lower than or equal to V3−(V1−V2) through the enable line 44, i.e., lower than or equal to 7.0 V−(3.0 V−0 V)=4.0 V, the gate-source voltage $V_{gs4}$ of the fourth transistor 34 is set lower than or equal to 4.0-7.0 V=−3.0 V. Therefore, the gate-source voltage $V_{gs4}$ of the fourth transistor 34 is sufficiently lower than the threshold voltage $V_{th4}$, allowing the fourth transistor 34 to be reliably kept in the ON-state while the enable signal is an active signal.

The gate-source voltage $V_{gs4}$ of the fourth transistor 34 increases with decreasing potential of the active signal. Setting the active signal to have the second potential (V2) sets the gate-source voltage $V_{gs4}$ of the fourth transistor 34 to 0 V−7.0 V=−7.0 V, thus reducing on resistance of the fourth transistor 34 in the ON-state. This makes the electro-optical device less likely to be affected by possible variation in threshold voltage of the fourth transistor 34 when the light emitting element 20 emits light.

The inactive signal is set to have the third potential (V3), which is the highest among the three existing potentials (first potential, second potential, and third potential). The active signal is set to have the second potential (V2), which is the lowest among the three existing potentials. This allows the potentials of the inactive signal and the active signal to be set without a need for a new potential (potential line). The active signal enables a sufficient increase in absolute value of the gate-source voltage of the fourth transistor 34, thus allowing for a sufficient reduction in on resistance of the fourth transistor 34 in the ON-state. This allows substantial elimination of the adverse effect, on the emission luminance of the light emitting element, of possible variation in threshold voltage of the fourth transistor 34.

That is, even with the two types of electrical systems: the low-voltage power supply and the high-voltage power supply, the configuration of Exemplary Embodiment allows the first transistor 31 and the fourth transistor 34 to be turned into the OFF-state to reliably prevent the light emitting element 20 from emitting light when the light emitting element 20 is to be turned into the non-emission state. The configuration of Exemplary Embodiment also allows the first transistor 31 and the fourth transistor 34 to be turned into the ON-state to reliably cause the light emitting element 20 to emit light when the light emitting element 20 is to be turned into the emission state.

The second transistor 32, which is a selection transistor, turns into the OFF-state when supplied, as a first scan signal, with the non-selection signal through the first scan line 42 electrically connected to the gate of the second transistor 32. The second transistor 32 turns into the ON-state when supplied with the selection signal. In Exemplary Embodiment, the second transistor 32 is of the N-type. Thus, as described above, the fifth potential (V5), which is the potential of the non-selection signal, is set to a low potential lower than or equal to the second potential (V2), and is preferably equal to the second potential (V2). The fourth potential (V4), which is the potential of the selection signal, is set to a high potential higher than or equal to the first potential (V1), and is preferably equal to the third potential (V3).

The first transistor 31 and the second transistor 32 preferably have an identical polarity. In Example 1, both the first transistor 31 and the second transistor 32 are of the N-type. Therefore, the first transistor 31 turns into the ON-state when the image signal supplied to the gate of the first transistor 31 has the High potential. The second transistor 32 turns into the ON-state when the first scan signal supplied to the gate of the second transistor 32 is a selection signal (High). The first transistor 31 is of the N-type, and thus, in Example 1, the third potential (V3) is VDD2, which is higher than the first potential (VDD1) as described above. This is because, although the High-state of the image signal corresponds to the first potential (V1), the selection signal (High) has a potential set higher than or equal to the first potential (V1) and may have the third potential (V3=VDD2).

In the description below, the selection signal has the third potential (V3), and the image signal in the memory circuit 60 is rewritten to change from Low to High. The input terminal 25 of the first inverter 61, to which one of the source and the drain of the second transistor 32 is electrically connected, is at the second potential (V2) or Low before the image signal is rewritten. When the selection signal with the third potential (V3) is supplied to the gate of the second transistor 32 through the first scan line 42, the second transistor 32 is set to have a gate-source voltage $V_{gs2}$ of V3−V2=7.0 V−0 V=7.0 V, which is higher than a threshold voltage $V_{th2}$ for the second transistor 32 (by way of example, $V_{th2}$=0.36 V). The second transistor 32 thus turns into the ON-state.

The image signal at High level (V1) is written to the memory circuit 60 through the data line 43 to gradually raise the potential of the input terminal 25 of the first inverter 61 from Low (V2) to High (V1). The gate-source voltage $V_{gs2}$ of the second transistor 32 correspondingly gradually decreases down to V3−V1=7.0 V−3.0 V=4.0 V. The gate-source voltage $V_{gs2}$ of the second transistor 32 having reached the lowest voltage, 4.0 V, is still sufficiently higher than the threshold voltage $V_{th2}$ for the second transistor 32. The second transistor 32 thus maintains low on resistance until the image signal is written to the memory circuit 60. The image signal is consequently reliably written to the memory circuit 60.

Here, the second transistor 32 is assumed be of the P-type (this second transistor is designated as the second transistor 32A), which is opposite to the type of the first transistor 31. In this case, the selection signal at Low level turns the second transistor 32A into the ON-state. It is assumed that the selection signal has the second potential (V2) and that the image signal in the memory circuit 60 is to be rewritten to change from High to Low. When the selection signal with the second potential (V2) is supplied through the first scan line 42, the second transistor 32A is set to have a gate-source voltage $V_{gs2}$ of V2−V1=0 V−3.0 V=−3.0 V, which is lower than the threshold voltage $V_{th2}$ for the second transistor 32A (by way of example, $V_{th2}$=−0.36 V). The second transistor 32A thus turns into the ON-state.

The image signal at Low level (V2) is written to the memory circuit 60 through the data line 43 to gradually lower the potential of the input terminal 25 of the first inverter 61 from High (V1). The gate-source voltage $V_{gs2}$ of the second transistor 32A correspondingly gradually rises, and before the potential of the input terminal 25 becomes the second potential (V2), reaches the threshold voltage $V_{th2}$ for the P-type second transistor 32A. The second transistor 32A thus turns into the OFF-state.

Furthermore, before the second transistor 32A turns into the OFF-state, the on resistance of the second transistor 32A increases as the gate-source voltage Vgs2 rises and approaches the threshold voltage $V_{th2}$. This leads to a need for a long time to rewrite the image signal in the memory circuit 60 or to a failure in rewrite. To avoid this, the selection signal may be set to have a lower potential. However, this results in a need for a further potential line with a potential different from the existing potentials.

When the first transistor 31 and the second transistor 32 are of the N-type and have the same polarity as in Example 1, the selection signal may be set to have the third potential, which is the highest among the first to third potentials. This allows the setting to be achieved without a need for a new potential line. When the image signal is written to the memory circuit 60 with the second transistor 32 in the ON-state, the second transistor 32 may be set to have a high gate-source voltage $V_{gs2}$. The second transistor 32 can thus maintain low on resistance even with a rise in source potential resulting from write of the image signal. This allows write of the image signal to the memory circuit 60 and rewrite of the image signal in the memory circuit 60 to be quickly and reliably achieved.

The third transistor 33 is also preferably of a conductivity type (N-type) identical to the conductivity type of the first transistor 31 and the second transistor 32. The third transistor 33 turns into the ON-state when supplied with the non-maintain signal through the second scan line 45 electrically connected to the gate of the third transistor 33. The third transistor 33 turns into the ON-state when supplied with the maintain signal. The third transistor 33 is also of the N-type. Thus, as described above, the seventh potential (V7), which is the potential of the non-maintain signal, is set to a low potential lower than or equal to the second potential (V2), and is preferably equal to the second potential (V2). The sixth potential (V4), which is the potential of the maintain signal, is set to a high potential higher than or equal to the first potential (V1), and is preferably equal to the third potential (V3).

When the selection signal with the third potential (V3) is supplied to the gate of the third transistor 33 through the second scan line 45, the third transistor 33 is set to have a gate-source voltage $V_{gs3}$ of V3−V2=7.0 V−0 V=7.0 V, which is higher than a threshold voltage $V_{th3}$ for the third transistor 33 (by way of example, $V_{th3}$=0.36 V). The third transistor 33 thus turns into the ON-state. Since the gate-source voltage $V_{gs3}$ is sufficiently higher than the threshold voltage $V_{th3}$ of the third transistor 33, the third transistor 33 maintains low on resistance. This allows the image signal written to the memory circuit 60 to be reliably maintained between the first inverter 61 and the second inverter 62.

In fact, when the first transistor 31, which is a driving transistor, is of the N-type, the third potential (V3), newly added to form the high-voltage power supply, is preferably V3=VDD2, which is higher than the first potential (V1=VDD1). The second transistor 32 and the third transistor 33 are preferably of a conductivity type identical to the conductivity type of the first transistor 31, i.e., the N-type. Thus, the third potential (V3=VDD2) is used as a gate potential of the second transistor 32 and a gate potential of the third transistor 33 to set the transistors 32 and 33 to respectively have gate-source voltages $V_{gs2}$ and $v_{gs3}$ sufficiently higher than the threshold voltages $V_{th2}$ and $V_{th3}$. This enables a reduction in on resistance of each of the transistors 32 and 33 in the ON-state.

Based on the above-described results, relationships between the threshold voltage ($V_{th1}$) of the first transistor 31 and the preferable potentials (V1, V2, and V3) according to Exemplary Embodiment are represented by Equations 2 and 3.

Equation 2

$$0 < Vth1 \quad (2)$$

Equation 3

$$V2 + Vth1 < V1 < V3 \quad (3)$$

Characteristics of Transistors

Characteristics of the transistors provided in the electro-optical device 10 according to Exemplary Embodiment will now be described. In the electro-optical device 10 according to Exemplary Embodiment, the first transistor 31 and the fourth transistor 34 are arranged in series with the light emitting element 20 between the third potential line (high potential line 49) and the second potential line (low potential line 46). The first transistor 31 preferably has an on resistance sufficiently lower than the on resistance of the light emitting element 20. The fourth transistor 34 also preferably has an on resistance sufficiently lower than the on resistance of the light emitting element 20.

The sufficiently low on resistance is a driving condition under which the first transistor 31 and the fourth transistor 34 operate linearly and specifically means that the first transistor 31 and the fourth transistor 34 have an on resistance that is 1/100 or less and preferably 1/1000 or less of the on resistance of the light emitting element 20. This allows the first transistor 31 and the fourth transistor 34 to operate linearly when the light emitting element 20 emits light.

As a result, the light emitting element 20 is subjected to most of a potential drop (in fact, the potential difference between the third potential and the second potential corresponding to the voltage of the high-voltage power supply) occurring at the first transistor 31, the fourth transistor 34, and the light emitting element 20, arranged in series. The light emitting element 20 is thus less likely to be affected by possible variation in threshold voltages of the transistors 31 and 34. That is, such a configuration enables a reduction in possible variation in threshold voltages of the first transistor 31 and the fourth transistor 34. This suppresses possible variation in brightness among the pixels 59 (sub-pixels 58) and deviation of the gray scales, allowing uniform image display to be achieved.

This is because, since the first transistor 31 and the fourth transistor 34 are set to have an on resistance that is 1/100 or less of the on resistance of the light emitting element 20, the light emitting element 20 receives 99% or more of the power supply voltage and the potential drop at the transistors 31 and 34 accounts for 1% or less of the power supply voltage. The potential drop at the transistors 31 and 34 accounts for a small percentage of 1% or less of the power supply voltage, resulting in a reduction in the adverse effect of possible variation in threshold voltages of the transistors 31 and 34 on the characteristics of light emission of the light emitting element 20.

In Example 1, series resistance of the first transistor 31 and the fourth transistor 34 is approximately 1/1000 or less of the on resistance of the light emitting element 20. In this case, the light emitting element 20 receives approximately 99.9% of the power supply voltage, and the potential drop at the transistors 31 and 34 accounts for approximately 0.1% of the power supply voltage. A variation in threshold voltage of each of the transistors 31 and 34 thus produces a substantially negligible adverse effect on the emission characteristics of the light emitting element 20.

The ON-resistance of a transistor depends on the polarity, gate length, gate width, threshold voltage, gate-insulating film thickness, and the like of the transistor. In Exemplary Embodiment, the polarity, gate length, gate width, threshold voltage, gate-insulating film thickness, and the like of each of the first transistor 31 and the fourth transistor 34 are preferably set to make the on resistance of each of the first transistor 31 and the fourth transistor 34 sufficiently lower than the on resistance of the light emitting element 20. This will be described below.

In Exemplary Embodiment, an organic EL element is used as the light emitting element 20, and the transistors such as the first transistor 31 and the fourth transistor 34 are formed on the element substrate 11 formed from a single-crystal silicon water. The current-voltage characteristics of the light emitting element 20 are generally represented by Equation 4.

Equation 4

$$I_{EL} = L_{EL} W_{EL} J_0 \left\{ \exp\left(\frac{V_{EL} - V_0}{V_{tm}}\right) - 1 \right\} \quad (4)$$

In Equation 4, $I_{EL}$ is a current passing through the light emitting element 20, $V_{EL}$ is voltage applied to the light emitting element 20, $L_{EL}$ is a length of the light emitting element 20 in plan view, $W_{EL}$ is a width of the light emitting element 20 in plan view, $J_0$ is a current density coefficient for the light emitting element 20, $V_{tm}$ is a coefficient voltage (a constant voltage at a constant temperature) of the light emitting element 20 depending on temperature, and $V_0$ is a threshold voltage of emission from the light emitting element 20.

Note that, when the voltage of the high-voltage power supply is represented as $V_P$ and the potential drop at the first transistor 31 and the fourth transistor 34 is represented as $V_{ds}$, $V_{EL} V_{ds} = V_P$. Furthermore, in Exemplary Embodiment, $L_{EL}=11$ micrometers (μm), $W_{EL}=3$ micrometers (μm), $J_0=1.449$ milliamperes per square centimeter (mA/cm²), $V_0=3.0$ volts (V), and $V_{tm}=0.541$ volts (V).

When the first transistor 31, the fourth transistor 34, and the like are represented as an ith transistor (i is 1 or 4), a drain current $I_{dsi}$ of the transistor is expressed by Equation 5.

Equation 5

$$I_{dsi} = \frac{W_i}{L_i} \cdot \frac{\varepsilon_0 \varepsilon_{ox}}{t_{oxi}} \cdot \mu_i (V_{gsi} - V_{thi}) V_{dsi} \equiv Z_i (V_{gsi} - V_{thi}) V_{dsi} \quad (5)$$

In Equation 5, $W_i$ is a gate width of the ith transistor, $L_i$ is a gate length of the ith transistor, $\varepsilon_0$ is a dielectric constant of a vacuum, $\varepsilon_{ox}$ is a dielectric constant of a gate-insulating film, $t_{oxi}$ is a thickness of the gate-insulating film, $\mu_i$ is a mobility of the ith transistor, $V_{gs}$ is a gate voltage, $V_{dsi}$ is a potential drop at the ith transistor corresponding to a drain voltage, and $V_{thi}$ is a threshold voltage of the ith transistor.

In Example 1, $W_i=1.0$ micrometer (μm), $W4=1.25$ micrometers (μm), $L_i=L4=0.75$ micrometers (μm), $t_{ox}=20$ nanometers (nm), $\mu_i=240$ square centimeters per volt per second (cm²/V·s), $\mu_4=150$ square centimeters per volt per second (cm²/V·s), $V_{thi}=0.36$ V, $V_{th4}=0.36$ V, $V_{gs1}=V1-V2=3.0$ V, and $V_{gs4}=V2-V3=-7.0$ V.

Note that, when the first transistor 31 and the fourth transistor 34 are linearly operated, a potential drop $V_{ds}$ at the transistors 31 and 34 is used to approximate the current-voltage characteristics of the light emitting element 20 in the vicinity of $V_{ds}=0$ V as represented by Equation 6.

Equation 6

$$I_{EL} = -kV_{ds} + I_0 \quad (6)$$

In Example 1, a coefficient k defined by Equation 6 is $k=1.39\times10^{-6}$ ($\Omega^{-1}$). $I_0$ is a current obtained when all of a voltage $V_P$ of the high-voltage power supply is applied to the light emitting element 20, and $I_0=7.82\times10^{-7}$ (A).

Based on Equation 4 and Equation 6, a voltage at which the light emitting element 20 emits light is a voltage leading to $I_{EL}=I_{ds}$. In Exemplary Embodiment, $V_P=V3-V2=7.0$ V, $V_{ds1}=0.0053$ V, $V_{ds4}=0.0027$ V, $V_{EL}=6.9920$ V, $I_{EL}=I_{ds1}=I_{ds4}=7.672\times10^{-7}$ A. In this case, the first transistor 31 had an on resistance of $6.859\times10^3 \Omega$, the fourth transistor 34 had an on resistance of $3.491\times10^3 \Omega$ and the light emitting element 20 had an on resistance of $9.113\times10^6 \Omega$.

Therefore, the on resistance of the first transistor 31 was approximately 1/1300 of the on resistance of the light emitting element 20, which is lower than 1/1000 of the on resistance of the light emitting element 20, and the on resistance of the fourth transistor 34 was approximately 1/2600 of the on resistance of the light emitting element 20, which is lower than 1/1000 of the on resistance of the light emitting element 20. This means that most of the voltage of the high-voltage power supply was successfully applied to the light emitting element 20.

Under these conditions, even when the threshold voltage of the transistor fluctuates by 30% or more (in Example 1, even when $V_{th1}$ or $V_{th4}$ fluctuates from 0.29 V to 0.53 V), $V_{EL}$=6.99 V, $I_{EL}=I_{ds1}=I_{ds4}$=7.67×10$^{-7}$ A are invariant. The threshold voltage of the transistor normally involves no such variation. Therefore, when the fourth transistor 34 is set to have an on resistance that is approximately ¹⁄₁₀₀₀ of the on resistance of the light emitting element 20, possible variation in threshold voltages for the first transistor 31 and the fourth transistor 34 is substantially prevented from affecting the emission luminance of the light emitting element 20.

For approximation, Equation 5 and Equation 6 are simultaneously set up and $I_{EL}=I_{dsi}$ is set to allow expression of the adverse effect, on the current $I_{EL}=I_{dsi}$, of possible variation in threshold voltage of the ith transistor, using Equation 7.

Equation 7

$$\left(1 + \frac{k}{Z_i(V_{gsi} - V_{thi})}\right)I_{EL} = I_0 \qquad (7)$$

Since $I_0$ represents the current obtained when all of the voltage $V_P$ of the high-voltage power supply is applied to the light emitting element 20, the gate voltage $V_{gs1}$ or $Z_i$ may be increased to cause the light emitting element 20 to emit light in the vicinity of the power supply voltage $V_P$ as seen in Equation 7. In other words, a larger value of $Z_i$ makes the emission luminance of the light emitting element 20 less likely to be affected by possible variation in threshold voltage of the transistor.

In Example 1, $k/Z_1$ and $k/Z_4$ have small values: $k/Z_1$=2.52×10$^{-2}$ V and $k/Z_4$=3.22×10$^{-2}$. Thus, the second term of the left side of Equation 7 is $k/(Z_1(V_{gs1}-V_{th1}))$=0.01 for the first transistor 31 and $k/(Z_4(V_{gs4}-V_{th4}))$=0.005 for the fourth transistor 34, which are less than approximately 0.01 (1%). As a result, the current (emission luminance) obtained during emission from the light emitting element 20 was not substantially affected by the threshold voltages of the transistors 31 and 34. That is, the value of $k/(Z_i(V_{gsi}-V_{thi}))$ is set less than approximately 0.01 (1%) to allow substantial elimination of the adverse effect, on the emission luminance of the light emitting element 20, of possible variation in threshold voltages ($V_{th1}$ and $V_{th3}$) of the transistors 31 and 34

In Equation 7, k and $Z_i$ are defined by Equation 5 and Equation 6. Note that the P-type transistor has a lower mobility $\mu_i$ than the N-type transistor, and thus, W (in Exemplary Embodiment, $W_3$) of the P-type transistor is set larger than W (in Exemplary Embodiment, $W_1$) of the N-type transistor to make $Z_4$ of the P-type fourth transistor 34 substantially equivalent to $Z_1$ of the N-type first transistor 31.

The gate voltage $V_{gsi}$ is preferably set as high as possible to cause the light emitting element 20 to emit light in the vicinity of the power supply voltage $V_P$. In Example 1, the enable signal (active signal) in an active state is set to have the second potential (V2) instead of the third potential (V3), corresponding to the source potential of the fourth transistor 34, to increase the gate-source voltage $V_{gs4}$ of the fourth transistor 34.

In Example 1, the gate width $W_1$ of the first transistor 31 arranged in series with the light emitting element 20 is larger than the gate width $W_3$ of the third transistor 33 included in the memory circuit 60. By way of example, $W_1$=1.0 micrometer (μm) and $W_3$=0.5 micrometers (μm). Thus, when the first transistor 31 turns into the ON-state to cause the light emitting element 20 to emit light, a large current may be passed through the light emitting element 20. This enables an increase in emission luminance of the light emitting element 20. The first transistor 31 has a reduced on resistance in the ON-state, allowing suppression of possible variation in emission luminance caused by possible variation in threshold voltage of the first transistor 31 when the light emitting element 20 emits light. The third transistor 33 serves to keep the potential difference between the output terminal 27 of the second inverter 62 and the input terminal 25 of the first inverter 61 small during emission from the light emitting element 20. This eliminates a need to pass a large current through the third transistor 33. The third transistor 33 sufficiently fulfills the functions even when the gate width $W_3$ of the third transistor 33 is set smaller than the gate width $W_i$ of the first transistor 31. This enables the memory circuit 60 to stably maintain image signals to allow high-resolution, high-quality images to be displayed.

In Example 1, the first transistor 31 has a gate length $L_1$ larger than a gate length $L_3$ of the third transistor 33. By way of example, $L_1$=0.75 micrometers (μm) and $L_3$=0.5 micrometers (μm). This allows a higher voltage to be applied to the light emitting element 20 arranged in series with the first transistor 31 than to the memory circuit 60 including the third transistor 33. In spite of the high-voltage applied to the light emitting element 20 and the first transistor 31, the gate length $L_1$ of the first transistor 31 is large enough to make the first transistor 31 less likely to be destroyed by the high-voltage. On the other hand, the gate length L3 of the third transistor 33 included in the memory circuit 60 is smaller than the gate length $L_1$ of the first transistor 31. The third transistor 33 may thus be made smaller than the first transistor 31 to miniaturize the memory circuit 60. This enables the memory circuit 60 to operate at high speed, while allowing the light emitting element 20 to emit light at high-voltage.

In the electro-optical device 10 according to Exemplary Embodiment, the fifth transistor 35 and the seventh transistor 37 forming the first inverter 61 included in the memory circuit 60 and the sixth transistor 36 and the eighth transistor 38 forming the second inverter 62 are arranged between the first potential line (high potential line 47) and the second potential line (low potential line 46).

The transistors 35, 36, 37, and 38 operating using the low-voltage power supply involve a lower applied voltage than the first transistor 31 and the fourth transistor 34. This enables a reduction in gate length and correspondingly in gate width. The area of a channel formation region may thus be reduced. That is, the memory circuit 60 may be miniaturized. The reduced area of the channel formation region of each of the transistors 35, 36, 37, and 38 contributes to reducing transistor capacitance. This allows charge and discharge to be quickly achieved. That is, the present configuration enables quick write of the image signal to the memory circuit 60 and quick rewrite of the image signal in the memory circuit 60.

In Exemplary Embodiment, the fifth transistor 35, the sixth transistor 36, the seventh transistor 37, and the eighth transistor 38 included in the memory circuit 60 have a smaller gate length as viewed in plan than the first transistor 31 and the fourth transistor 34 arranged in series with the light emitting element 20.

The fifth transistor 35, the sixth transistor 36, the seventh transistor 37, and the eighth transistor 38 have a gate length of $L_5=L_6=L_7=L_8=0.5$ micrometers (μm) as viewed in plan. As described above, the first transistor 31 and the fourth transistor 34 have a gate length of $L_1=L_4=0.75$ micrometers (μm) as viewed in plan, and thus, the fifth transistor 35, the sixth transistor 36, the seventh transistor 37, and the eighth transistor 38 are smaller in gate length.

In Exemplary Embodiment, the fifth transistor 35, the sixth transistor 36, the seventh transistor 37, and the eighth transistor 38 included in the memory circuit 60 are each smaller than each of the first transistor 31 and the fourth transistor 34 in the area of the channel formation region as viewed in plan. The area of the channel formation region of the transistor is substantially equal to the area of the gate electrode arranged opposite to the transistor, i.e., the product of the gate length and the gate width as viewed in plan.

The N-type seventh transistor 37 and eighth transistor 38 have a gate width of $W_7=W_8=0.5$ micrometers (μm). The P-type fifth transistor 35 and sixth transistor 36 have a gate width of $W_5=W_6=0.75$ micrometers (μm). The seventh transistor 37 and the eighth transistor 38 are each $0.5\times0.5=0.25$ square micrometers (μm²) in the area of the channel formation region. The fifth transistor 35 and the sixth transistor 36 are each $0.5\times0.75=0.375$ square micrometers (μm²) in the area of the channel formation region.

Since the first transistor 31 has a gate width $W_1=1.0$ micrometer (μm) as described above, the first transistor 31 is $0.75\times1.0=0.75$ square micrometers (μm²) in the area of the channel formation region. Furthermore, since the fourth transistor 34 has a gate width $W_4=1.25$ micrometer (μm), the fourth transistor 34 is $0.75\times1.25=0.9375$ square micrometers (μm²) in the area of the channel formation region. The fifth transistor 35, the sixth transistor 36, the seventh transistor 37, and the eighth transistor 38 are each smaller in the area of the channel formation region.

As described above, in Exemplary Embodiment, the transistors 35, 36, 37, and 38 included in the memory circuit 60 are each smaller in the area of the channel formation region than each of the transistors 31 and 34 arranged in series with the light emitting element 20. This allows the memory circuit 60 to be miniaturized to operate at high speed, while enabling the light emitting element 20 to emit light with high luminance.

Driving Method of Pixel Circuit

Figure 9:
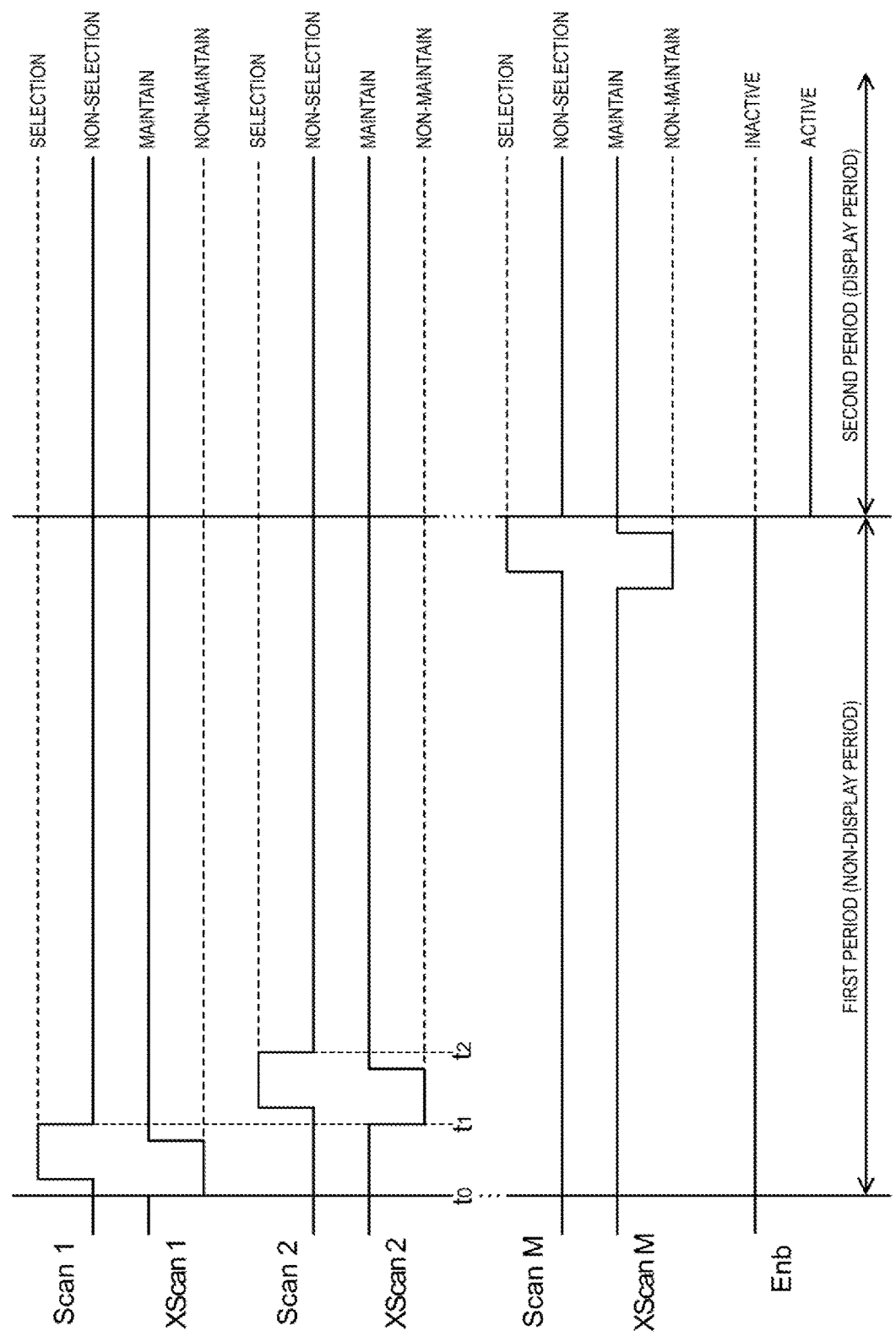
FIG. 9 is a diagram illustrating an example of a driving method for the pixel circuit according to Example 1.

A driving method of the pixel circuit in the electro-optical device 10 according to Exemplary Embodiment will now be described with reference to FIG. 9. FIG. 9 is a diagram illustrating an example of the driving method for the pixel circuit according to Example 1. In FIG. 9, the horizontal axis is a time axis including a first period (non-display period) and a second period (display period). The first period corresponds to P1 (P1-1 to P1-8) illustrated in FIG. 7. The second period corresponds to P2 (P2-1 to P2-8) illustrated in FIG. 7. Note that time $t_0$, time $t_1$, and time $t_2$ on the time axis correspond to time $t_0$, time $t_1$, and time $t_2$ illustrated in FIG. 12 described below.

On the vertical axis in FIG. 9, Scan 1 to Scan M each indicate the first scan signal supplied to a corresponding one of the M first scan lines 42 (see FIG. 5) in the first to the Mth rows. The first scan signal includes a first scan signal in a selected state (selection signal) and a first scan signal for an unselected state (non-selection signal). On the vertical axis in FIG. 9, XScan 1 to XScan M each indicate the second scan signal supplied to a corresponding one of the M second scan lines 45 (see FIG. 5) in the first to the Mth rows. The second scan signal includes a second scan signal in the selected state (maintain signal) and a second scan signal in the unselected state (non-maintain signal). Furthermore, Enb represents the enable signal supplied to the enable line 44 (see FIG. 5). The enable signal includes an enable signal in the active state (active signal) and an enable signal in the inactive state (inactive signal).

As described with reference to FIG. 7, a single field (F) displaying a single image is divided into a plurality of sub-fields (SF). Each of the sub-fields (SF) includes a first period (non-display period) and a second period (display period) starting when the first period ends. The first period (non-display period) is a signal write period. During the first period an image signal is written to the memory circuit 60 (see FIG. 8) in each of the pixel circuits 41 (see FIG. 5) positioned in the display region E. The second period (display period) is a period during which the light emitting element 20 (see FIG. 8) in each of the pixel circuits 41 positioned in the display region E may emit light.

As illustrated in FIG. 9, all the enable lines 44 in the electro-optical device 10 according to Exemplary Embodiment are supplied with the inactive signal as an enable signal during the first period (non-display period). When the inactive signal is supplied to the enable line 44, the fourth transistor 34 (see FIG. 8) turns into the OFF-state, thus preventing light emission from the light emitting elements 20 in all the pixel circuits 41 positioned in the display region E.

In each sub-field (SF), the selection signal (High) is supplied to one of the first scan lines 42 as a first scan signal during the first period. When the selection signal is supplied to the first scan line 42, the second transistor 32 (see FIG. 8) in the selected pixel circuit 41 turns from the OFF-state to the ON-state. Thus, in the selected pixel circuit 41, the image signal is written to the first inverter 61 from the data line 43 (see FIG. 8) and then to the second inverter 62 from the first inverter 61. In this way, the image signal is written to and stored in the memory circuit 60 in each pixel circuit 41 during the first period.

Furthermore, in Exemplary Embodiment, in each sub-field (SF), the maintain signal (High) as a second scan signal is supplied to the second scan line 45 during the first period other than the image signal write period. During the image signal write period in the first period the non-maintain signal (Low) as a second scan signal is supplied to the pixel circuit 41 that is selected. The image signal write period is the period during which the selection signal is supplied to the first scan line 42. In the electro-optical device 10 according to Exemplary Embodiment the selection signal and the non-maintain signal are output simultaneously to the pixel circuit 41 during the identical period. The selection signal and the non-maintain signal are complementary to each other.

The pixel circuit 41 selected by the selection signal may therefore operate as follows: while the non-maintain signal is supplied to the second scan signal 45 to turn the third transistor 33 into the OFF-state, the second transistor 32 is turned into the ON-state to write the image signal to the first inverter 61 and the second inverter 62. This causes blocking of the electric connection between the output terminal 27 of the second inverter 62 and the input terminal 25 of the first inverter 61. Thus, write of the image signal to the memory circuit 60 (or rewrite of the image signal in the memory circuit 60) can be quickly and reliably achieved.

As described below in detail, Example 1 allows adjustment of a pulse width of the selection signal and a timing to supply the selection signal, and a pulse width of the non-maintain signal and a timing to supply the non-maintain signal. In the example illustrated in FIG. 9, the pulse width of the selection signal is the same as the pulse width of the non-maintain signal, whereas the timing to supply the selection signal is different from the timing to supply the non-maintain signal. A timing to switch from the selection signal to the non-selection signal is also different from a timing to switch from the non-maintain signal to the maintain signal. That is, for the selected pixel circuit 41, the non-maintain signal is supplied to the second scan line 45 before the selection signal is supplied to the first scan line 42. The maintain signal is supplied to the second scan line 45 before the non-selection signal is supplied to the first scan line 42.

Thus, in the pixel circuit 41 selected by the selection signal, the non-maintain signal changes the third transistor 33 (see FIG. 8) from the ON-state to the OFF-state before the second transistor 32 changes from the OFF-state to the ON-state. This causes blocking of the electric connection between the output terminal 27 of the second inverter 62 and the input terminal 25 of the first inverter 61 before the image signal is written to the first inverter 61 through the data line 43. Thus, in the pixel circuit 41 selected by the selection signal, write of the image signal to the memory circuit 60 (or rewrite of the image signal in the memory circuit 60) can be quickly and reliably achieved.

Any timings may be used to switch a first scan signal from the selection signal to the non-selection signal and to switch a second scan signal from the non-maintain signal to the maintain signal. However, as described below, approximately 8 picoseconds are desirably provided for a period when the selection signal is supplied to the first scan line 42, while the non-maintain signal is supplied to the second scan line 45 (the period when the second transistor 32 is in the ON-state, while the third transistor 33 is in the OFF-state).

Note that the selection signal is not supplied to the first scan line 42 before the non-maintain signal is supplied to the second scan line 45. when the second transistor 32 changes into the ON-state while the third transistor 33 is in the ON-state, the output terminal 27 of the second inverter 62 is electrically connected to the input terminal 25 of the first inverter 61, i.e., the resultant state is similar to a state resulting in a configuration lacking the third transistor 33. This may disadvantageously delay or preclude rewrite of the image signal in the memory circuit 60.

When write of the image signal to the memory circuit 60 (or rewrite of the image signal in the memory circuit 60) ends, the non-selection signal (Low) is supplied to the first scan line 42 in the selected pixel circuit 41. In Example 1, for the selected pixel circuit 41, the maintain signal (High) is supplied to the second scan line 45 before the non-selection signal is supplied to the first scan line 42. Therefore, in the pixel circuit 41 selected by the selection signal, the third transistor 33 changes the third transistor 33 from the OFF-state to the ON-state before the second transistor 32 changes from the ON-state to the OFF-state. Thus, in the selected pixel circuit 41, the output terminal 27 of the second inverter 62 is electrically connected to the input terminal 25 of the first inverter 61 to maintain, between the first inverter 61 and the second inverter 62, the image signal written to the memory circuit 60.

During the second period (display period), all the enable lines 44 are supplied with the active signal as an enable signal. When the active signal is supplied to each enable line 44, the fourth transistor 34 is turned into the ON-state, thus allowing each light emitting element 20 in all of the pixel circuits 41 arranged in the display region E to emit light. During the second period, all the first scan lines 42 are supplied, as a first scan signal, with the non-selection signal turning the second transistor 32 into the OFF-state. All the second scan lines 45 are supplied, as a second scan signal, with the maintain signal turning the third transistor 33 into the ON-state. This causes the image signal written to the memory circuit 60 in each pixel circuit 41 in the sub-field (SF) to be maintained in the memory circuit 60.

As described above, in Exemplary Embodiment, the first period (non-display period) and the second period (display period) may be independently controlled, thus enabling gray-scale display based on digital time division driving. In addition, the second period can be set to be shorter than the first period, and thus an image with a larger number of gray scales can be displayed.

Furthermore, the enable signal supplied to the enable lines 44 is shared among the plurality of pixel circuits 41, such that driving the electro-optical device 10 can be facilitated. Specifically, digital driving with no first period needs to be very complicated in order to make the emission period shorter than a single vertical period when all the first scan lines 42 are selected. In contrast, in Exemplary Embodiment, the enable signal supplied to the enable line 44 is shared by the plurality of pixel circuits 41. Thus, even with a sub-field (SF) in which the emission period is shorter than a single vertical period when all the first scan lines 42 are selected, the electro-optical device 10 can be easily driven simply by shortening the second period.

Scan Line Drive Circuit

Figure 10:
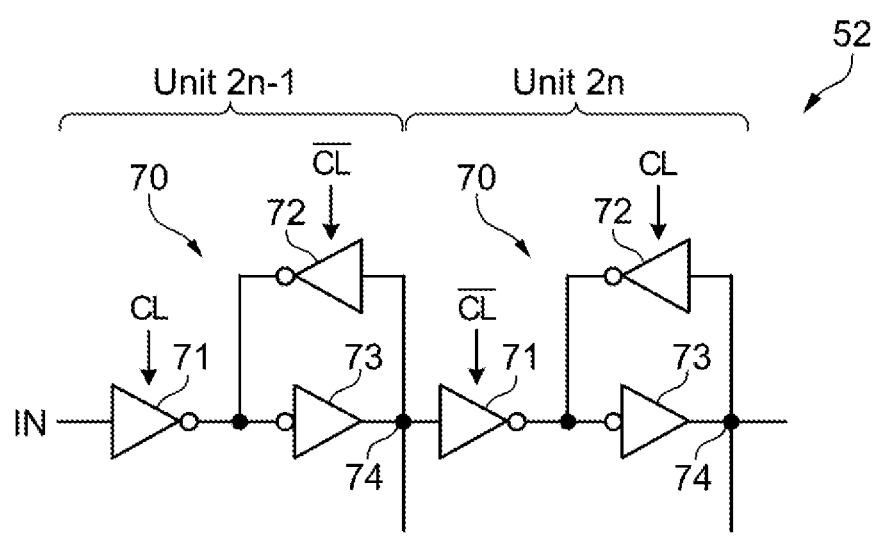
FIG. 10 is a block diagram illustrating a configuration of a scan line drive circuit according to Example 1.
Figure 11:
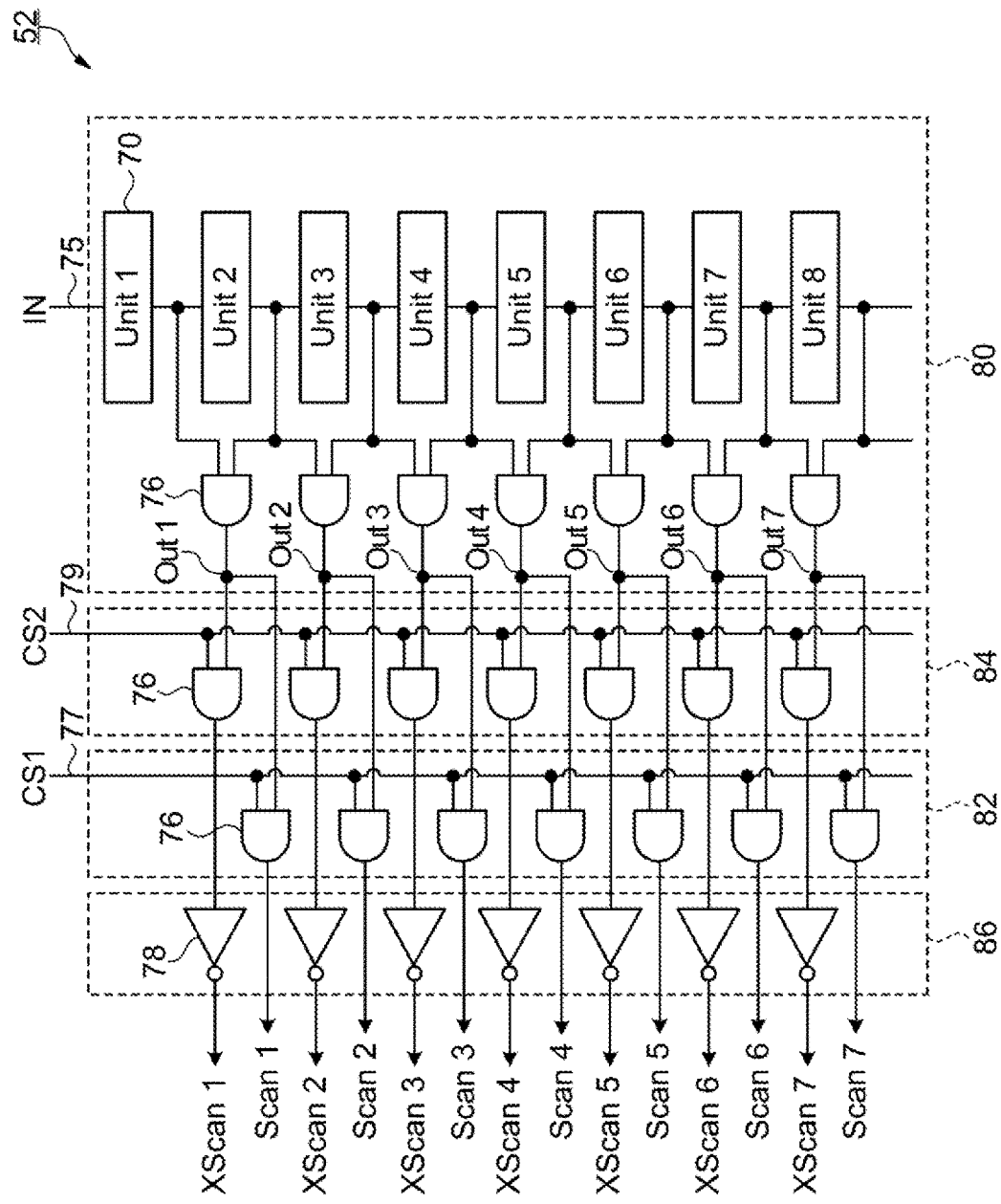
FIG. 11 is a block diagram illustrating the configuration of the scan line drive circuit according to Example 1.

A configuration of the scan line drive circuit 52 and a method for forming, by the scan line drive circuit 52, the first scan signal and the second scan signal will now be described with reference to FIGS. 10 to 12. The configuration of the scan line drive circuit according to Example 1 will first be described. FIG. 10 and FIG. 11 are block diagrams illustrating the configuration of the scan line drive circuit according to Example 1.

As illustrated in FIG. 10, the scan line drive circuit 52 includes a shift register circuit by way of example. The shift register circuit is configured using a plurality of Unit circuits 70 arranged in series. FIG. 10 illustrates the Unit circuit 70 in a 2n−1th stage (n is an integer of one or more) and the Unit circuit 70 in a 2nth stage, which are included in the plurality of Unit circuits 70 included in the scan line drive circuit 52 according to Exemplary Embodiment.

Each Unit circuit 70 includes a clocked inverter 71, a clocked inverter 72, and an inverter 73. In each Unit circuit 70, the clocked inverter 71 is arranged in series with each of the clocked inverter 72 and the inverter 73, which are annularly connected together. An output terminal of the inverter 73 corresponds to an output terminal 74 of the Unit circuit 70. The Unit circuit 70 in the 2n−1th stage is hereinafter also referred to as Unit 2n−1. The Unit circuit 70 in the 2nth stage is hereinafter also referred to as Unit 2n. Furthermore, an input signal supplied to the Unit circuit 70 is referred to as IN.

Operation of the Unit circuit 70 will be described with reference to FIG. 10. The clocked inverters 71 and 72 receive a scan clock signal CL or a scan clock inverted signal CL bar (in FIG. 10, the signal is denoted by CL over which a horizontal bar is placed) that is an inverted signal of the scan clock signal CL For example, when the scan clock signal CL is High, the scan clock inverted signal CL bar is Low. When the scan clock signal CL is Low, the scan clock inverted signal CL bar is High. In Exemplary Embodiment, the clocked inverters 71 and 72 operate as inverters when the scan clock signal CL or the scan clock inverted signal CL bar is High, and do not operate when the scan clock signal CL or the scan clock inverted signal CL bar is Low.

In the Unit 2n−1, when the scan clock signal CL is input to the clocked inverter 71, the scan clock inverted signal CL bar is input to the clocked inverter 72. At this time, in the Unit 2n, when the scan clock inverted signal CL bar is input to the clocked inverter 71, the scan clock signal CL is input to the clocked inverter 72.

It is assumed that the scan clock signal CL is High, whereas the scan clock inverted signal CL bar is Low. Then, in the Unit 2n−1, the clocked inverter 71 operates as an inverter, whereas the clocked inverter 72 does not operate. Thus, the clocked inverter 71 is electrically connected in series with the inverter 73. Therefore, the input signal IN (or an output signal from a preceding Unit 2n−2 (not illustrated in the drawings)) is shifted from the clocked inverter 71 to the inverter 73, and then output from an output terminal 74 of the Unit 2n−1 as a shift output signal. Shift is hereinafter referred to as transfer, and the shift output signal is hereinafter simply referred to as the output signal.

At this time, in the Unit 2n, the clocked inverter 71 does not operate, whereas the clocked inverter 72 operates as an inverter. Thus, the clocked inverter 72 and the inverter 73 are annularly electrically connected together. Therefore, the output signal from the output terminal 74 of the Unit 2n−1 is not transferred to the Unit 2n. Instead, an output signal transferred from the output terminal 74 of the Unit 2n−1 before the scan clock signal CL goes High is maintained between the inverter 73 and the clocked inverter 72 in the Unit 2n. The output signal is output from the output terminal 74 of the Unit 2n and transferred to a succeeding Unit 2n+1 (not illustrated in the drawings).

It is assumed that the scan clock signal CL goes from High to Low, whereas the scan clock inverted signal CL bar goes from Low to High. Then, in the Unit 2n−1, the clocked inverter 71 does not operate, whereas the clocked inverter 72 operates as an inverter. Thus, the clocked inverter 72 and the inverter 73 are annularly electrically connected together. Therefore, a new input signal IN is not input to the Unit 2n−1. A signal transferred before the scan clock signal CL goes Low (in a state that the scan clock signal CL is High) is maintained between the inverter 73 and the clocked inverter 72, and output from the output terminal 74 of the Unit 2n−1.

At this time, in the Unit 2n, the clocked inverter 71 operates as an inverter, whereas the clocked inverter 72 does not operate. Thus, the clocked inverter 71 is electrically connected in series with the inverter 73. Therefore, the output signal from the output terminal 74 of the Unit 2n−1 is transferred from the clocked inverter 71 to the inverter 73, and then output from the output terminal 74 of the Unit 2n.

As described above, each time the scan clock signal CL and the scan clock inverted signal CL bar switch between High and Low, i.e., with each ½ period of the scan clock signal CL and the scan clock inverted signal CL bar, the output signal output from one Unit is sequentially transferred to the succeeding Unit based on the input signal IN. In other words, with each period of the scan clock signal CL and the scan clock inverted signal CL bar, the signal based on the input signal IN is transferred to the Unit succeeding the succeeding Unit.

As illustrated in FIG. 11, the scan line drive circuit 52 according to Example 1 includes a selection circuit 80, a first control circuit 82, a second control circuit 84, and a first NOT circuit 86. The selection circuit 80 is electrically connected to the first control circuit 82 and the second control circuit 84. The first control circuit 82 is electrically connected to each of the first scan lines 42 (see FIG. 8). The second control circuit 84 is electrically connected to each of the second scan lines 45 (see FIG. 8) via the first NOT circuit 86.

In the scan line drive circuit 52 according to Example 1, the first control circuit 82 is used to form, from an output signal from the selection circuit 80, the first scan signal including the selection signal and the non-selection signal, ands the first scan signal is supplied to the first scan line 42. In the scan line drive circuit 52, the second control circuit 84 and the first NOT circuit 86 are also used to form, from the output signal from the selection circuit 80, the second scan signal including the maintain signal and the non-maintain signal, and the second scan signal is supplied to the second scan line 45.

The selection circuit 80 includes, as examples, a plurality of the Unit circuits 70 and a plurality of AND circuits (logical AND circuits) 76. FIG. 11 illustrates Unit 1 in a first stage to Unit 8 in an eighth stage, which are included in the plurality of Unit circuits 70 included in the selection circuit 80, and the AND circuits 76 electrically connected to the Unit circuit 70. The input signal IN is supplied through an input signal line 75 to Unit 1, included in the Unit circuits 70. An output signal output from Unit 1 based on the input signal IN is sequentially transferred to Unit 2 and to the subsequent Unit circuits.

An output terminal of each of the AND circuits 76 is electrically connected to output terminals 74 (see FIG. 10) of two Units (Unit circuits 70) preceding and succeeding the Unit with the AND circuit. The output terminal of the nth AND circuit 76 is hereinafter referred to as Out n. The nth AND circuit 76 takes a logical product of the output signals from the output terminals 74 of two electrically connected Unit circuits Unit n and Unit n+1, and outputs the logical product from Out n as an original scan signal. For example, the first AND circuit 76 outputs, from Out 1, an original scan signal corresponding to the logical product of the output signal from Unit 1 in the first stage and the output signal from Unit 2 in the second stage.

Out n of the AND circuit 76 is branched and electrically connected to the first control circuit 82 and the second control circuit 84. The original scan signal output from Out n of the AND circuit 76 is supplied to the first control circuit 82 and the second control circuit 84. The original scan signal includes an original selection signal and a non-original-selection signal. The selection circuit 80 therefore supplies the original selection signal or the non-original-selection signal to the first control circuit 82 and the second control circuit 84. In Example 1, the original selection signal is High and the non-original-selection signal is Low, by way of example.

The first control circuit 82 includes a plurality of AND circuits 76 by way of example. The input terminal of each of the AND circuits 76 in the first control circuit 82 is electrically connected to Out n of the corresponding AND circuit 76 in the selection circuit 80 and to the first control signal line 77. Each of the AND circuits 76 in the first control circuit 82 receives the original scan signal output from Out n of the corresponding AND circuit 76 in the selection circuit 80 and a first control signal CS1 supplied through the first control signal line 77.

The first control circuit 82 adjusts the pulse width of the input signal, i.e., the original selection signal included in the original scan signal output from the selection circuit 80, to form the selection signal. Specifically, each of the AND circuits 76 in the first control circuit 82 takes the logical product of the first control signal CS1 and the original scan signal output from Out n of the corresponding AND circuit 76 in the selection circuit 80. Each AND circuit 76 in the first control circuit 82 then forms the selection signal as the logical product of the original selection signal and the first control signal CS1 when the original scan signal is the original selection signal, and forms the non-selection signal as the logical product of the non-original-selection signal and the first control signal CS1 when the original scan signal is the non-original-selection signal.

The scan line drive circuit 52 according to Example 1 supplies, as a first scan signal Scan n, the first scan line 42 with the selection signal or the non-selection signal formed using the first control circuit 82 when the original scan signal is the original selection signal, or with the non-selection signal formed using the first control circuit 82 when the original scan signal is the non-original-selection signal. For example, the scan line drive circuit 52 supplies, as a first scan signal Scan 1, the first, first scan line 42 with the non-selection signal formed from the selection signal or the non-selection signal formed from the original selection signal from Out 1 of the first AND circuit 76 in the selection circuit 80.

The second control circuit 84 includes a plurality of AND circuits 76 by way of example. The input terminal of each of the AND circuits 76 in the second control circuit 84 is electrically connected to Out n of the corresponding AND circuit 76 in the selection circuit 80 and to the second control signal line 79. Each of the AND circuits 76 in the second control circuit 84 receives the original scan signal output from Out n of the corresponding AND circuit 76 in the selection circuit 80 and a second control signal CS2 supplied through the second control signal line 79.

The second control circuit 84 adjusts the pulse width of the input signal, i.e., the original selection signal included in the original scan signal output from the selection circuit 80. Specifically, each of the AND circuits 76 in the second control circuit 84 takes the logical product of the second control signal CS2 and the original scan signal output from Out n of the corresponding AND circuit 76 in the selection circuit 80, and outputs the logical product to the first NOT circuit 86. The first NOT circuit 86 includes a plurality of inverters 78 by way of example. Each of the inverters 78 in the first NOT circuit 86 inverts the output signal output from the corresponding AND circuit 76 in the second control circuit 84, and outputs the inverted signal.

The scan line drive circuit 52 according to Example 1 uses the second control circuit 84 to take the logical product of the original scan signal and the second control signal CS2 output from Out n of each AND circuit 76 in the selection circuit 80. The scan line drive circuit 52 then uses the first NOT circuit 86 to invert the logical product to form an output signal, and outputs the output signal to the second scan line 45 as a second scan signal Scan n. That is, the scan line drive circuit 52 supplies, as a second scan signal XScan n, to the first scan line 42 with the non-maintain signal or the maintain signal formed using the second control circuit 84 and the first NOT circuit 86 when the original scan signal is the original selection signal, or with the maintain signal formed using the second control circuit 84 and the first NOT circuit 86 when the original scan signal is the non-original-selection signal. For example, the scan line drive circuit 52 supplies, as a second scan signal XScan 1, the first, second scan line 45 with the maintain signal formed from the non-maintain signal or the maintain signal formed from the original selection signal from Out 1 of the first AND circuit 76 in the selection circuit 80.

Operation of the scan line drive circuit 52 according to Example 1 will now be described. FIG. 12 is a timing chart illustrating the operation of the scan line drive circuit according to Example 1. The scan line drive circuit 52 operates as illustrated in the timing chart in FIG. 12 to implement the driving method for the pixel circuit illustrated in FIG. 9.

Figure 12:
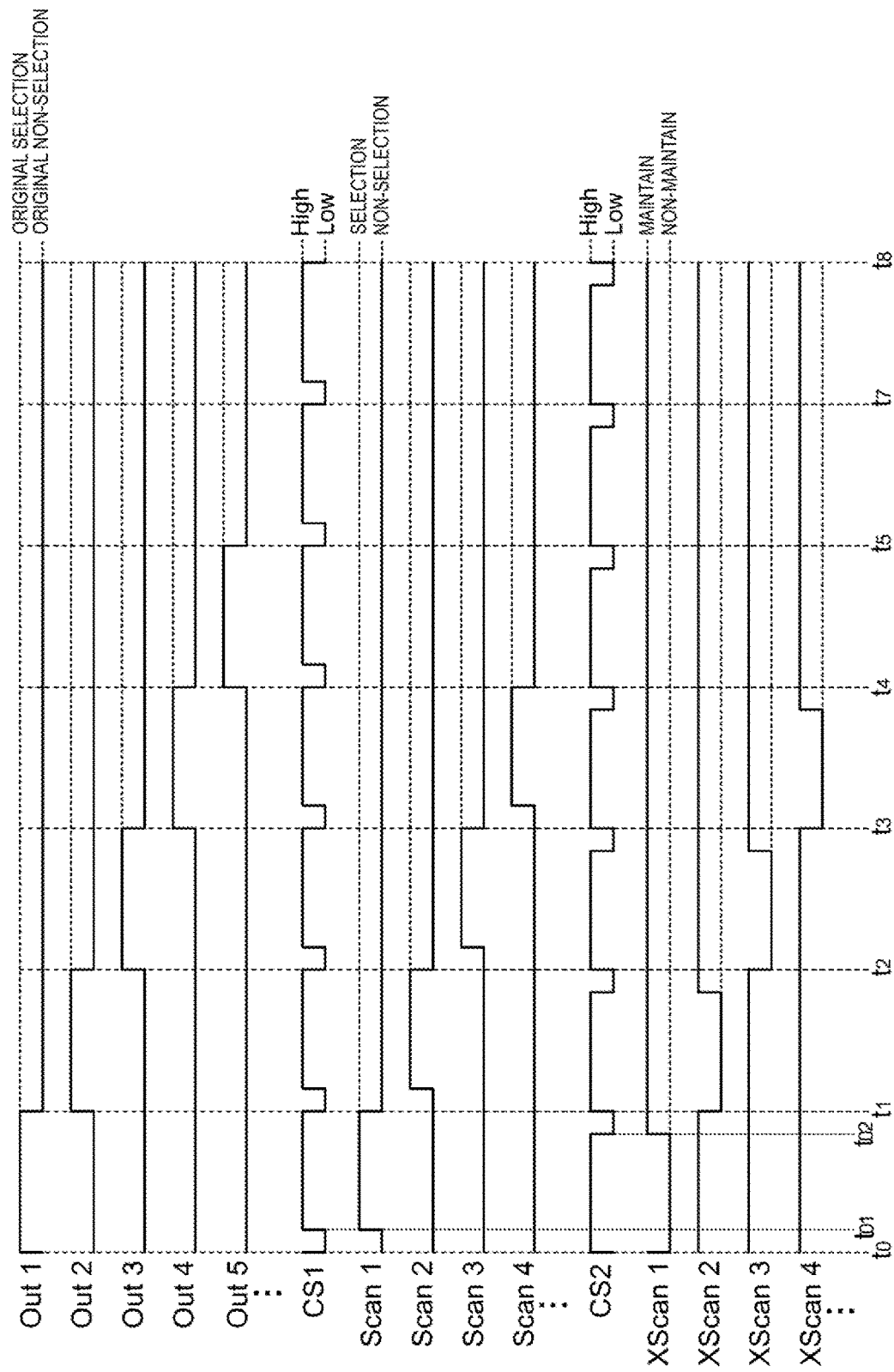
FIG. 12 is a timing chart illustrating operation of the scan line drive circuit according to Example 1.

In FIG. 12, the horizontal axis is a time axis, and time $t_0$ to time $t_8$ are illustrated. The time interval between the consecutive times of time $t_0$ to time $t_8$ correspond to a duration allotted for selection of a single first scan line 42. In other words, a selection time for the nth first scan line 42 is set to the duration from time $t_{n-1}$ to time $t_n$. In Example 1, the duration from time $t_{n-1}$ to time $t_n$ allotted for selection of a single first scan line 42 is 5 nanoseconds, by way of example.

The vertical axis indicates the original scan signal output from the output terminals Out 1 to Out 5 of the selection circuit 80, the first control signal CS1 input to the first control circuit 82, the first scan signals Scan 1 to Scan 4 output to the first scan line 42, the second control signal CS2 input to the second control circuit 84, the second scan signals XScan 1 to XScan 4 output to the second scan line 45.

Although not illustrated in the drawings, the output signal output from each Unit n (refer to FIG. 11) of the Unit circuits 70 in the selection circuit 80 based on the input signal IN includes a signal (in Example 1, a High signal) corresponding to the original selection signal with a pulse width corresponding to a single period of the scan clock signal CL (and the scan clock inverted signal CL bar). The High signal is transferred from one Unit to the succeeding Unit with each ½ period of the scan clock signal CL. The ½ period of the scan clock signal CL is set to be the same as the time (from time $t_{n-1}$ until time $t_n$) allotted for selection of a single first scan line 42.

For example, Unit 1 outputs the High signal from time $t_{-1}$ (not illustrated in FIG. 12) corresponding to a ½ period of the scan clock signal CL before the end of the duration allotted for selection of a single first scan line 42 until time $t_1$ corresponding to a single period of the scan clock signal CL. Unit 2 outputs the High signal from time $t_0$ corresponding to a ½ period of the scan clock signal CL with respect to Unit 1 until time t2.

As described above, the first AND circuit 76 in the selection circuit 80 takes the logical product of the output signal from Unit 1 and the output signal from Unit 2 to output the logical product from Out 1 as an original scan signal. Both the output signals from Unit 1 and Unit 2 are High from time $t_0$ until time $t_1$, and thus, Out 1 of the first AND circuit 76 outputs the original selection signal (High).

After $t_1$, the output signal from Unit 1 is Low, and thus, Out 1 of the first AND circuit 76 outputs the non-original-selection signal (Low). Out 2 of the second AND circuit 76 outputs the original selection signal (High) from time $t_1$ until time $t_2$, and Out 3 of the third AND circuit 76 outputs the original selection signal (Low) from time $t_2$ until time $t_3$.

In Example 1, during the duration allotted for selection of a single first scan line 42, the first control signal CS1 remains Low until a prescribed time passes from time $t_{n-1}$, and remains High from a point in time corresponding to passage of the prescribed time until time $t_n$. In Example 1, 1 nanosecond refers to a prescribed time with respect to 5 nanoseconds corresponding to the duration allotted for selection of a single first scan line 42, by way of example. In FIG. 12, the first control signal CS1, for example, remains Low from time $t_0$ until time $t_{01}$ corresponding to passage of 1 nanosecond from time $t_0$, and remains High for 4 nanoseconds from time $t_{01}$ until time $t_1$.

The first scan signal Scan n supplied to the nth first scan line 42 is the logical product of the output signal from Out n and the first control signal CS1. Therefore, the first scan signal Scan 1 supplied to the first, first scan line 42 takes the logical product of the output signal from Out 1 and the first control signal CS1 and thus remains the non-selection signal (Low) from time $t_0$ until time $t_{01}$. The first scan signal Scan 1 then remains the selection signal (High) for 4 nanoseconds from time $t_{01}$ until time $t_1$, and remains the non-selection signal after time $t_1$. In other words, the first control circuit 82 adjusts the pulse width of the selection signal and the timing to switch from the non-selection signal to the selection signal with respect to the original selection signal. As a result, in Example 1, the selection signal (High) is supplied to the first, first scan line 42 during 4 nanoseconds from time $t_{01}$ until time $t_1$.

In Example 1, during the duration allotted for selection of a single first scan line 42, the second control signal CS2 remains High until a prescribed time passes from time $t_{n-1}$, and remains Low from a point in time corresponding to passage of the prescribed time until time $t_n$. In Example 1, 4 nanosecond refers to a prescribed time with respect to 5 nanoseconds corresponding to the duration allotted for selection of a single first scan line 42, by way of example. In FIG. 12, the second control signal CS2, for example, remains High from time $t_0$ until time $t_{02}$ corresponding to passage of 4 nanoseconds from time $t_0$, and remains Low for 1 nanoseconds from time $t_{02}$ until time $t_1$.

The second scan signal XScan n supplied to the nth second scan line 45 is the logical product of the output signal from Out n and the second control signal CS2. Therefore, the second scan signal XScan 1 supplied to the first, second scan line 45 inverts the logical product of the output signal from Out 1 and the second control signal CS2 and thus remains the non-maintain signal (Low) for 4 nanoseconds from time $t_0$ until time $t_{02}$. The first scan signal Scan 1 then remains the maintain signal (High) for 1 nanoseconds from time $t_{02}$ until time $t_1$ and after time $t_1$. In other words, the second control circuit 84 adjusts the pulse width of the non-maintain signal and the timing to switch from the non-maintain signal to the maintain signal with respect to the original selection signal. The first NOT circuit 86 inverts the potential (High and Low). As a result, in Example 1, the non-maintain signal (Low) is supplied to the first, second scan line 45 during 4 nanoseconds from time to until time $t_{02}$.

The scan line drive circuit 52 therefore outputs the non-selection signal and the non-maintain signal from to until $t_{01}$, outputs the selection signal and the non-maintain signal from $t_{01}$ until $t_{02}$, and outputs the selection signal and the maintain signal from $t_{02}$ until $t_1$. That is, the scan line drive circuit 52 according to Example 1 may output the selection signal and the non-maintain signal, which are complementary to each other, during an identical period. As a result, as illustrated in FIG. 9, the non-maintain signal is supplied to the second scan line 45 before the selection signal is supplied to the first scan line 42. The maintain signal is supplied to the second scan line 45 before the non-selection signal is supplied to the first scan line 42.

Note that although, in Example 1, the original selection signal is High, the original selection signal may be Low. when the original selection signal is Low, an inverter may be arranged between the output terminal 74 of each Unit circuit 70 in the selection circuit 80 and the input terminal of the AND circuit 76. This allows the Low signal output from the output terminal 74 of each Unit circuit 70 to turn High, and the High signal may be input to the input terminal of the AND circuit 76.

Here, as described above, the driving method in Example illustrated in FIG. 9 involves keeping the third transistor 33 in the OFF-state when the image signal is written to the input terminal 25 of the first inverter 61. This prevents the data line 43 and the power supply (VSS and VDD1) from being electrically connected together. Write (or rewrite) of the image signal may be achieved simply by charging the transistor capacitance of the fifth transistor 35 and the seventh transistor 37 for the input terminal 25 of the first inverter 61 (in fact, no current path is present). As a result, the image signal can be written to the input terminal 25 of the first inverter 61 at a very high speed (in a short time). This will be described below.

The P-type fifth transistor 35 has a transistor capacitance $C_P=6.47\times10^{-16}$ farad (F), and the N-type seventh transistor 37 has a transistor capacitance $C_N=4.31\times10^{-16}$ farad (F). Thus, the input terminal 25 of the first inverter 61 has a total transistor capacitance $CTr=1.079\times10^{-15}$ farad. In Exemplary Embodiment, the selection signal has a high potential $V4=V3=7.0$ V, and thus, the second transistor 32 has a very low on resistance in the ON-state. An on current $I_{ds2}$ passing through the second transistor 32 is $I_{ds2}=4.13\times10^{-4}$ amperes (A). Therefore, a time needed to write the image signal to the input terminal 25 of the first inverter 61 via the second transistor 32 is determined in accordance with Equation 8, and $\tau_1=C_{Tr}\times V/I_{ds2}=3.92\times10^{-12}$ seconds.

Equation 8

$$\tau_1 = \frac{C_{Tr}V}{I_{ds}} \quad (8)$$

In Equation 8, V is a logic inverted voltage of the first inverter 61 $(V1+V2)/2=1.5$ V. Thus, in Exemplary Embodiment, the third transistor 33 turns into the OFF-state when the image signal is written (or rewritten), and the selection signal has a high potential $V4=V3=7.0$ V. The image signal can consequently be written (or rewritten) in a very short time such as approximately 4 picoseconds.

Calculation of the rewrite time for the input terminal 28 of the second inverter 62 indicates that rewrite via the fifth transistor 35, having a slightly lower on current than the seventh transistor 37, takes a longer time for the rewrite than the seventh transistor 37 (rewriting and changing the input terminal 28 of the second inverter 62 from Low to High takes a longer time than rewriting and changing the input terminal 28 of the second inverter 62 from High to Low). In that case, the fifth transistor 35 has an on current $I_{ds5}=1.54\times10^{-6}$ amperes, and a time $\tau_2$=needed to write the image signal to the input terminal 28 of the second inverter 62 is $\tau_2=C_{Tr}\times V/I_{ds5}=1.05\times10^{-11}$ seconds.

A period when the second transistor 32 is in the ON-state after the third transistor 33 turns into the OFF-state (a period when the selection signal is in the first scan line 42 and the non-maintain signal is in the second scan line 45) is eventually twice as long as $\tau_2$ in view of margins. Approximately 8 picoseconds thus suffice. Moreover, a duration from a point in time when the first scan signal (Scan) goes High until a point in time when the second scan signal (XScan) goes High for (picoseconds)×2+10.5 (picoseconds)×2=29 (picoseconds). Approximately 30 (picoseconds) thus suffice. In Exemplary Embodiment, the first scan signal (Scan) and the second scan signal (XScan) are complementary with each other, and a selection signal period is 5.0 nanoseconds. In this case, a single vertical period (non-display period P1)

within which all the first scan lines 42 are selected is 5.0 (nanoseconds)×720×3=10.8 microseconds.

Note that the scan line drive circuit 52 according to Example 1 enables variation of the pulses of the first control signal CS1 and the second control signal CS2 and the timing to turn from High to Low (or from Low to High) in the example of the timing chart illustrated in FIG. 12. Thus, the pulse width of the selection signal may be set different from the pulse width of the non-maintain signal or the timing to supply the selection signal may be set different from the timing to supply the non-maintain signal to allow implementation of a driving method for the pixel circuit that is different from the driving method for the pixel circuit illustrated in FIG. 9.

Figure 13:
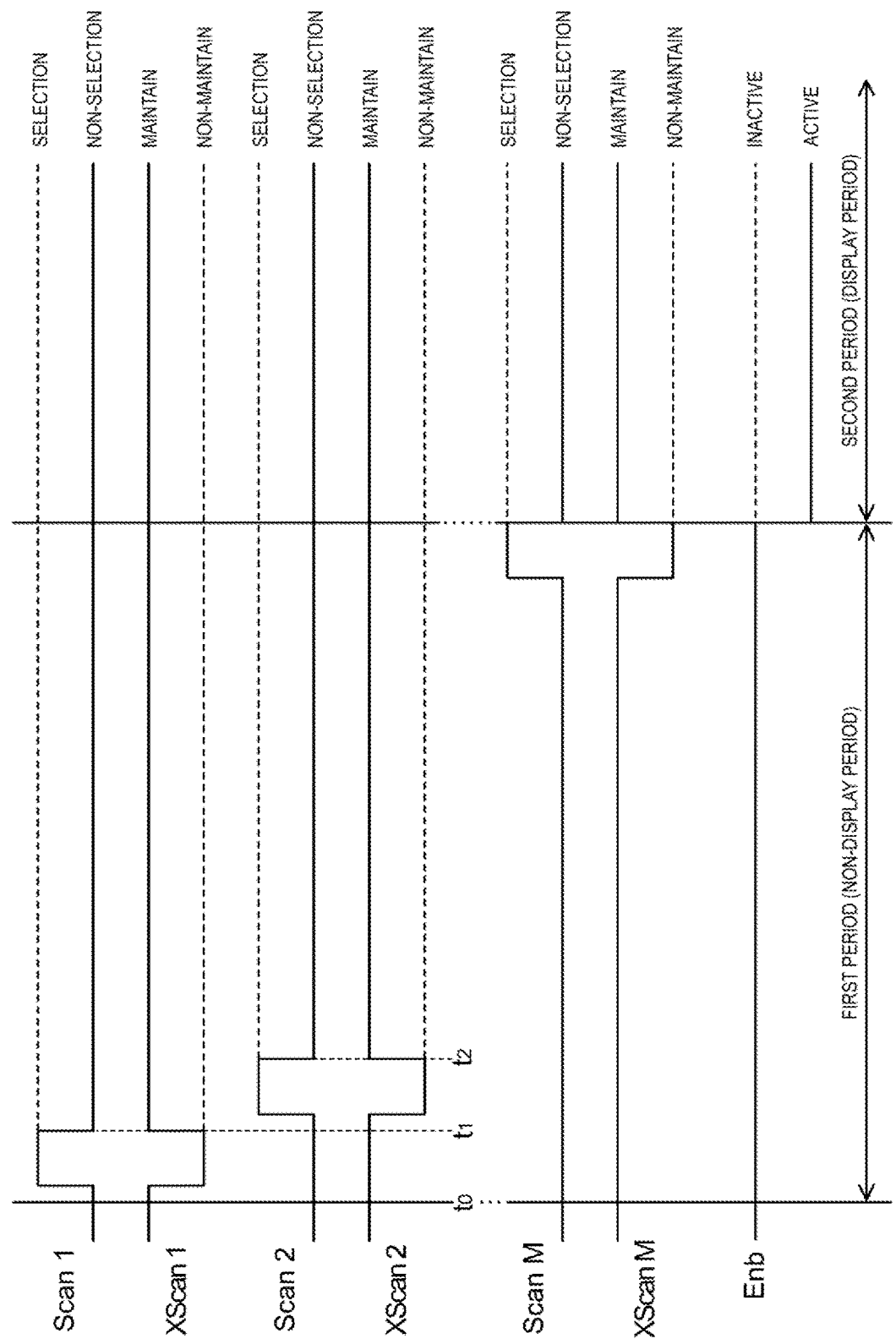
FIG. 13 is a diagram illustrating another example of the driving method for the pixel circuit according to Example 1.

FIG. 13 is a diagram illustrating another example of the driving method for the pixel circuit according to Example 1. In the example illustrated in FIG. 13, the pulse width of the selection signal (High) is the same as the pulse width of the non-maintain signal (Low) as in the example illustrated in FIG. 9. However, the second scan signal switches from the maintain signal to the non-maintain signal when the first scan signal switches from the non-selection signal to the selection signal. The second scan signal switches from the non-maintain signal to the maintain signal when the first scan signal switches from the selection signal to the non-selection signal. Therefore, in the pixel circuit 41, the third transistor 33 changes from the ON-state to the OFF-state when the second transistor 32 changes from the OFF-state to the ON-state. The third transistor 33 changes from the OFF-state to the ON-state when the second transistor 32 changes from the ON-state to the OFF-state.

Although not illustrated in the drawings, the selection signal may be larger pulse width than the non-maintain signal, or the non-maintain signal may have a larger pulse width than the selection signal. when the selection signal has a larger pulse width than the non-maintain signal, the selection signal and the non-maintain signal are set such that the selection signal is not supplied before the non-maintain signal is supplied. when the non-maintain signal has a larger pulse width than the selection signal, the signals may be supplied as follows. The non-maintain signal may be supplied to the second scan line 45 before the selection signal is supplied to the first scan line 42. The maintain signal may be supplied to the second scan line 45 after the non-selection signal is supplied to the first scan line 42. Therefore, in the pixel circuit 41, the third transistor 33 remains in the OFF-state over a period when the second transistor 32 is in the ON-state and periods preceding and succeeding this period. In this case, after the second transistor 32 changes from the ON-state to the OFF-state, a period when the third transistor 33 is also in the OFF-state is desirably short enough to prevent the logic (image signal) of the input terminal 25 of the first inverter 61 from being inverted.

As described above, the configuration of the pixel circuit 41 according to Exemplary Embodiment enables implementation of the electro-optical device 10 allowing high-resolution, high-quality images to be displayed with reduced power consumption and also allowing quick and reliable write of the image signal to the memory circuit 60 (or quick and reliable rewrite of the image signal in the memory circuit 60), providing brighter display.

Modified examples of Example 1 and other examples will be described below that relate to the configurations of the pixel circuit and the scan line drive circuit according to Exemplary Embodiment. Differences between Example 1 and the modified examples and other examples will be described below, and the same components as those in Example 1 are denoted by the same reference numerals in the drawings and will not be described.

Modified Example 1

Scan Line Drive Circuit

Figure 14:
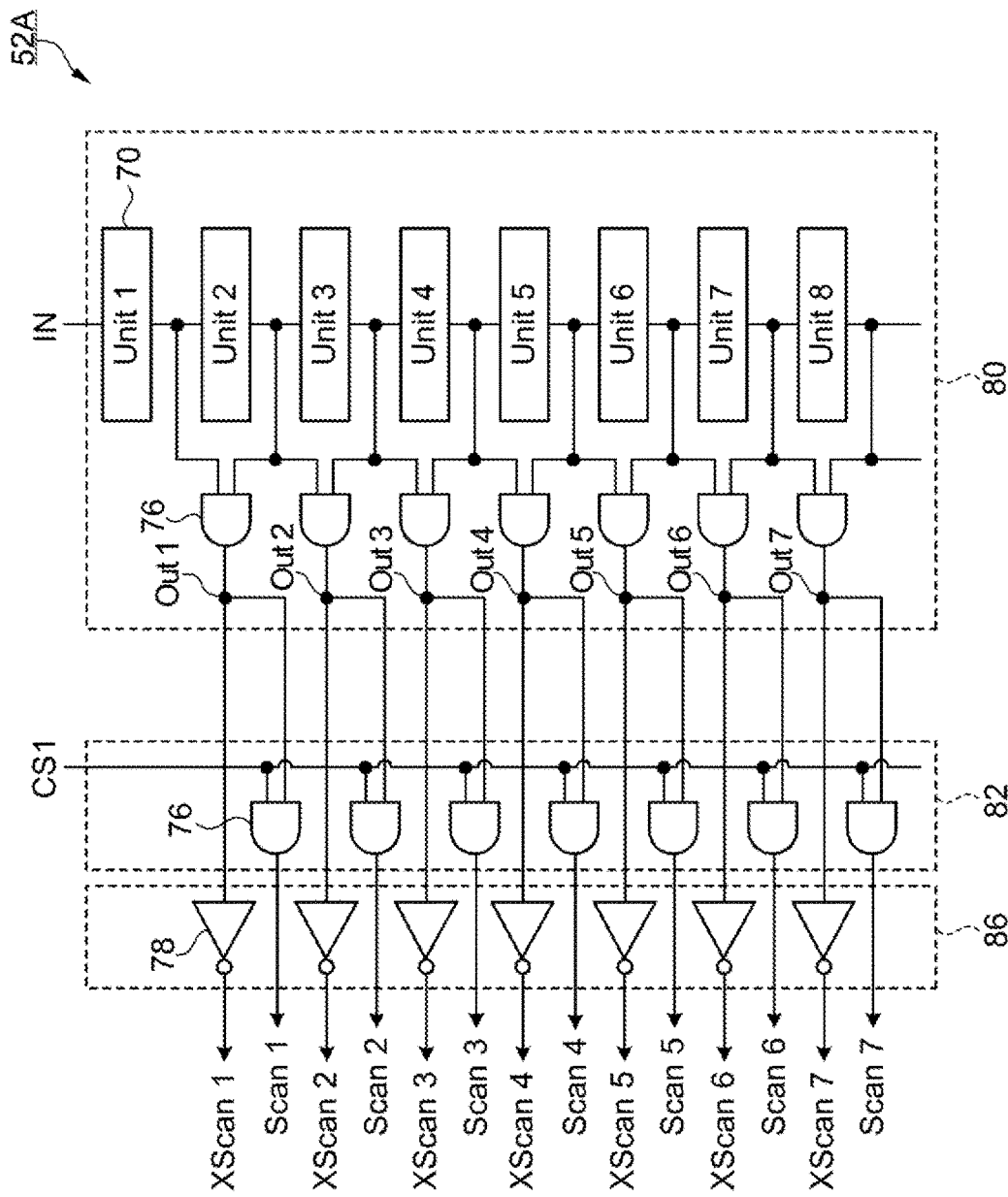
FIG. 14 is a block diagram illustrating the configuration of the scan line drive circuit according to Modified Example 1.
Figure 15:
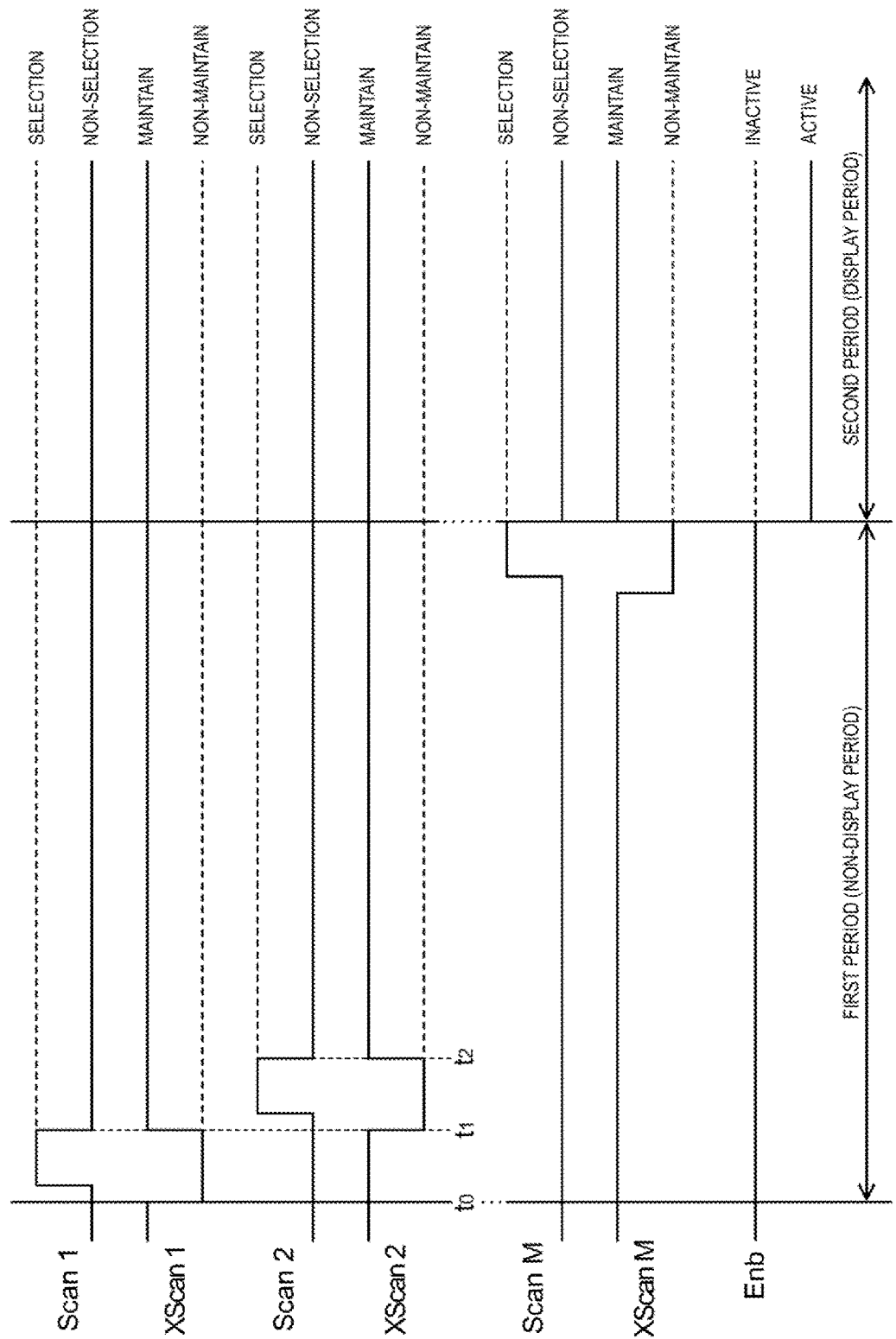
FIG. 15 is a diagram illustrating an example of a driving method for the pixel circuit according to Modified Example 1.

The following description relates to examples of a configuration of the scan line drive circuit and a driving method for the pixel circuit according to Modified Example 1 that is a modified example of Example 1. FIG. 14 is a diagram illustrating the configuration of the scan line drive circuit according to Modified Example 1. FIG. 15 is a diagram illustrating an example of the driving method for the pixel circuit according to Modified Example 1.

As illustrated in FIG. 14, a scan line drive circuit 52A according to Modified Example 1 includes the selection circuit 80, the first control circuit 82, and the first NOT circuit 86. The scan line drive circuit 52A according to Modified Example 1 has the same configuration as that of the scan line drive circuit 52 according to Example 1 except for the lack of the second control circuit 84.

In the scan line drive circuit 52A according to Modified Example 1, the first control circuit 82 is used to form, from the output signal from the selection circuit 80, the first scan signal including the selection signal and the non-selection signal, and the first scan signal is supplied to the first scan line 42. In the scan line drive circuit 52A the first NOT circuit 86 is also used to form, from the output signal from the selection circuit 80, the second scan signal including the maintain signal and the non-maintain signal, and the second scan signal is supplied to the second scan line 45. The selection signal is therefore formed by adjusting the pulse width of the original selection signal output from the selection circuit 80 as is the case with Example 1. On the other hand, the non-maintain signal is formed without adjustment of the pulse width of the original selection signal output from the selection circuit 80. That is, the non-maintain signal is an inverted signal obtained by using the inverter 78 of the first NOT circuit 86 to invert the original selection signal.

As illustrated in FIG. 15, the scan line drive circuit 52A according to Modified Example 1 forms the non-maintain signal without adjustment of the pulse width of the original selection signal. The non-maintain signal (Low) thus has a larger pulse width than the selection signal (High). Furthermore, the second scan signal switches from the maintain signal to the non-maintain signal before the first scan signal switches from the non-selection signal to the selection signal. The second scan signal switches from the non-maintain signal to the maintain signal before the first scan signal switches from the selection signal to the non-selection signal. Therefore, in the pixel circuit 41, the third transistor 33 changes from the ON-state to the OFF-state before the second transistor 32 changes from the OFF-state to the ON-state. The third transistor 33 changes from the OFF-state to the ON-state when the second transistor 32 changes from the ON-state to the OFF-state.

Modified Example 2

Scan Line Drive Circuit

Figure 16:
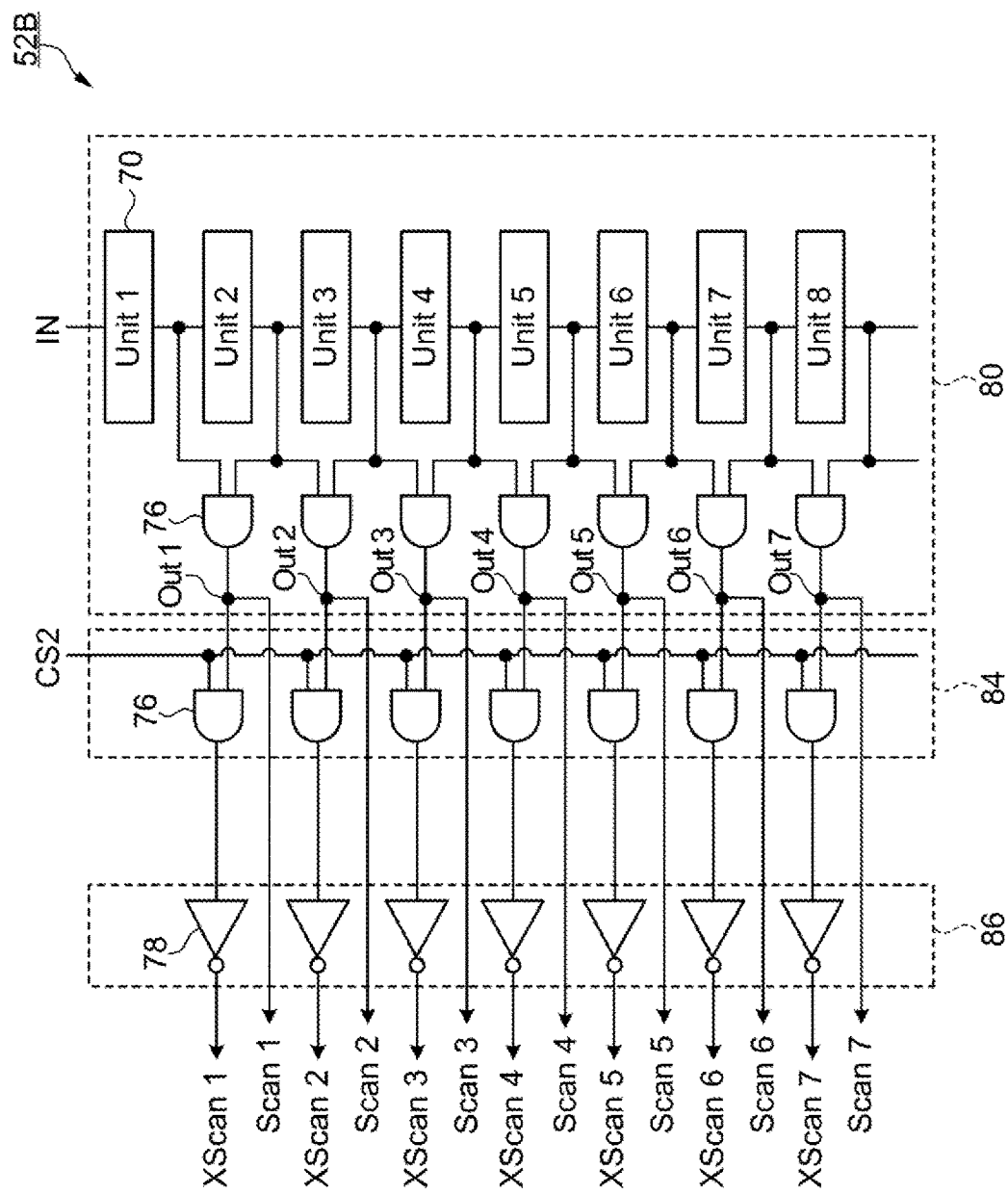
FIG. 16 is a diagram illustrating a configuration of a scan line drive circuit according to Modified Example 2.
Figure 17:
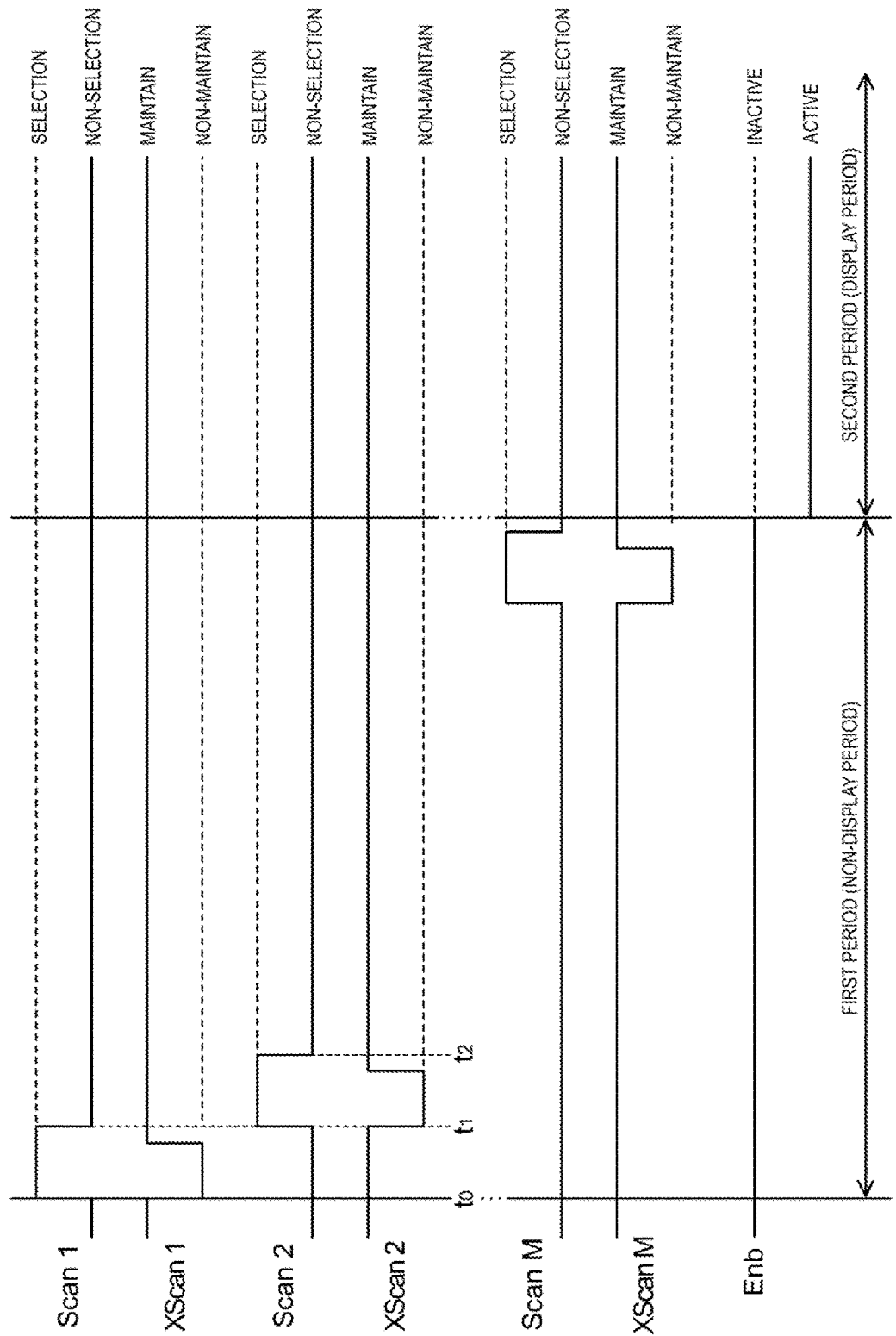
FIG. 17 is a diagram illustrating an example of a driving method for the pixel circuit according to Modified Example 2.

A configuration of the scan line drive circuit according to Modified Example 2 that is a modified example of Example 1 will be described. FIG. 16 is a diagram illustrating the configuration of the scan line drive circuit according to Modified Example 2. FIG. 17 is a diagram illustrating an example of the driving method for the pixel circuit according to Modified Example 2.

As illustrated in FIG. 16, a scan line drive circuit 52B according to Modified Example 2 includes the selection circuit 80, the second control circuit 84, and the first NOT circuit 86. The scan line drive circuit 52B according to Modified Example 2 has the same configuration as that of the scan line drive circuit 52 according to Example 1 except for the lack of the first control circuit 82.

The scan line drive circuit 52B according to Modified Example 2 supplies the output signal from the selection circuit 80 directly to the first scan line 42 as the first scan signal including the selection signal and the non-selection signal. In the scan line drive circuit 52B, the second control circuit 84 and the first NOT circuit 86 are also used to form, from the output signal from the selection circuit 80, the second scan signal including the maintain signal and the non-maintain signal, and the second scan signal supplied to the second scan line 45. The selection signal is therefore formed without adjustment of the pulse width of the original selection signal output from the selection circuit 80. The non-maintain signal is formed by adjusting and inverting the pulse width of the original selection signal output from the selection circuit 80 as is the case with Example 1.

As illustrated in FIG. 17, the scan line drive circuit 52B according to Modified Example 2 forms the selection signal without adjustment of the pulse width of the original selection signal. The selection signal (High) thus has a larger pulse width than the non-maintain signal (Low). Furthermore, the second scan signal switches from the maintain signal to the non-maintain signal when the first scan signal switches from the non-selection signal to the selection signal. The second scan signal switches from the non-maintain signal to the maintain signal before the first scan signal switches from the selection signal to the non-selection signal. Therefore, in the pixel circuit 41, the third transistor 33 changes from the ON-state to the OFF-state when the second transistor 32 changes from the OFF-state to the ON-state. The second transistor 32 changes from the ON-state to the OFF-state after the third transistor 33 changes from the OFF-state to the ON-state.

Modified Example 3

Scan Line Drive Circuit

Figure 18:
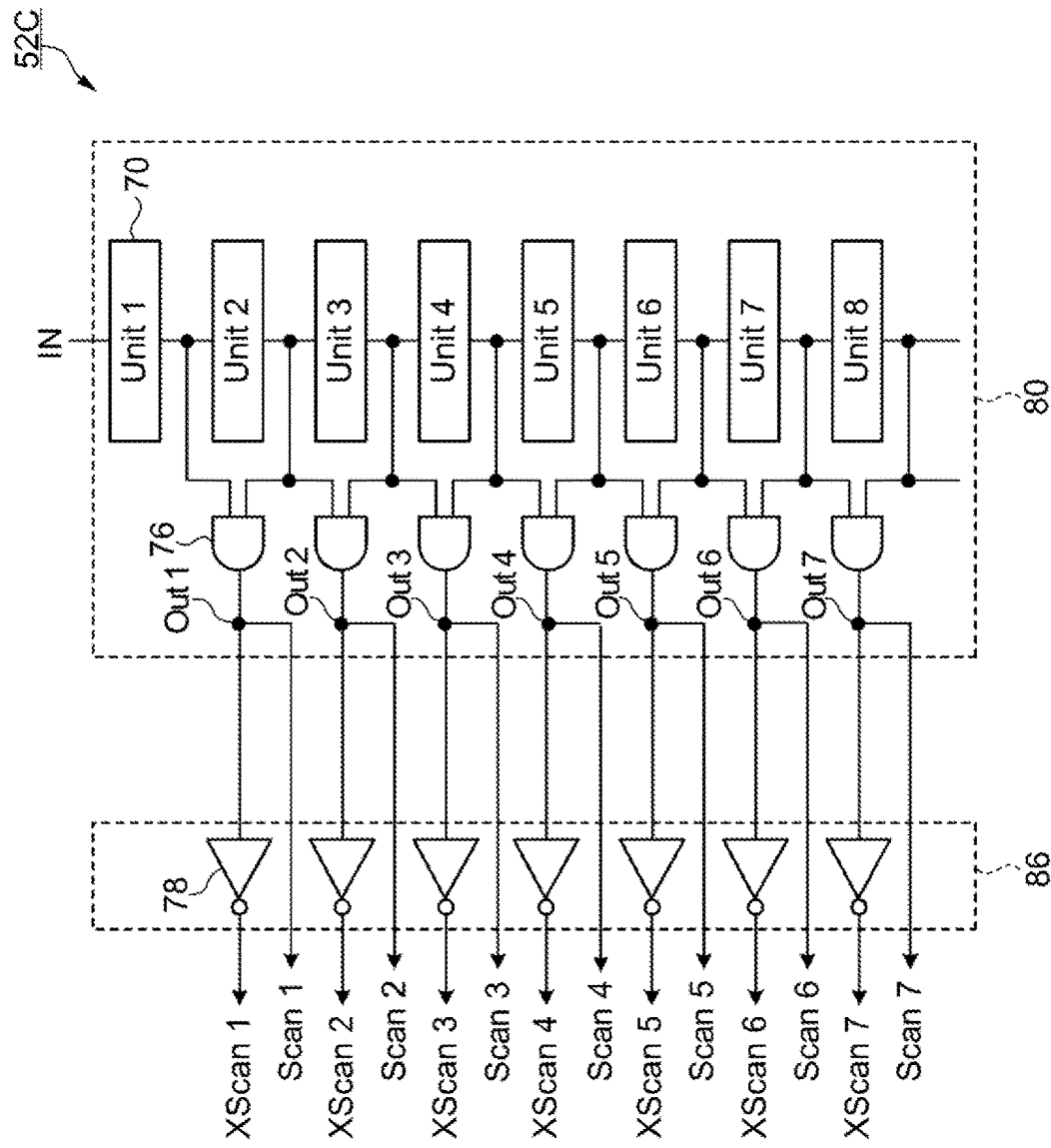
FIG. 18 is a diagram illustrating a configuration of the scan line drive circuit according to Modified Example 3.
Figure 19:
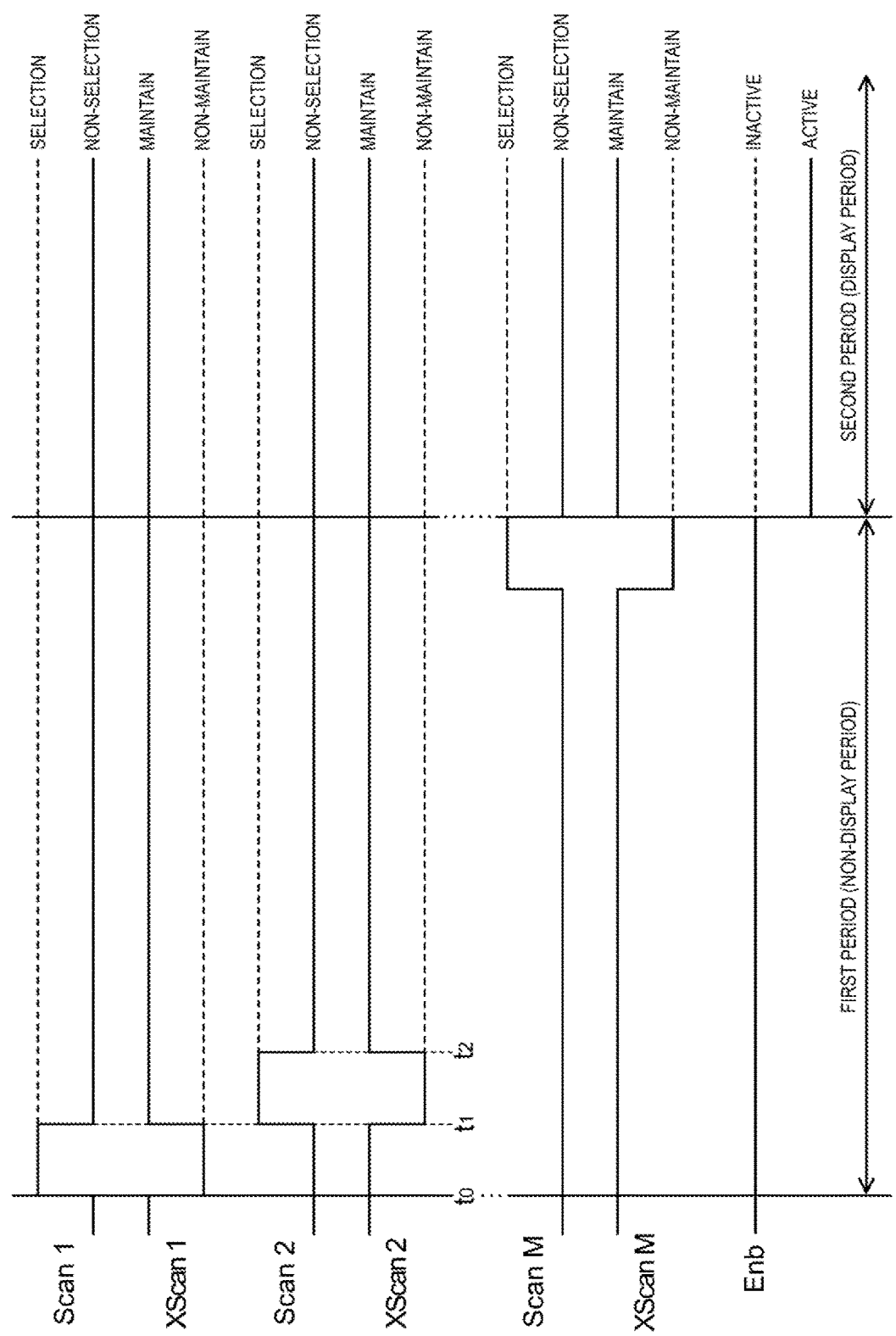
FIG. 19 is a diagram illustrating an example of a driving method for the pixel circuit according to Modified Example 3.

A configuration of the scan line drive circuit according to Modified Example 3 that is a modified example of Example 1 will be described. FIG. 18 is a diagram illustrating the configuration of the scan line drive circuit according to Modified Example 3. FIG. 19 is a diagram illustrating an example of the driving method for the pixel circuit according to Modified Example 3.

As illustrated in FIG. 18, a scan line drive circuit 52C according to Modified Example 3 includes the selection circuit 80, and the first NOT circuit 86. The scan line drive circuit 52C according to Modified Example 3 has the same configuration as that of the scan line drive circuit 52 according to Example 1 except for the lack of the first control circuit 82 and the second control circuit 84.

The scan line drive circuit 52C according to Modified Example 3 supplies the output signal from the selection circuit 80 directly to the first scan line 42 as the first scan signal including the selection signal and the non-selection signal. In the scan line drive circuit 52C, the first NOT circuit 86 is also used to form, from the output signal from the selection circuit 80, the second scan signal including the maintain signal and the non-maintain signal, and the second scan signal is supplied to the second scan line 45. The selection signal is therefore formed without adjustment of the pulse width of the original selection signal output from the selection circuit 80. The non-maintain signal is also formed without adjustment of the pulse width of the original selection signal output from the selection circuit 80. The non-maintain signal is an inverted signal obtained by using the inverter 78 of the first NOT circuit 86 to invert the original selection signal.

As illustrated in FIG. 19, the scan line drive circuit 52C according to Modified Example 3 forms the selection signal and the non-maintain signal without adjustment of the pulse width of the original selection signal. The selection signal (High) and the non-maintain signal (Low) thus have the same pulse width. Furthermore, the timing to switch the first scan signal from the non-selection signal to the selection signal (or from the selection signal to the non-selection signal) is the same as the timing to switch the second scan signal from the maintain signal to the non-maintain signal (or from the non-maintain signal to the maintain signal). Therefore, in the pixel circuit 41, the third transistor 33 changes from the ON-state to the OFF-state when the second transistor 32 changes from the OFF-state to the ON-state. The second transistor 32 changes from the ON-state to the OFF-state when the third transistor 33 changes from the OFF-state to the ON-state.

Modified Examples 1, 2, and 3 have been described in which the scan line drive circuit 52, compared to the scan line drive circuit 52 in Example 1, lacks at least one of the first control circuit 82 and the second control circuit 84. However, changing the first control signal CS1 and the second control signal CS2 enables the configuration of the scan line drive circuit 52 in Example 1 to form the selection signal and the non-maintain signal in Modified Example 1 illustrated in FIG. 15, Modified Example 2 illustrated in FIG. 17, and Modified Example 2 illustrated in FIG. 19.

Example 2

Pixel Circuit

Figure 20:
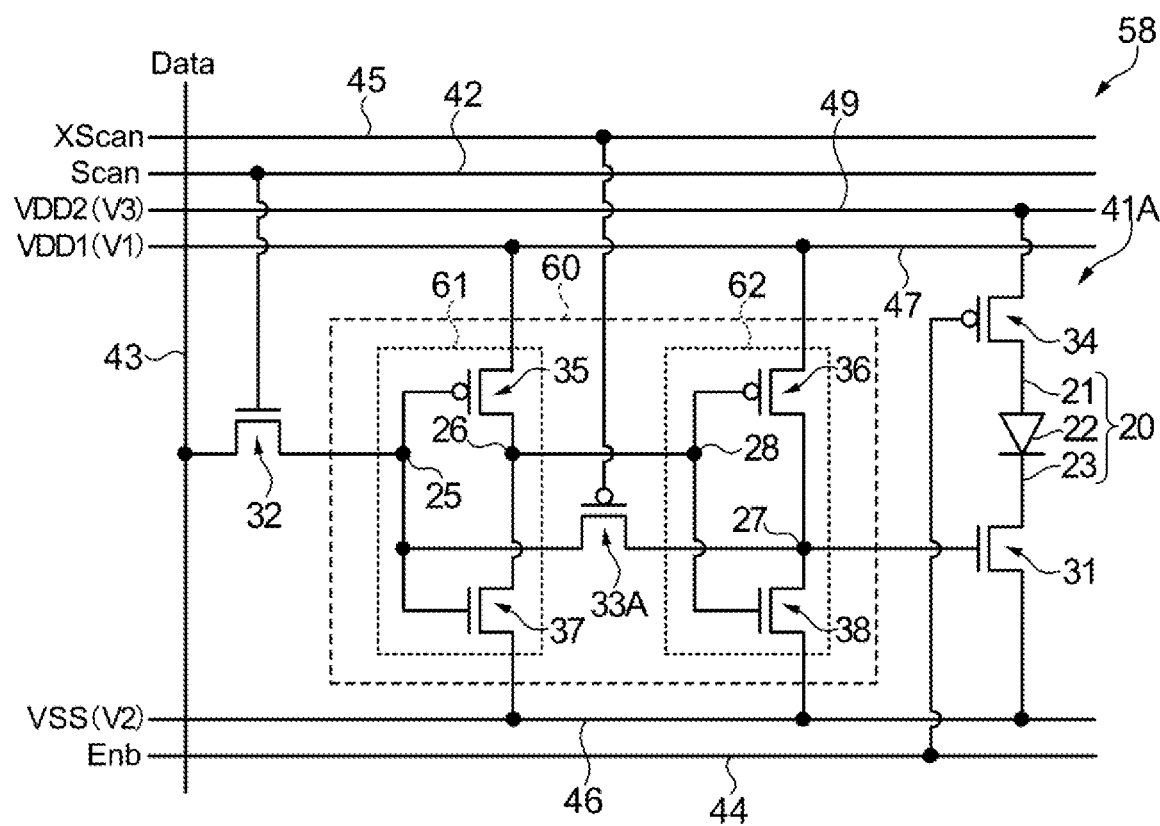
FIG. 20 is a diagram illustrating a configuration of a pixel circuit according to Example 2.

Next, a configuration of a pixel circuit according to Example 2 will be described. FIG. 20 is a diagram illustrating the configuration of the pixel circuit according to Example 2. As illustrated in FIG. 20, a pixel circuit 41A according to Example 2 has the same configuration as that of the pixel circuit 41 according to Example 1 except that a P-type third transistor 33A is arranged between the first inverter 61 and the second inverter 62.

The pixel circuit 41A according to Example 2 includes the N-type first transistor 31, the light emitting element 20, the P-type fourth transistor 34, the memory circuit 60, and the N-type second transistor 32. The memory circuit 60 includes the first inverter 61, the second inverter 62, and the P-type third transistor 33A. The third transistor 33A includes a gate electrically connected to the second scan line 45.

Since the third transistor 33A is of the P-type, the second scan signal supplied to the second scan signal 45 includes the Low (low potential) maintain signal and the High (high potential) non-maintain signal. Therefore, the pixel circuit 41A according to Example 2 has a magnitude relationship that is opposite to the magnitude relationship in the pixel circuit 41 according to Example 1, between the potential of the maintain signal and the potential of the non-maintain signal. Note that the first scan signal supplied to the first scan line 42 is the same as the first scan signal in Example 1.

Scan Line Drive Circuit

Figure 21:
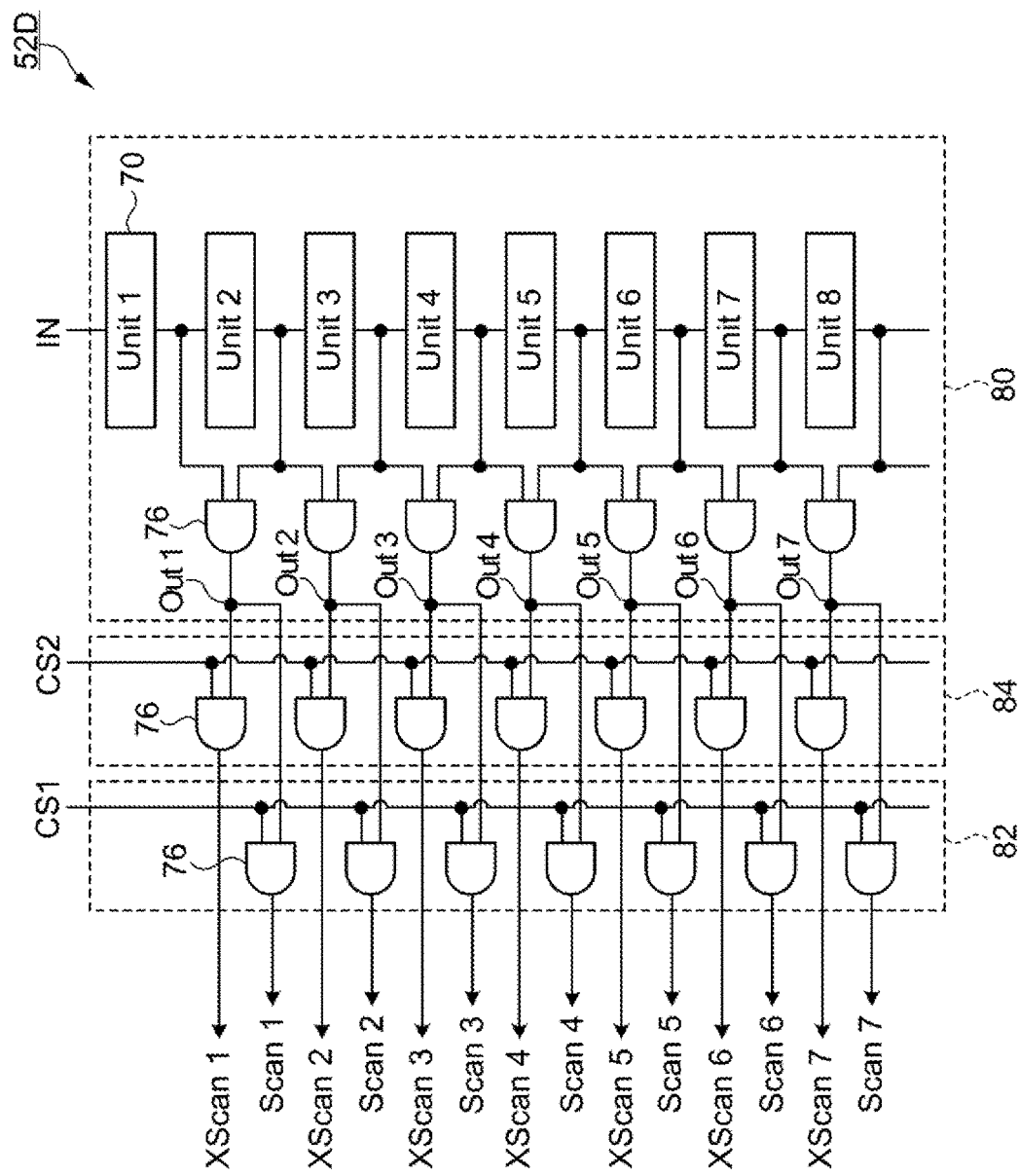
FIG. 21 is a block diagram illustrating a configuration of a scan line drive circuit according to Example 2.

The configuration of the scan line drive circuit according to Example 2 will be described. FIG. 21 is a block diagram illustrating the configuration of the scan line drive circuit according to Example 2. As illustrated in FIG. 21, a scan line drive circuit 52D according to Example 2 includes the selection circuit 80, the first control circuit 82, and the second control circuit 84. The scan line drive circuit 52D according to Modified Example 2 has the same configuration as that of the scan line drive circuit 52 according to Example 1 except for the lack of the first NOT circuit 86.

In the scan line drive circuit 52D according to Example 2, the first control circuit 82 is used to form, from the output signal from the selection circuit 80, the first scan signal including the selection signal and the non-selection signal, and the first scan signal is supplied to the first scan line 42. In the scan line drive circuit 52D, the second control circuit 84 is also used to form, from the output signal from the selection circuit 80, the second scan signal including the maintain signal and the non-maintain signal, and the second scan signal is supplied to the second scan line 45. In Example 2, the third transistor 33A is of the P-type, and the non-maintain signal is High. This eliminates a need to invert the non-maintain signal using the inverter 78 as in Example 1. That is, the scan line drive circuit 52D according to Example 2 eliminates a need for the first NOT circuit 86.

Figure 22:
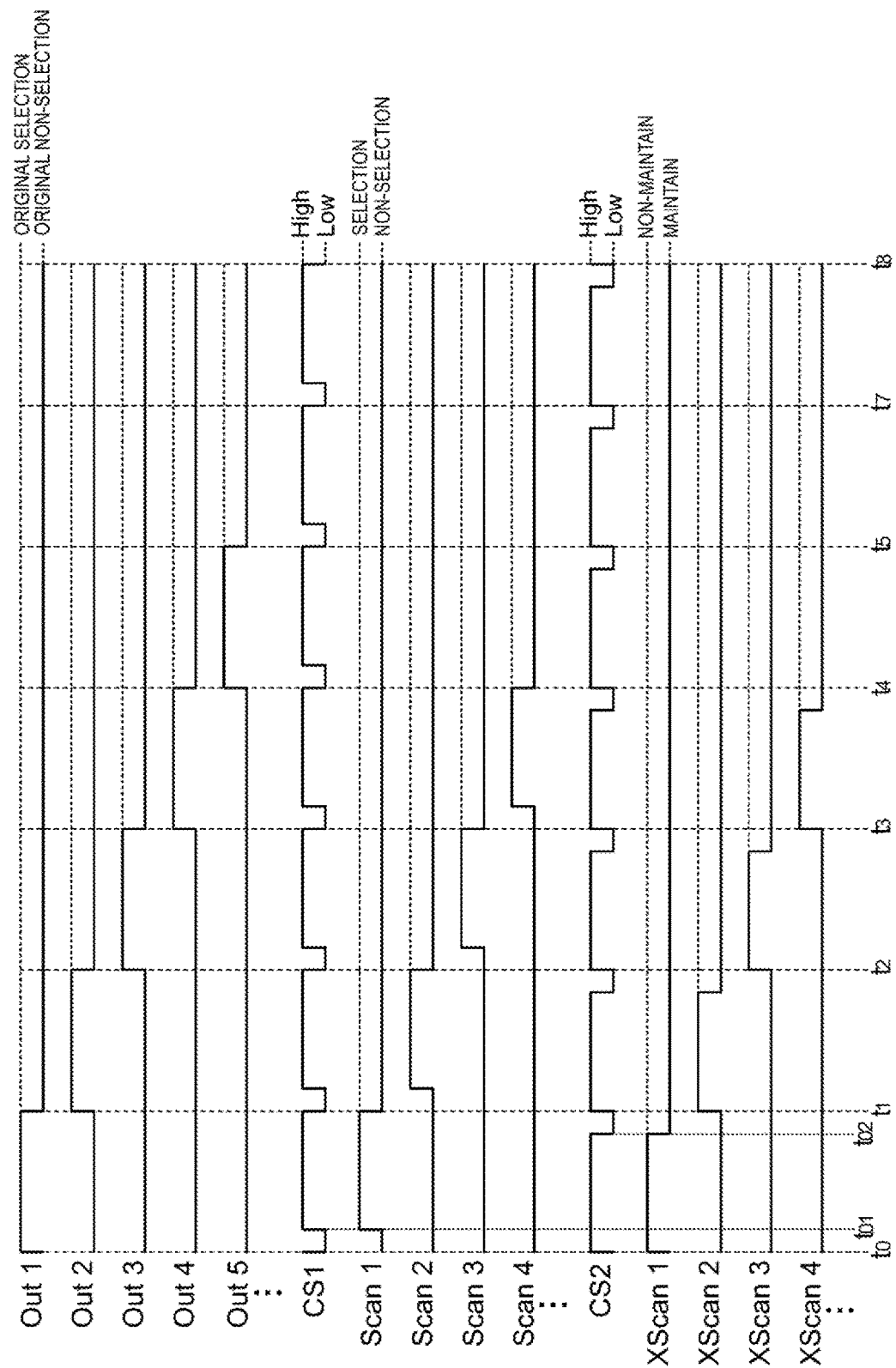
FIG. 22 is a timing chart illustrating operation of the scan line drive circuit according to Example 2.

Operation of the scan line drive circuit 52D according to Example 2 will be described. FIG. 22 is a timing chart illustrating the operation of the scan line drive circuit according to Example 2. In FIG. 22, the first control signal CS1 and the second control signal CS2 in FIG. 22 are the same as the first control signal CS1 and the second control signal CS2 in Example 1 illustrated in FIG. 12. As illustrated in FIG. 22, the first control circuit 82 adjusts, for the original selection signal, the pulse width of the selection signal and the timing to switch from the non-selection signal to the selection signal as is the case with Example 1.

Furthermore, the second control circuit 84 adjusts the pulse width of the non-maintain signal and the timing to switch from the non-maintain signal to the maintain signal with respect to the original selection signal. However, unlike in Example 1, the non-maintain signal is High and the maintain signal is Low.

Example 3

Pixel Circuit

Figure 23:
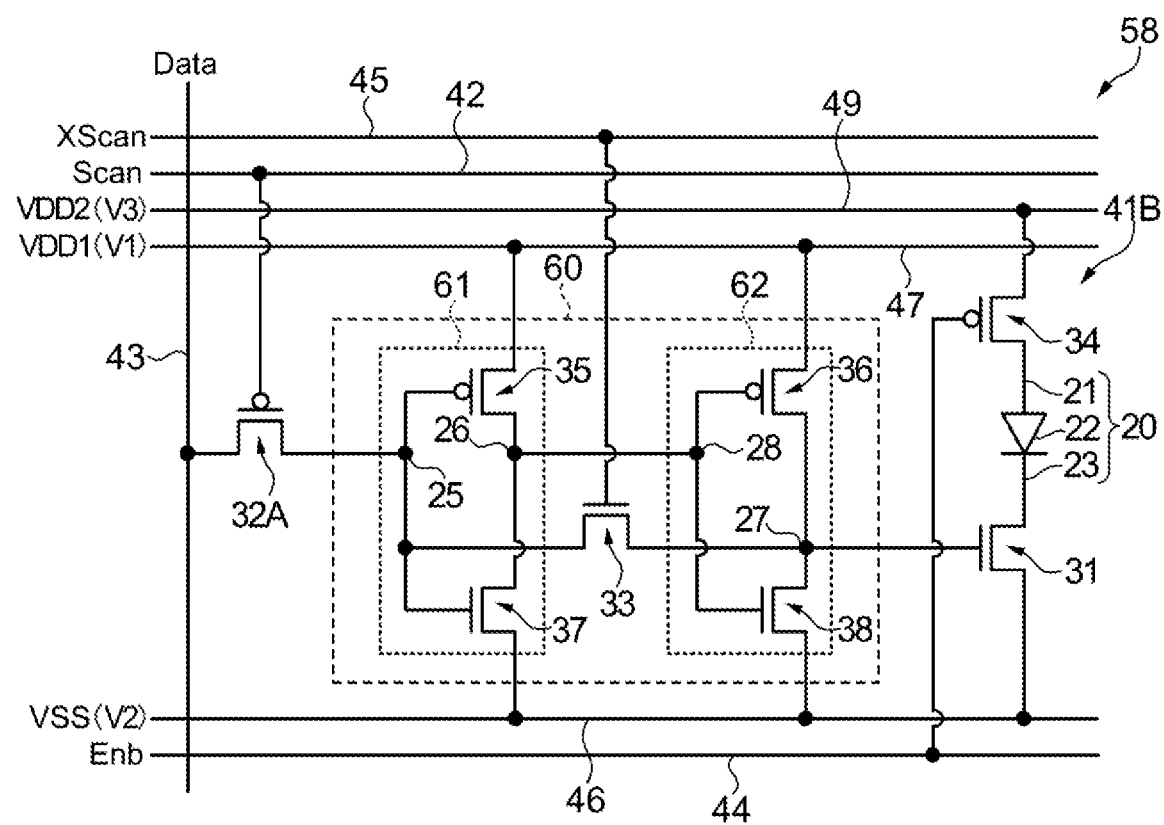
FIG. 23 is a diagram illustrating a configuration of a pixel circuit according to Example 3.

A configuration of a pixel circuit according to Example 3 will now be described. FIG. 23 is a diagram illustrating the configuration of the pixel circuit according to Example 3. As illustrated in FIG. 23, a pixel circuit 41B according to Example 3 has the same configuration as that of the pixel circuit 41 according to Example 1 except that a P-type second transistor 32A is arranged between the data line 43 and the first inverter 61.

The pixel circuit 41B according to Example 3 includes the N-type first transistor 31, the light emitting element 20, the P-type fourth transistor 34, the memory circuit 60, and the P-type second transistor 32A. The memory circuit 60 includes the first inverter 61, the second inverter 62, and the N-type third transistor 33. The second transistor 32A includes a gate electrically connected to the first scan line 42.

Since the second transistor 32A is of the P-type, the first scan signal supplied to the first scan signal 42 includes the Low (low potential) selection signal and the High (high potential) non-selection signal. Therefore, the pixel circuit 41B according to Example 3 has a magnitude relationship that is opposite to the magnitude relationship in the pixel circuit 41 according to Example 1, between the potential of the selection signal and the potential of the non-selection signal. Note that the second scan signal supplied to the second scan line 45 is the same as the first scan signal in Example 1.

Scan Line Drive Circuit

Figure 24:
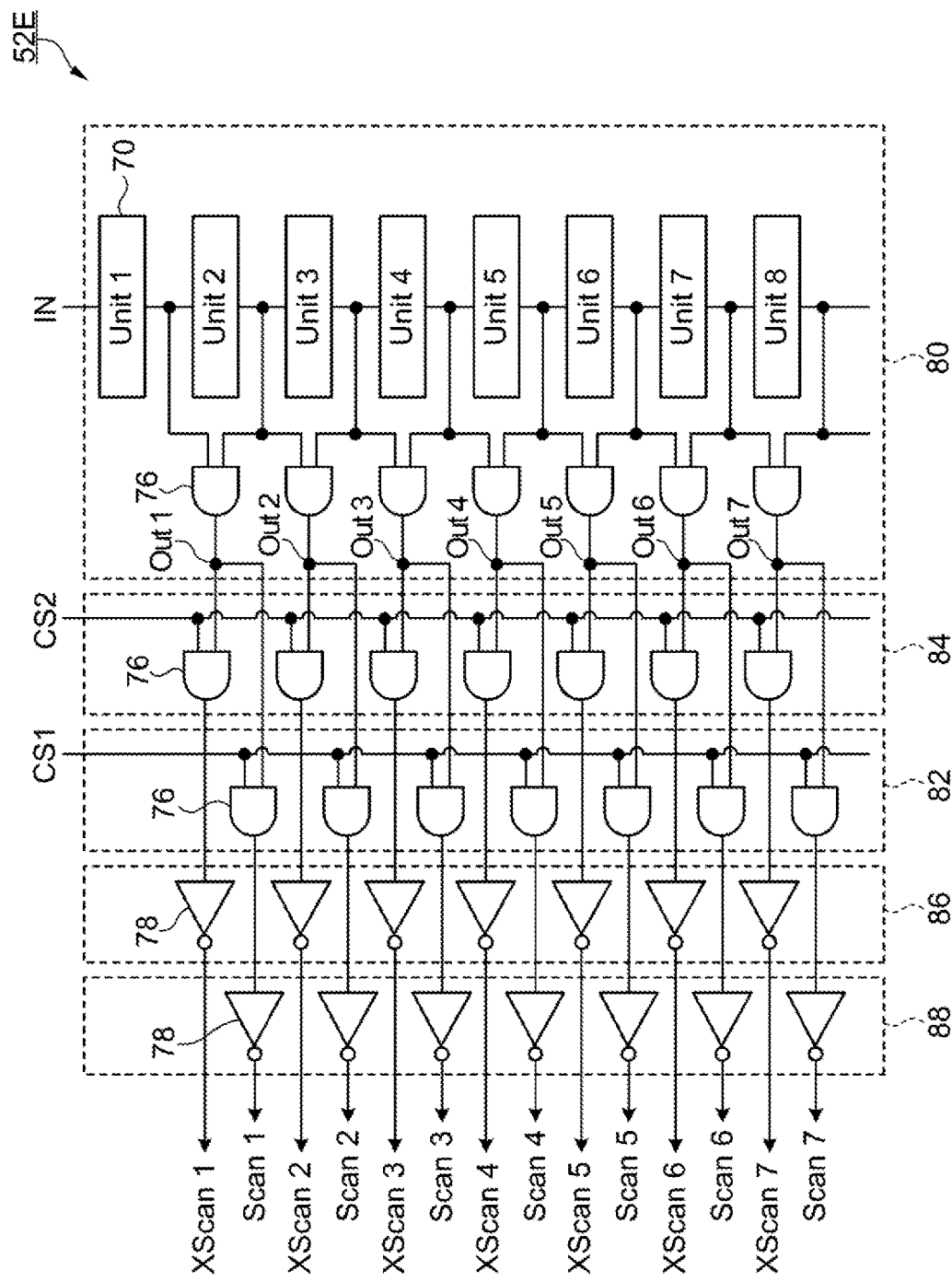
FIG. 24 is a block diagram illustrating a configuration of a scan line drive circuit according to Example 3.

The configuration of the scan line drive circuit according to Example 3 will be described. FIG. 24 is a block diagram illustrating the configuration of the scan line drive circuit according to Example 3. As illustrated in FIG. 24, the scan line drive circuit 52E according to Example 3 includes the selection circuit 80, the first control circuit 82, the second control circuit 84, the first NOT circuit 86, and a second NOT circuit 88. The scan line drive circuit 52D according to Example 3 has the same configuration as that of the scan line drive circuit 52 according to Example 1 except for the presence of the second NOT circuit 88. The second NOT circuit 88 includes a plurality of inverters 78 by way of example. The second NOT circuit 88 is electrically connected to the first control circuit 82.

In the scan line drive circuit 52E according to Example 3, the first control circuit 82 and the second NOT circuit 88 are used to form, from the output signal from the selection circuit 80, the first scan signal including the selection signal and the non-selection signal, and the first scan signal is supplied to the first scan line 42. In the scan line drive circuit 52E the second control circuit 84 and the first NOT circuit 86 are also used to form, from the output signal from the selection circuit 80, the second scan signal including the maintain signal and the non-maintain signal, and the second scan signal is supplied to the second scan line 45. In Example 3, the second transistor 32A is of the P-type, and the selection signal is Low. Thus, compared to Example 1, Example 3 needs the second NOT circuit 88 in order to cause the inverter 78 to invert the selection signal adjusted by the first control circuit 82.

Figure 25:
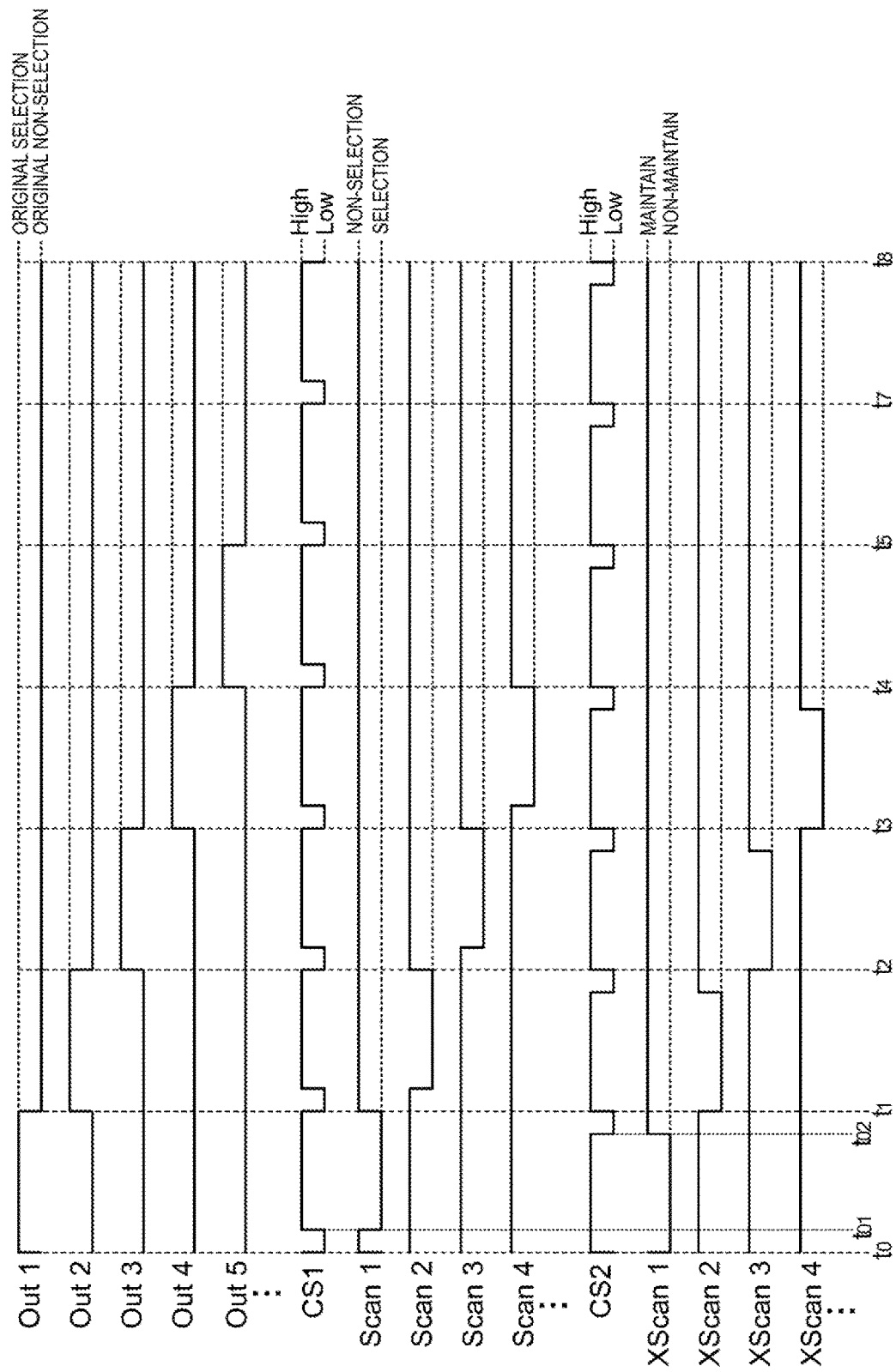
FIG. 25 is a timing chart illustrating operation of the scan line drive circuit according to Example 3.

Operation of the scan line drive circuit 52E according to Example 3 will be described. FIG. 25 is a timing chart illustrating the operation of the scan line drive circuit according to Example 3. As illustrated in FIG. 25, the first control circuit 82 adjusts the pulse width of the selection signal and the timing to switch from the non-selection signal to the selection signal with respect to the original selection signal. However, the inversion by the second NOT circuit 88 results in the Low selection signal and the High non-selection signal unlike in Example 1. Furthermore, the second control circuit 84 adjusts the pulse width of the non-maintain signal and the timing to switch from the non-maintain signal to the maintain signal with respect to the original selection signal. This, in combination with the inversion by the first NOT circuit 86, results in the Low non-maintain signal and the High maintain signal as in Example 1.

Example 4

Pixel Circuit

Figure 26:
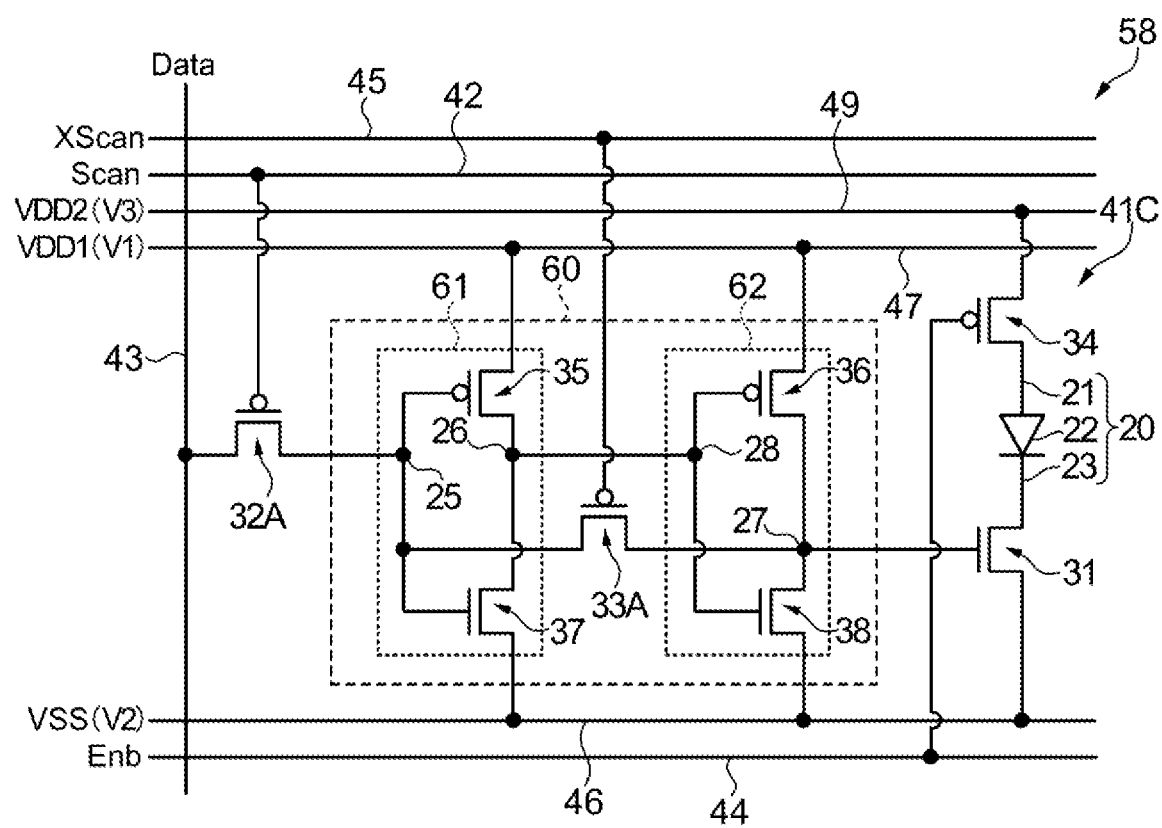
FIG. 26 is a diagram illustrating a configuration of a pixel circuit according to Example 4.

A configuration of a pixel circuit according to Example 4 will now be described. FIG. 26 is a diagram illustrating the configuration of the pixel circuit according to Example 4. As illustrated in FIG. 26, a pixel circuit 41C according to Example 4 has the same configuration as that of the pixel circuit 41 according to Example 1 except that Example 4 includes a second transistor 32A and a third transistor 33A both of which are of the P-type.

The pixel circuit 41C according to Example 4 includes the N-type first transistor 31, the light emitting element 20, the P-type fourth transistor 34, the memory circuit 60, and the P-type second transistor 32A. The memory circuit 60 includes the first inverter 61, the second inverter 62, and the P-type third transistor 33A.

Since the second transistor 32A is of the P-type, the first scan signal supplied to the first scan signal 42 includes the Low (low potential) selection signal and the High (high potential) non-selection signal. Since the third transistor 33A is of the P-type, the second scan signal supplied to the second scan signal 45 includes the Low (low potential) maintain signal and the High (high potential) non-maintain signal. Therefore, the pixel circuit 41C according to Example 4 has a magnitude relationship that is opposite to the magnitude relationship in the pixel circuit 41 according to Example 1, between the potential of the selection signal and the potential of the non-selection signal and between the potential of the maintain signal and the potential of the non-maintain signal.

Scan Line Drive Circuit

Figure 27:
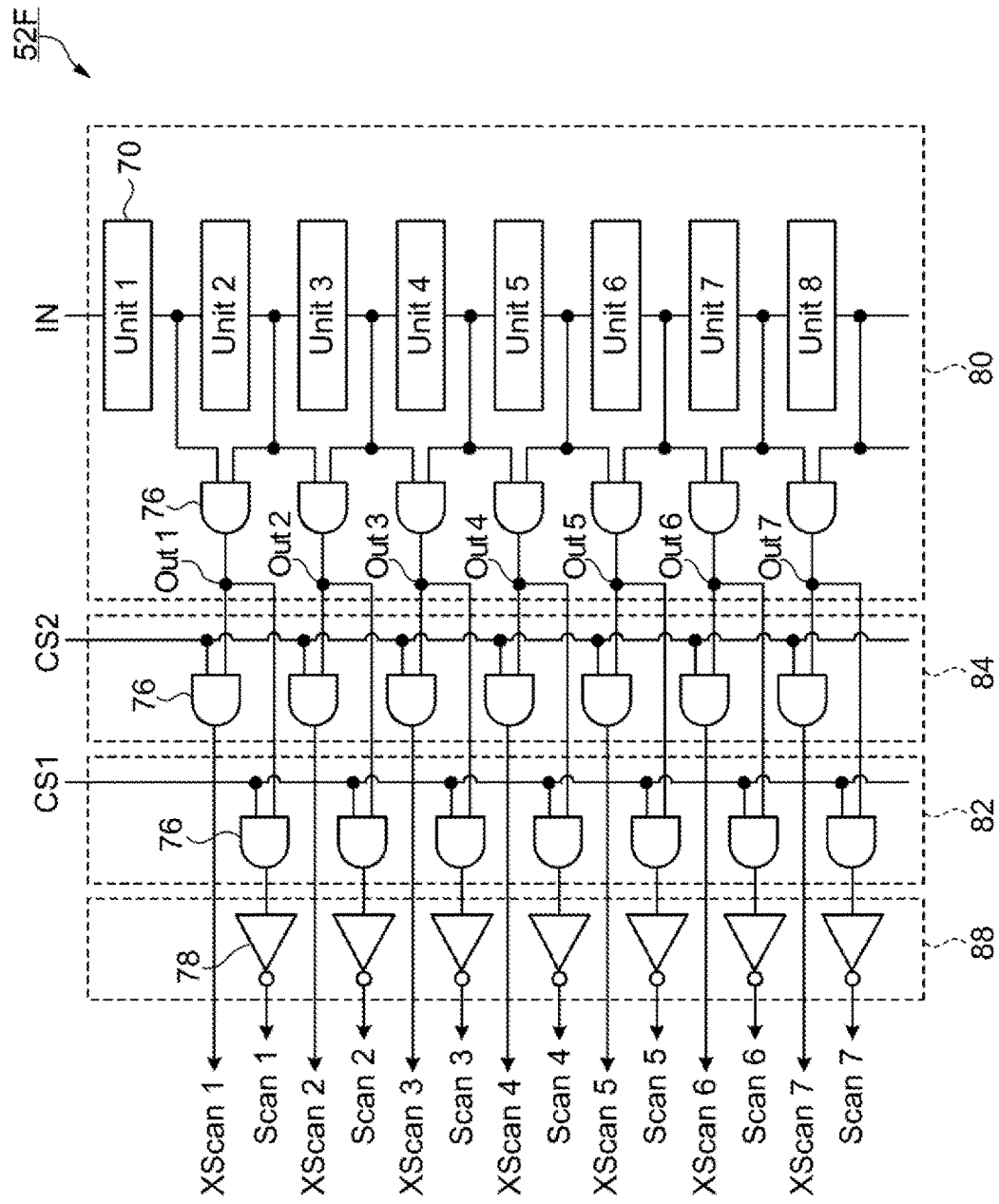
FIG. 27 is a block diagram illustrating a configuration of a scan line drive circuit according to Example 4.

The configuration of the scan line drive circuit according to Example 4 will be described. FIG. 27 is a block diagram illustrating the configuration of the scan line drive circuit according to Example 4. As illustrated in FIG. 27, the scan line drive circuit 52F according to Example 4 includes the selection circuit 80, the first control circuit 82, the second control circuit 84, and the second NOT circuit 88. The scan line drive circuit 52F according to Example 4 has the same configuration as that of the scan line drive circuit 52 according to Example 1 except for the lack of the first NOT circuit 86 and the presence of the second NOT circuit 88.

In the scan line drive circuit 52F according to Example 4, the first control circuit 82 and the second NOT circuit 88 are used to form, from the output signal from the selection circuit 80, the first scan signal including the selection signal and the non-selection signal, and the first scan signal is supplied to the first scan line 42. In the scan line drive circuit 52F, the second control circuit 84 is also used to form, from the output signal from the selection circuit 80, the second scan signal including the maintain signal and the non-maintain signal, and the second scan signal is supplied to the second scan line 45.

In Example 4, the second transistor 32A is of the P-type, and the selection signal is Low. Thus, compared to Example 1, Example 4 needs the second NOT circuit 88 in order to cause the inverter 78 to invert the selection signal adjusted by the first control circuit 82. Furthermore, the third transistor 33A is of the P-type, and the non-maintain signal is High. This eliminates a need for the first NOT circuit 86 unlike in Example 1.

Figure 28:
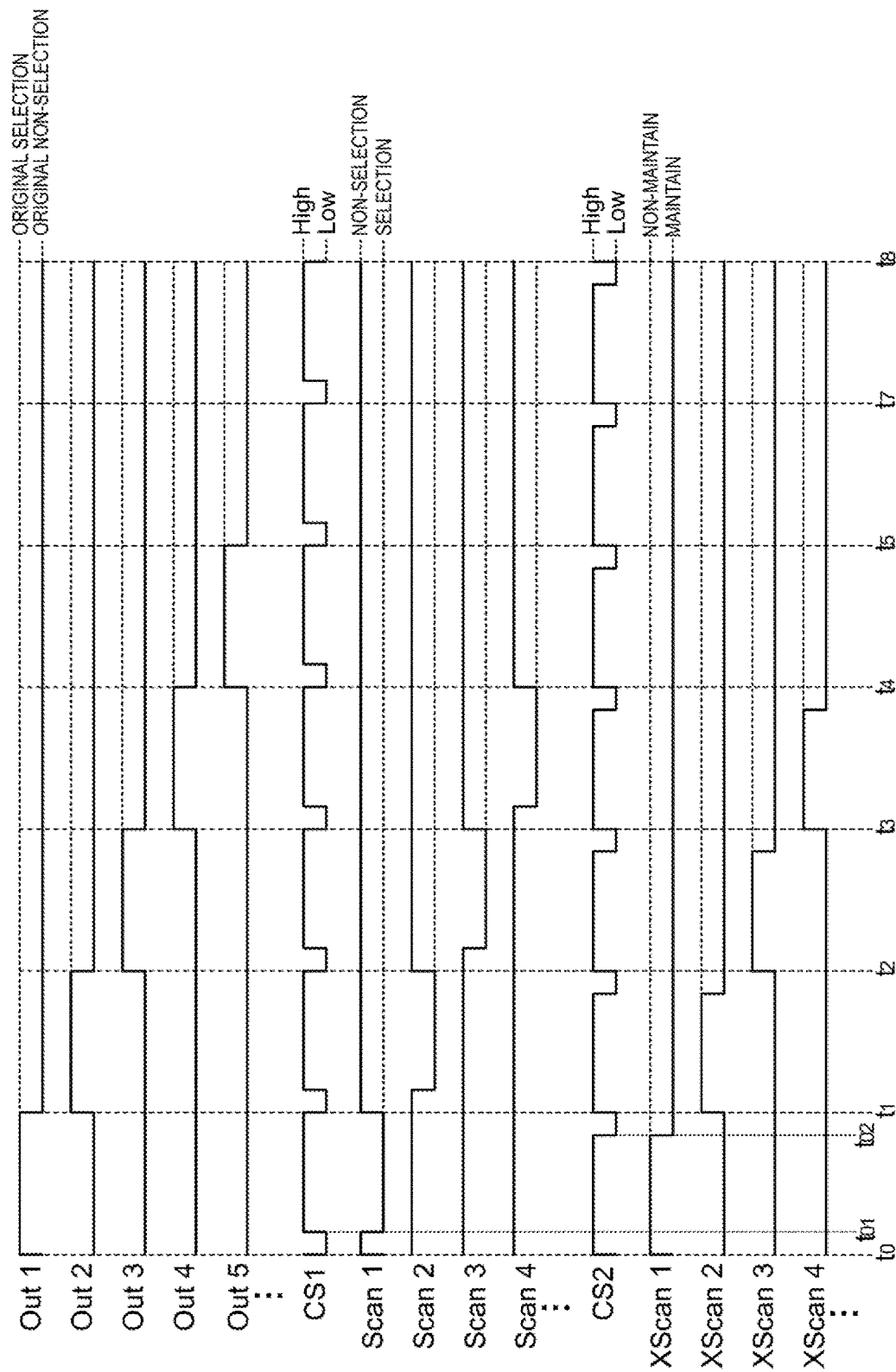
FIG. 28 is a timing chart illustrating operation of the scan line drive circuit according to Example 4.

Operation of the scan line drive circuit 52F according to Example 4 will be described. FIG. 28 is a timing chart illustrating the operation of the scan line drive circuit according to Example 4. As illustrated in FIG. 28, the first control circuit 82 adjusts the pulse width of the selection signal and the timing to switch from the non-selection signal to the selection signal with respect to the original selection signal. However, the inversion by the second NOT circuit 88 results in the Low selection signal and the High non-selection signal unlike in Example 1. Furthermore, the second control circuit 84 adjusts the pulse width of the non-maintain signal and the timing to switch from the non-maintain signal to the maintain signal with respect to the original selection signal. However, the non-maintain signal is High and the maintain signal is Low.

The Exemplary Embodiment described above (Examples and Modified Examples) are aspects of the invention and may be optionally varied and applied without departing from the scope of the invention. For example, the followings are modified examples other than those described above.

Modified Example 4

In the scan line drive circuits in Examples and Modified Examples described above, the first control circuit 82 and the second control circuit 84 include the AND circuits (logical product circuits) 76, and the first NOT circuit 86 or the second NOT circuit 88 is provided on the output side of the first control circuit 82 and the second control circuit 84 as needed. However, the invention is not limited to such a form. The first control circuit 82 and the second control circuit 84 may include OR circuits (logical sum circuits), and the first NOT circuit 86 or the second NOT circuit 88 may be provided on the input side of the first control circuit 82 and the second control circuit 84. In other words, instead of the configuration taking the logical product of the original selection signal and the first control signal CS1 or the second control signal CS2 and outputting the selection signal or the non-maintain signal as an inverted signal as needed, a configuration may be provided that takes a logical sum of the inverted signal of the original selection signal and the inverted signal of the first control signal CS1 or the second control signal CS2 and that outputs the selection signal or the non-maintain signal. Furthermore, for example, a configuration may be provided that includes the second NOT circuit 88 on the input side and the output side of the first control circuit 82 including the OR circuits. The configuration may take the logical sum of the inverted signal of the original selection signal and the inverted signal of the first control signal CS1 and output the inverted signal of the logical sum as a selection signal. In fact, the scan line drive circuit may have any configuration other than the configurations in Examples and Modified Examples described above so long as the configuration allows the same results of logical operations to be obtained from the original selection signal.

Modified Example 5

In the pixel circuits in Examples and Modified Examples described above, the gate of the first transistor 31 is electrically connected to the output terminal 27. However, the invention is not limited to such a form. The gate of the first transistor 31 may be electrically connected to the input terminal 28 of the second inverter 62, i.e., the output terminal 26 of the first inverter 61.

Modified Example 6

In the pixel circuits in Examples and Modified Examples described above, the memory circuit 60 includes the two inverters 61 and 62. However, the invention is not limited to such a form. The memory circuit 60 may include two or more, an even number of inverters.

Modified Example 7

In Examples and Modified Examples described above, the electro-optical device is an organic EL device including the element substrate 11 formed of a single-crystal semiconductor wafer (single-crystal silicon wafer) and the light emitting elements 20 arranged on the element substrate in a matrix with 720 rows and 3840 columns (1280×3) and each formed of an organic EL element. However, the electro-optical device of the invention is not limited to such a form. For example, the electro-optical device may include the element substrate 11 formed of a glass substrate and Thin Film Transistors (TFTs) formed on the element substrate 11 or include a flexible substrate formed of polyimide and thin film transistors formed on the flexible substrate. Alternatively, the electro-optical device may be a micro LED display including fine LED elements densely arranged as light emitting elements or a quantum dot display including nanosized semiconductor crystal substances as light emitting elements. The electro-optical device may use, as a color filter, quantum dots that can convert incident light into light with a different wavelength. Furthermore, the electro-optical device is not limited to the configuration including the light emitting elements. The electro-optical device may be an optical modulator or the like. Examples of the optical modulator include a Liquid Crystal On Silicon (LCOS) including a silicon substrate and a liquid crystal layer formed on the silicon substrate and a Digital Micromirror Device (DMD (trade name)) that is a micromirror-type optical modulator.

Modified Example 8

In the Exemplary Embodiment described above, the electro-optical device includes the light emitting elements by way of example. However, the invention is applicable to an electronic device such as a semiconductor device. For example, the invention is applicable to a semiconductor device including a plurality of element circuits arranged in a matrix (including a matrix with a plurality of rows and one column) each supplied with two complementary signals. A suitable example of such a semiconductor device may be a Static Random Access Memory (SRAM).

Modified Example 9

In Exemplary Embodiment described above, the electronic apparatus is the see-through head-mounted display 100 integrated with the electro-optical device by way of example. However, the electronic device 10 of the invention is applicable to other electronic apparatuses including closed head-mounted displays. Other types of electronic apparatus include, for example, projectors, rear-projection televisions, direct-viewing televisions, cell phones, portable audio devices, personal computers, video camera monitors, automotive navigation devices, head-up displays, pagers, electronic organizers, calculators, wearable devices such as wristwatches, handheld displays, word processors, workstations, video phones, POS terminals, digital still cameras, signage displays, and the like. Furthermore, these electronic apparatuses may include the electronic device in Modified Example 8.

Contents derived from Exemplary Embodiment are described below.

An aspect of the invention provides an electro-optical device including a first scan line, a second scan line, a data line, a pixel circuits located at a position corresponding to an intersection of the data line and the first scan line, and a scan line drive circuit supplying one of a selection signal and a non-selection signal to the first scan line and supplying one of a maintain signal and a non-maintain signal to the second scan line. The scan line drive circuit is capable of output the selection signal and the non-maintain signal during an identical period.

According to this configuration, the scan line drive circuit is capable of supplying the selection signal to the first scan line and supplying the non-maintain signal to the second scan signal. The pixel circuit may include a memory circuit and a second transistor including a gate electrically connected to the first scan line, the second transistor being arranged between the memory circuit and the data line, and the memory circuit may include a first inverter, a second inverter, and a third transistor arranged between an output of the second inverter and an input of the first inverter. In this case, write of the image signal to the memory circuit (or rewrite of the image signal in the memory circuit) can be quickly and reliably achieved.

That is, when the selection signal is supplied to the first scan line to turn the second transistor into the ON-state to write the image signal to the first inverter and the second inverter (or rewrite the image signal in the first inverter and the second inverter), the non-maintain signal is supplied to the second scan signal to turn the third transistor into the OFF-state. This causes blocking of the electric connection between the output of the second inverter and the input of the first inverter. Thus, write of the image signal to the memory circuit (or rewrite of the image signal in the memory circuit) can be quickly and reliably achieved. Moreover, the image signal is written to the first inverter through the data line and then written to the second inverter through the first inverter. Thus, compared to a configuration writing, in parallel with write of the image signal to the first inverter through the data line, a complementary image signal to the second inverter through a complementary data line, the present configuration eliminates a need for the complementary data line and a complementary transistor. Thus, the present configuration facilitates miniaturization of the pixels to increase the resolution, and eliminates a need for an increase in the number of wiring lines, allowing improvement of manufacturing yield. This allows implementation of an electro-optical device capable of displaying high-resolution, high-quality images with reduced power consumption.

Moreover, when the pixel circuit includes a first transistor including a gate electrically connected to the memory circuit and a light emitting element, a digital signal expressed with two values for an ON-state and an OFF-state is written to the memory circuit via the second transistor, and a ratio between emission and non-emission of the light emitting element is controlled via the first transistor to enable gray scales to be displayed. Thus, the electro-optical device less likely to be affected by possible variation in current-voltage characteristics or threshold voltage of each transistor. This enables a reduction in possible variation in brightness and deviation of the gray scales even without any compensation circuit.

Preferably, in the electro-optical device, the scan line drive circuit includes a selection circuit and a first NOT circuit, forms, from an output signal from the selection circuit, the selection signal and the non-selection signal, and uses the first NOT circuit to form from the output signal the maintain signal and the non-maintain signal.

According to the configuration, the simple circuit configuration including the selection circuit and the first NOT circuit may be used to form the selection signal and the non-maintain signal that are substantially complementary to each other. Therefore, even when the second transistor, which turns into the ON-state in response to the selection signal, has a polarity identical to the polarity of the third transistor, which turns into the OFF-state in response to the non-maintain signal, the two transistors perform complementary operations to allow quick and reliable write of the image signal to the memory circuit (or rewrite of the image signal in the memory circuit).

Preferably, in the electro-optical device, the scan line drive circuit includes a first control circuit adjusting an input signal, the output signal includes an original selection signal, and uses the first control circuit to form, from the original selection signal, the selection signal.

According to the configuration, the simple circuit configuration including the selection circuit and the first control circuit may be used to control a point in time when the selection signal starts to be supplied, a point in time when the supply of the selection signal is stopped, and a period when the selection signal is continuously supplied. The selection signal therefore allows free control of on/off operation of the second transistor.

Preferably, in the above-described electro-optical device, the scan line drive circuit includes a second control circuit adjusting an input signal, the output signal includes an original selection signal, and uses the second control circuit and the first NOT circuit to form, from the original selection signal, the non-maintain signal.

According to the configuration, the simple circuit configuration including the selection circuit, the second control circuit, and the first NOT circuit may be used to control the point in time when the non-maintain signal starts to be supplied, the point in time when the supply of the non-maintain signal is stopped, and the period when the non-maintain signal is continuously supplied. The non-maintain signal therefore allows free control of on/off operation of the third transistor.

Preferably, in the electro-optical device, the scan line drive circuit includes a selection circuit, forms, from an output signal from the selection circuit, the selection signal and the non-selection signal, and forms from the output signal the maintain signal and the non-maintain signal.

According to the configuration, the simple circuit configuration including the selection circuit may be used to form the selection signal and the non-maintain signal that are substantially in phase with each other. In this case, the second transistor, which turns into the ON-state in response to the selection signal, may have a polarity opposite to the polarity of the third transistor, which turns into the OFF-state in response to the non-maintain signal. The two transistors then perform complementary operations to allow quick and reliable write of the image signal to the memory circuit (or rewrite of the image signal in the memory circuit).

Preferably, in the electro-optical device, the scan line drive circuit includes a first control circuit adjusting an input signal, the output signal includes an original selection signal, and uses the first control circuit to form, from the original selection signal, the selection signal.

According to the configuration, the simple circuit configuration including the selection circuit and the first control circuit may be used to control the point in time when the selection signal starts to be supplied, the point in time when the supply of the selection signal is stopped, and the period when the selection signal is continuously supplied. The selection signal therefore allows free control of on/off operation of the second transistor.

Preferably, in the electro-optical device, the scan line drive circuit includes a second control circuit adjusting an input signal, the output signal includes an original selection signal, and uses the second control circuit to form, from the original selection signal, the non-maintain signal.

According to the configuration, the simple circuit configuration including the selection circuit and the second control circuit may be used to control the point in time when the non-maintain signal starts to be supplied, the point in time when the supply of the non-maintain signal is stopped, and the period when the non-maintain signal is continuously supplied. The non-maintain signal therefore allows free control of on/off operation of the third transistor.

Preferably, in the electro-optical device, the scan line drive circuit includes a selection circuit, a first NOT circuit, and a second NOT circuit, uses the second NOT circuit to form, from an output signal from the selection circuit, the selection signal and the non-selection signal, and uses the first NOT circuit to form from the output signal the maintain signal and the non-maintain signal.

According to the configuration, the simple circuit configuration including the selection circuit, the first NOT circuit, and the second NOT circuit may be used to form the selection signal and the non-maintain signal that are substantially in phase with each other. Therefore, when the second transistor, which turns into the ON-state in response to the selection signal, has a polarity opposite to the polarity of the third transistor, which turns into the OFF-state in response to the non-maintain signal, the two transistors perform complementary operations to allow quick and reliable write of the image signal to the memory circuit (or rewrite of the image signal in the memory circuit).

Preferably, in the electro-optical device, the scan line drive circuit includes a first control circuit adjusting an input signal, the output signal includes an original selection signal, and uses the first control circuit and the second NOT circuit to form, from the original selection signal, the selection signal.

According to the configuration, the simple circuit configuration including the selection circuit, the first control circuit, and the second NOT circuit may be used to control the point in time when the selection signal starts to be supplied, the point in time when the supply of the selection signal is stopped, and the period when the selection signal is continuously supplied. The selection signal therefore allows free control of on/off operation of the second transistor.

Preferably, in the above-described electro-optical device, the scan line drive circuit includes a second control circuit adjusting an input signal, the output signal includes an original selection signal, and uses the second control circuit and the first NOT circuit to form, from the original selection signal, the non-maintain signal.

According to the configuration, the simple circuit configuration including the selection circuit, the second control circuit, and the first NOT circuit may be used to control the point in time when the non-maintain signal starts to be supplied, the point in time when the supply of the non-maintain signal is stopped, and the period when the non-maintain signal is continuously supplied. The non-maintain signal therefore allows free control of on/off operation of the third transistor.

Preferably, in the electro-optical device, the scan line drive circuit includes a selection circuit and a second NOT circuit, uses the second NOT circuit to form, from an output signal from the selection circuit, the selection signal and the non-selection signal, and forms from the output signal the maintain signal and the non-maintain signal.

According to the configuration, the simple circuit configuration including the selection circuit and the second NOT circuit may be used to form the selection signal and the non-maintain signal that are substantially complementary to each other. Therefore, even when the second transistor, which turns into the ON-state in response to the selection signal, has a polarity identical to the polarity of the third transistor, which turns into the OFF-state in response to the non-maintain signal, the two transistors perform complementary operations to allow quick and reliable write of the image signal to the memory circuit (or rewrite of the image signal in the memory circuit).

Preferably, in the electro-optical device, the scan line drive circuit includes a first control circuit adjusting an input signal, the output signal includes an original selection signal, and uses the first control circuit and the second NOT circuit to form, from the original selection signal, the selection signal.

According to the configuration, the simple circuit configuration including the selection circuit, the first control circuit, and the second NOT circuit may be used to control the point in time when the selection signal starts to be supplied, the point in time when the supply of the selection signal is stopped, and the period when the selection signal is continuously supplied. The selection signal therefore allows free control of on/off operation of the second transistor.

Preferably, in the electro-optical device, the scan line drive circuit includes a second control circuit, the output signal includes an original selection signal, and uses the second control circuit to form, from the original selection signal, the non-maintain signal.

According to the configuration, the simple circuit configuration including the selection circuit and the second control circuit may be used to control the point in time when the non-maintain signal starts to be supplied, the point in time when the supply of the non-maintain signal is stopped, and the period when the non-maintain signal is continuously supplied. The non-maintain signal therefore allows free control of on/off operation of the third transistor.

The electronic apparatus in the application includes the above-described electro-optical device.

The configuration allows high-quality images to be displayed on electronic apparatuses, e.g., head-mounted displays.

An aspect of the invention provides an electronic device including a first row line, a second row line, a column line, element circuits provided in association with intersections between the column line and each of the first row line and the second row line, and a row line drive circuit configured to supply one of a first signal and a non-first signal to the first row line and to supply one of a second signal and a non-second signal to the second row line. The row line drive circuit is capable of outputting the first signal and the second signal during an identical period.

According to this configuration, the scan line drive circuit is capable of supplying the first signal to the first row line and supplying the non-second signal to the second row signal. The pixel circuit may include a memory circuit and a second transistor including a gate electrically connected to the first row line, the second transistor being arranged between the memory circuit and the column line, and the memory circuit may include a first inverter, a second inverter, and a third transistor arranged between an output of the second inverter and an input of the first inverter. In this case, write of the image signal to the memory circuit (or rewrite of the image signal in the memory circuit) can be quickly and reliably achieved.

That is, when the selection signal is supplied to the first row line to turn the second transistor into the ON-state to write the image signal to the first inverter and the second inverter (or rewrite the image signal in the first inverter and the second inverter), the non-second signal is supplied to the second row signal to turn the third transistor into the OFF-state. This causes blocking of the electric connection between the output of the second inverter and the input of the first inverter. Thus, write of the image signal to the memory circuit (or rewrite of the image signal in the memory circuit) can be quickly and reliably achieved. Moreover, the signal is written to the first inverter through the column line and then written to the second inverter through the first inverter. Thus, compared to a configuration writing, in parallel with write of the image signal to the first inverter through the column line, a complementary image signal to the second inverter through a complementary column line, the present configuration eliminates a need for the complementary column line and a complementary transistor. Thus, the present configuration facilitates miniaturization of the pixels to increase the resolution, and eliminates a need for an increase in the number of wiring lines, allowing improvement of manufacturing yield. This allows inexpensive implementation of a large-capacity electronic device capable of accurately storing information.

Preferably, in the electronic device, the row line drive circuit includes a selection circuit and a first NOT circuit, forms, from an output signal from the selection circuit, the first signal and the non-first signal, and uses the first NOT circuit to form from the output signal the second signal and the non-second signal.

According to the configuration, the simple circuit configuration including the selection circuit and the first NOT circuit may be used to form the first signal and the non-first signal that are substantially complementary to each other. Therefore, even when the second transistor, which turns into the ON-state in response to the first signal, has a polarity identical to the polarity of the third transistor, which turns into the OFF-state in response to the non-first signal, the two transistors perform complementary operations to allow quick and reliable write of the image signal to the memory circuit (or rewrite of the image signal in the memory circuit).

Preferably, in the electronic device, the row line drive circuit includes a selection circuit, forms, from an output signal from the selection circuit, the first signal and the non-first signal, and forms from the output signal the second signal and the non-second signal.

According to the configuration, the simple circuit configuration including the selection circuit may be used to form the first signal and the non-second signal that are substantially in phase with each other. Therefore, when the second transistor, which turns into the ON-state in response to the first signal, has a polarity opposite to the polarity of the third transistor, which turns into the OFF-state in response to the non-second signal, the two transistors perform complementary operations to allow quick and reliable write of the image signal to the memory circuit (or rewrite of the image signal in the memory circuit).

Preferably, in the electronic device, the row line drive circuit includes a selection circuit, a first NOT circuit, and a second NOT circuit, uses the second NOT circuit to form, from an output signal from the selection circuit, the first signal and the non-first signal, and uses the first NOT circuit to form from the output signal the second signal and the non-second signal.

According to the configuration, the simple circuit configuration including the selection circuit, the first NOT circuit, and the second NOT circuit may be used to form the first signal and the non-second signal that are substantially in phase with each other. Therefore, when the second transistor, which turns into the ON-state in response to the first signal, has a polarity opposite to the polarity of the third transistor, which turns into the OFF-state in response to the non-second signal, the two transistors perform complementary operations to allow quick and reliable write of the image signal to the memory circuit (or rewrite of the image signal in the memory circuit).

Preferably, in the electronic device, the row line drive circuit includes a selection circuit and a second NOT circuit, uses the second NOT circuit to form, from an output signal from the selection circuit, the first signal and the non-first signal, and forms, from the output signal, the second signal and the non-second signal.

According to the configuration, the simple circuit configuration including the selection circuit and the second NOT circuit may be used to form the first signal and the non-second signal that are substantially complementary to each other. Therefore, even when the second transistor, which turns into the ON-state in response to the first signal, has a polarity identical to the polarity of the third transistor, which turns into the OFF-state in response to the non-second signal, the two transistors perform complementary operations to allow quick and reliable write of the image signal to the memory circuit (or rewrite of the image signal in the memory circuit).

The electronic apparatus in the application includes the above-described electronic device.

According to this configuration, an electronic apparatus operating quickly and reliably can be provided.

The entire disclosure of Japanese Patent Application No. 2018-025776, filed Feb. 16, 2018 is expressly incorporated by reference herein.

What is claimed is:

1. An electro-optical device comprising:
   a first scan line;
   a second scan line;
   a data line;
   a scan line drive circuit supplying one of a selection signal and a non-selection signal to the first scan line as a first scan signal and supplying one of a maintain signal and a non-maintain signal to the second scan line as a second scan signal; and
   a pixel circuit located at a position corresponding to an intersection of the data line and the first scan line, the pixel circuit including a first inverter, a second inverter, a second transistor and a third transistor, wherein
   the second transistor is electrically connected between the data line and an input of the first inverter,
   an output of the first inverter is electrically connected to an input of the second inverter,
   the third transistor is electrically connected between an output of the second inverter and the input of the first inverter, and
   the scan line drive circuit is capable of outputting the selection signal and the non-maintain signal during an identical period.

2. The electro-optical device according to claim 1, wherein
   the scan line drive circuit includes a selection circuit and a first NOT circuit,
   forms an output signal, from the selection circuit, the selection signal and the non-selection signal, and
   uses the first NOT circuit to form, from the output signal, the maintain signal and the non-maintain signal.

3. The electro-optical device according to claim 1, wherein
   the scan line drive circuit includes a selection circuit,
   forms, from an output signal from the selection circuit, the selection signal and the non-selection signal, and
   forms, from the output signal, the maintain signal and the non-maintain signal.

4. The electro-optical device according to claim 1, wherein
   the scan line drive circuit includes a selection circuit, a first NOT circuit, and a second NOT circuit,
   uses the second NOT circuit to form, from an output signal from the selection circuit, the selection signal and the non-selection signal, and
   uses the first NOT circuit to form, from the output signal, the maintain signal and the non-maintain signal.

5. An electronic apparatus comprising the electro-optical device according to claim 1.

6. The electronic device according to claim 1, wherein
   the pixel circuit further includes a light emitting element and a first transistor,
   a gate of the first transistor is electrically connected to the output of the second inverter, and
   the light emitting element and the first transistor are connected in series.

7. The electronic device according to claim 6, further comprising:
   a first potential line and a second potential line, wherein
   the light emitting element and the first transistor are electrically connected in series between the first potential line and the second potential line.

8. The electronic device according to claim 1, wherein
   the second transistor turns ON when the first scan signal turns from the non-selection signal to the selection signal and turns OFF when the first scan signal turns from the selection signal to the non-selection signal, and
   the third transistor turns ON when the second scan signal turns from the non-maintain signal to the maintain signal and turns OFF when the second scan signal turns from the maintain signal to the non-maintain signal.

9. The electronic device according to claim 8, wherein
simultaneously, the first scan signal turns from the non-selection signal to the selection signal and the second scan signal turns from the maintain signal to the non-maintain signal.

10. The electronic device according to claim 8, wherein
before the first scan signal turns from the non-selection signal to the selection signal, the second scan signal turns from the maintain signal to the non-maintain signal.

11. The electronic device according to claim 8, wherein
simultaneously, the first scan signal turns from the selection signal to the non-selection signal and the second scan signal turns from the non-maintain signal to the maintain signal.

12. The electronic device according to claim 8, wherein
before the first scan signal turns from the selection signal to the non-selection signal, the second scan signal turns from the non-maintain signal to the maintain signal.

13. An electronic device comprising:
   a first row line;
   a second row line;
   a column line;
   a row line drive circuit supplying one of a first signal and a non-first signal to the first row line and supplying one of a second signal and a non-second signal to the second row line; and
   an element circuit located at a position corresponding to an intersection of the column line and each of the first row line and the second row line, the element circuit including a first inverter, a second inverter, a second switching element and a third switching element, wherein the second switching element is positioned between the column line and an input of the first inverter, and the second switching element is electrically connected to the first row line, and turns ON when the first signal is supplied and turns OFF when the non-first signal is supplied, an output of the first inverter is electrically connected to an input of the second inverter, the third switching element is positioned between an output of the second inverter and the input of the first inverter, and the third switching element is electrically connected to the second row line, and turns ON when the second signal is supplied and turns OFF when the non-second signal is supplied, and the row line drive circuit is capable of outputting the first signal and the non-second signal during an identical period.

14. The electronic device according to claim 13, wherein the row line drive circuit includes a selection circuit and a first NOT circuit, forms, from an output signal from the selection circuit, the first signal and the non-first signal, and uses the first NOT circuit to form, from the output signal, the second signal and the non-second signal.

15. The electronic device according to claim 13, wherein the row line drive circuit includes a selection circuit, forms, from an output signal from the selection circuit, the first signal and the non-first signal, and forms, from the output signal, the second signal and the non-second signal.

16. The electronic device according to claim 13, wherein the row line drive circuit includes a selection circuit, a first NOT circuit, and second NOT circuit, the second NOT circuit is used to form, from an output signal from the selection circuit, the first signal and the non-first signal, and the first NOT circuit is used to form, from the output signal, the second signal and the non-second signal.

17. An electronic apparatus comprising the electronic device according to claim 13.

18. The electronic device according to claim 13, wherein simultaneously, the second switching element turns ON and the third switch element turns OFF.

19. The electronic device according to claim 13, wherein before the second switching element turns ON, the third switch element turns OFF.

20. The electronic device according to claim 13, wherein simultaneously, the second switching element turns OFF and the third switch element turns ON.

21. The electronic device according to claim 13, wherein before the second switching element turns OFF, the third switch element turns ON.

22. An electro-optical device comprising:
a first scan line;
a second scan line;
a data line;
a pixel circuit located at a position corresponding to an intersection of the data line and the first scan line, the pixel circuit including:
a first transistor;
a second transistor connected to the first scan line;
a third transistor connected to the second scan line;
a fourth transistor, the fourth transistor being connected in series with the first transistor between a high potential line and a low potential line;
a first inverter connected to the second transistor and the third transistor;
a second inverter connected between the third transistor and the series-connected first and fourth transistors; and
a scan line drive circuit supplying one of a selection signal and a non-selection signal to the first scan line and supplying one of a maintain signal and a non-maintain signal to the second scan line, wherein
the scan line drive circuit is configured to output the selection signal and the non-maintain signal during an identical period, and
in the identical period, the selection signal turns the second transistor ON, and the non-maintain signal turns the third transistor OFF.

\* \* \* \* \*